United States Patent
Johoji et al.

(10) Patent No.: US 6,632,541 B2
(45) Date of Patent: Oct. 14, 2003

(54) OLEFIN-BASED COPOLYMER COMPOSITION

(75) Inventors: Hirofumi Johoji, Ichihara (JP); Hidetake Hozumi, Ichihara (JP); Tadaaki Nishiyama, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/244,659

(22) Filed: Feb. 10, 1999

(65) Prior Publication Data

US 2002/0072561 A1 Jun. 13, 2002

(30) Foreign Application Priority Data

| Feb. 10, 1998 | (JP) | 10-028906 |
| Feb. 10, 1998 | (JP) | 10-028907 |
| Feb. 13, 1998 | (JP) | 10-031287 |
| Feb. 13, 1998 | (JP) | 10-031288 |
| Feb. 13, 1998 | (JP) | 10-031289 |
| Feb. 23, 1998 | (JP) | 10-040115 |
| Feb. 25, 1998 | (JP) | 10-043290 |
| Mar. 6, 1998 | (JP) | 10-055468 |
| Mar. 11, 1998 | (JP) | 10-059851 |
| Mar. 25, 1998 | (JP) | 10-077653 |
| Apr. 2, 1998 | (JP) | 10-090292 |
| Apr. 7, 1998 | (JP) | 10-094679 |
| Apr. 15, 1998 | (JP) | 10-104681 |
| Apr. 15, 1998 | (JP) | 10-104682 |
| Apr. 17, 1998 | (JP) | 10-107539 |

(51) Int. Cl.$^7$ ............. C08L 23/00; C08L 53/00
(52) U.S. Cl. ............. 428/474.4; 428/515; 524/500; 524/505; 525/88; 525/92 B; 525/95; 525/96; 525/97; 525/98; 525/191; 525/240
(58) Field of Search ............. 525/92 B, 96, 525/95, 97, 98, 88, 191, 240; 524/505, 500; 428/474.4, 515

(56) References Cited

U.S. PATENT DOCUMENTS 5,330,829 A * 7/1994 Miller
5,847,051 A * 12/1998 Hwo et al. ............. 525/98
5,874,512 A * 2/1999 Farley
6,090,888 A * 7/2000 Khanarian et al.

FOREIGN PATENT DOCUMENTS

| JP | 5-59248 | 3/1993 |
| JP | 6-57087 | 3/1994 |
| JP | 6-287365 | 10/1994 |
| JP | 7-16989 | 1/1995 |
| JP | 7-53799 | 2/1995 |
| JP | 7-484485 | 2/1995 |
| JP | 7-70404 | 3/1995 |
| JP | 7-149953 | 6/1995 |
| JP | 7-188508 | 7/1995 |
| JP | 7-238192 | 9/1995 |
| JP | 7-268138 | 10/1995 |
| JP | 7-278381 | 10/1995 |
| JP | 7-286078 | 10/1995 |
| JP | 8-27314 | 1/1996 |
| JP | 8-27330 | 1/1996 |
| JP | 8-302086 | 11/1996 |
| JP | 8-302096 | 11/1996 |
| JP | 8-302097 | 11/1996 |
| JP | 9-31270 | 2/1997 |
| JP | 9-104720 | 4/1997 |
| JP | 10-36595 | 2/1998 |
| JP | 10-45964 | 2/1998 |
| JP | 10-45971 | 2/1998 |

OTHER PUBLICATIONS

Modic, SIR H1798, Jul. 1999.*

* cited by examiner

*Primary Examiner*—Jeffrey Mullis
(74) *Attorney, Agent, or Firm*—Fitch, Even, Tabin & Flannery

(57) ABSTRACT

An olefin based copolymer composition having excellent weather resistance and excellent recycling properties having an olefin based copolymer obtained by copolymerizing two or more olefins, wherein the olefins are selected from the group consisting of ethylene, propylene and alpha olefins having 4 to 20 carbon atoms, and the total number of carbon atoms of the two or more selected olefins is 6 or more in combination with other component(s).

47 Claims, No Drawings

OLEFIN-BASED COPOLYMER COMPOSITION

BACKGROUND OF THE INVENTION

1. Field of the Invention

The present invention relates to olefin-based copolymer compositions. More particularly, the present invention relates to olefin-based copolymer compositions which comprise an olefin-based copolymer, that are excellent in weather resistance, and also excellent in recycling properties due to inclusion of a polyolefin component as the main component thereof.

2. Description of the Related Art

Soft poly(vinyl chloride) materials have an excellent balance between mechanical strength and flexibility and are excellent in cost performance. However, they have a tendency to cause migration of a plasticizer, which causes a generation of specific odors due to the plasticizer, and other problems in use, since a large amount of a plasticizer is usually contained therein. Compositions containing a soft poly(vinyl chloride) as a base material do not have sufficient low temperature properties, and extremely decrease in flexibility at a temperature of equal to or lower than 0° C. Further, recently, the development of alternate materials is intensely desired in view of the generation of a harmful gases that arise in burning of such compositions.

In contrast, polyolefin-based resins are known as materials having excellent recycling properties. However, they can not become suitable alternate materials for soft poly(vinyl chloride) resins since they are hard and are poor in both transparency and elasticity recovering properties, though they can be used partially with other materials in making sheets and films.

For making use of the various characteristics of polyolefin-based resins, various formulations of olefin-based elastomers have been examined, and materials which are soft and excellent in elasticity are commercially available in the general name of polyolefin-based thermoplastic elastomers. However, the polyolefin-based thermoplastic elastomers are lacking in transparency, and can not be used in fields wherein transparency is required.

Thermoplastic elastomers composed of a polyolefin-based resin and a styrene-based thermoplastic elastomer have flexibility and elasticity. However, practically, these elastomers are insufficient in heat resistance and weather resistance, and thus the use thereof is rather restricted.

On the other hand, there are described methods for preparing a thermoplastic elastomer composition excellent that is in heat resistance and mechanical strength by blending a polyolefin-based resin such as a polypropylene, and the like, with a hydrogenated compound of a conjugated diene-styrene copolymer, in Japanese Patent Application Laid-Open (JP-A) Nos. 5-059248, 6-057087, 7-016989, 6-287365, 7-048485, 7-053799, 7-070404, 7-149953, 7-188508, 7-238192, 7-278381, 7-280678, 8-027330, 9-031270 and the like. However, the design of a material essentially composed of an olefin component is expected, in which the content of an aromatic vinyl compound such as styrene is desirably reduced to possibly an even lower extent, in view of recent increases in requirements for recycling of polymer materials and the need to develop materials responding to environmental problems.

SUMMARY OF THE INVENTION

Under such conditions, the present inventors have intensively studied a composition having no problem as described above, and as a result, have found that a composition containing a specific olefin copolymer is excellent in weather resistance, and also excellent in recycling properties since this composition contains a polyolefin component as a main component thereof. In this way, the inventors completed the present invention.

Namely, the present invention relates to an olefin-based copolymer composition comprising the following component (a) in combination with any one component selected from the of the following components (b) to (i):

(a): an olefin-based copolymer obtained by copolymerizing two or more olefins, wherein the olefins are selected from the group consisting of ethylene, propylene and α-olefins having 4 to 20 carbon atoms, and the total number of carbon atoms of the two or more selected olefins is 6 or more;

(b): a crystalline α-olefin-based polymer comprising an α-olefin having 3 or more carbon atoms;

(c): the following component (c-1) and/or component (c-2), (c-1): a block copolymer comprising (cH) a polymer block containing a vinyl aromatic compound and (cS) a polymer block containing a conjugated diene compound, (c-2): a hydrogenated product of the block copolymer recited in (c-1);

(d): the component (b) in combination with an isobutylene-isoprene copolymer rubber and/or halogenated isobutylene-isoprene copolymer rubber, (e): the component (b) in combination with a tackifier resin (f): the component (b) in combination with a component (f-1) which is an ethylene-propylene (-non-conjugated diene) random copolymer rubber, and a component (f-2) which is an inorganic filler, (g): a component (g-1) and/or (g-2), (g-1): a benzotriazole light stabilizer having a benzotriazole skeleton and having a molecular weight of 100 to 5,000, (g-2): a hindered amine light stabilizer having a piperidyl group in its molecular skeleton and having a molecular weight of about 200 or more, (h): the component (f-1) in combination with the component (b) and/or an ethylene-based polymer having an ethylene content of about 90 mol % or more; and (i): the component (b) and the inorganic filler (f-2).

DETAILED DESCRIPTION OF THE PREFERRED EMBODIMENTS

The present invention will be described below.

The present invention is an olefin-based copolymer composition comprising (a): an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more, and (b): a crystalline α-olefin-based polymer comprising an α-olefin having 3 or more carbon atoms.

In the present invention, the component (a) is an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more.

The α-olefins having 4 to 20 carbon atoms include straight-chain or branched α-olefins, and specifically, examples of the straight-chain α-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadenece, 1-heptadecene, 1-octadecene, 1-nonadecene, 1-eicosene and the like, and examples of the branched α-olefins include 3-methyl-1-butene, 3-methyl-1-pentene, 4-methyl-1-pentene, 2-ethyl-1-hexene, 2,2,4-trimethyl-1-pentene and the like.

Specific examples of the combination of the selected two or more olefins include ethylene/1-butene, ethylene/1-hexene, ethylene/1-octene, ethylene/1-decene, ethylene/1-octadecene, ethylene/4-methyl-1-pentene, propylene-1/butene, propylene/1-hexene, propylene/1-octene, propylene/1-decene, propylene/1-octadecene, propylene/4-methyl-1-pentene, 1-butene/1-hexene, 1-butene/1-octene, 1-butene/1-decene, 1-butene/1-octadecene, 1-butene/4-methyl-1-pentene, 1-hexene/1-octene, 1-hexene/1-decene, 1-hexene/1-octadecene, 1-hexene/4-methyl-1-pentene, 1-octene/1-decene, 1-octene/1-octadecene, 1-octene/4-methyl-1-pentene, 1-decene/1-octadecene, 1-decene/4-methyl-1-pentene, 1-octadecene/4-methyl-1-pentene, ethylene/propylene/1-butene, ethylene/propylene/1-hexene, ethylene/propylene/1-octene, ethylene/propylene/1-decene, ethylene/propylene/1-octadecene, ethylene/propylene/4-methyl-1-pentene, ethylene/1-butene/1-hexene, ethylene/1-butene/1-octene, ethylene/1-butene/1-decene, ethylene/1-butene/1-octadecene, ethylene/1-butene/4-methyl-1-pentene, ethylene/1-hexene/1-octene, ethylene/1-hexene/1-decene, ethylene/1-hexene/1-octadecene, ethylene/1-hexene/4-methyl-1-pentene, ethylene/1-octene/1-decene, ethylene/1-octene/1-octadecene, ethylene/1-octene/4-methyl-1-pentene, ethylene/1-decene/1-octadecene, ethylene/1-decene/4-methyl-1-pentene, ethylene/1-octadecene/4-methyl-1-pentene, propylene/1-butene/1-hexene, propylene/1-butene/1-octene, propylene/1-butene/1-decene, propylene/1-butene/1-octadecene, propylene/1-butene/4-methyl-1-pentene, propylene/1-hexene/1-octene, propylene/1-hexene/1-decene, propylene/1-hexene/1-octadecene, propylene/1-hexene/4-methyl-1-pentene, propylene/1-octene/1-decene, propylene/1-octene/1-octadecene, propylene/1-octene/4-methyl-1-pentene, propylene/1-decene/1-octadecene, propylene/1-decene/4-methyl-1-pentene, propylene/1-octadecene/4-methyl-1-pentene, 1-butene/1-hexene/1-octene, 1-butene/1-hexene/1-decene, 1-decene/1-hexene/1-octadecene, 1-butene/1-hexene/4-methyl-1-pentene, 1-butene/1-octene/1-decene, 1-butene/1-octene/1-octadecene, 1-butene/1-octene/4-methyl-1-pentene, 1-butene/1-decene/1-octadecene, 1-butene/1-decene/4-methyl-1-pentene, 1-butene/1-octadecene/4methyl-1-pentene, ethylene/propylene/1-butene/1-hexene, ethylene/propylene/1-butene/1-octene, ethylene/propylene/1-butene/1-decene, ethylene/propylene/1-butene/1-octadecene, ethylene/propylene/1-butene/4-methyl-1-pentene, ethylene/1-butene/1-hexene/1-octene, ethylene/1-butene/1-hexene/1-decene, ethylene/1-butene/1-hexene/1-octadecene, ethylene/1-butene/1-hexene/4-methyl-1-pentene, ethylene/propylene/1-hexene/1-octene, ethylene/propylene/1-hexene/1-decene, ethylene/propylene/1-hexene/1-octadecene, ethylene/propylene/1-hexene/4-methyl-1-pentene and the like.

The component (a) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. The above-described "two or more olefins" and "cyclic olefin" are different moieties from each other.

As preferable cyclic olefins, cyclic monoolefins and cyclic polyenes are mentioned.

The cyclic olefin is a cyclic compound having one or more rings formed by 4 or more carbon atoms, and having at least one or more carbon-carbon double bonds in the molecule. The cyclic olefin may have various substituents. As regards a specific structure for the cyclic olefin, compounds represented by the following general formulas [IV] to [VI] are exemplified.

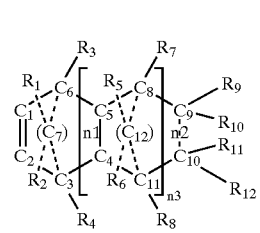

[IV]

[V]

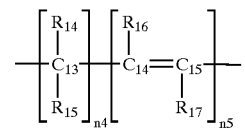

[VI]

wherein, $n_1$ to $n_5$ represent an integer of 0 or more; $C_1$ to $C_{15}$ are a carbon atom, and $C_1$ to $C_2$ form a polymerizable double bond; $R_1$ to $R_{12}$ and $R_{14}$ to $R_{17}$ represent a substituent selected from the group consisting of a hydrogen atom, halogen atoms, a hydroxyl group, amino groups and organic groups having 1 to 20 carbon atoms; in the general formula [IV], $C_3$ and $C_6$, and $C_8$ and $C_{11}$ can also be connected via $(C_7)n_1$, and $(C_{12})n_2$ respectively. $R_9$, $R_{10}$ and $R_{11}$, $R_{12}$ can also be connected via the structural formula [IV]; and in the general [V], the structural formula [VI] can he selected as $R_{13}$ to form a cyclic structure, Such that in this case, $n_4$ and $n_5$ in the structural formula [VI] are selected from integers of 0 or more, such that the resulting cyclic olefin has 4 or more carbon atoms.

Specific examples of the organic group having 1 to 20 carbon atoms which is a member of the substituents indicated for $R_1$ to $R_{12}$ and $R_{14}$ to $R_{17}$ include alkyl groups such as a methyl group, ethyl group, propyl group, butyl group, hexyl group, octyl group, dodecyl group and the like; aryl groups such as a phenyl group, tolyl group, naphthyl group and the like; aralkyl groups such as a benzyl group, phenethyl group and the like; alkylidene groups such as a methylidene group, ethylidene group and the like; alkenyl groups such as a vinyl group, allyl group and the like; alkoxy groups such as a methoxy group, ethoxy group and the like; aryloxy groups such as a phenoxy group and the like; acyl groups such as an acetyl group and the like; alkoxycarbonyl groups such as a methoxycarbonyl group, ethoxycarbonyl group and the like; acyloxy groups such as an acetyloxy group and the like; (substituted) silyl groups such as a trimethylsilyl group and the like; and groups obtained by substitution of a halogen atom, hydroxyl group, amino group, acyl group, carboxyl group, alkoxy group, alkoxycarbonyl group, acyloxy group, (substituted) silyl group, alkylamino group or cyano group for a part of hydrogen atoms on the above-described alkyl group, aryl group and aralkyl group.

Specific examples of the cyclic olefin compound represented by the general formula [IV] include norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2,-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxynorbornene anhydrate, 5-dimethylaminonorbornene, 5-cyanonorbornene and the like.

Examples of the cyclic olefin compound represented by the general formula [V] include cyclopentene, 3-methylcyclopentene, 4-methylcyclopentene, 3,4-dimethylcyclopentene, 3,5-dimetylcyclopentene, 3-chlorocyclopentene, cyclohexene, 3-methylcyclohexene, 4-methylcyclohexene, 3,4-dimethylcyclohexene, 3-chlorocyclohexene, cycloheptene and the like.

Specific examples of the compound represented by the general formula [IV] having two or more carbon-carbon double bonds in the cyclic olefin molecule include 5-ethylidene-2-norbornene, 5-methylene-2-norbornene, 5-isopropylidene-2-norbornene, 3-vinylcyclohexene, 4-vinylcyclohexene, 5-vinylnorbornene, 5-allylnorbornene, 5,6-diethylidene-2-norbornene, dicyclopentadiene, dimethylcyclopentadiene, 2,5-norbornadiene and the like, and specific examples of the cyclic polyene compound represented by the general formula [V] include 1,3-cyclopentadiene, 1,3-cylohexadiene, 1,4-cyclohexadiene, 5-ethyl-1,3-cyclohexadiene, 1,3-cycloheptadiene, 1,3-cyclooctadiene and the like.

The content of the cyclic olefin in the component (a) is preferably from about 0.01 to 20 mol %, more preferably from about 0.15 to 15 mol %, even more preferably from about 0.1 to 10 mol %, particularly preferably from about 0.15 to 5 mol %.

Propylene, or ethylene and propylene can be contained as the olefin in the component (a).

The content of ethylene as the olefin in the component (a) is preferably about 90 mol % or less, more preferably about 80 mol % or less, even more preferably about 70 mol % or less, particularly preferably about 60 mol % or less, most preferably about 50 mol % or less, in view of effectively improving the flexibility of the olefin-based copolymer composition.

On the other hand, particularly when lower temperature resistance is required, the propylene content in the component (a) is preferably about 90 mol % or less, more preferably about 80 mol % or less, even more preferably about 70 mol % or less, particularly preferably about 60 mol % or less, most preferably about 50 mol % or less.

The component preferably satisfies the following formula:

$$[y/(x+y)] \geq 0.2,$$

more preferably the formula:

$$[y/(x+y)] \geq 0.3,$$

still more preferably the formula:

$$[y/(x+y)] \geq 0.4,$$

and most preferably the formula:

$$[y/(x+y)] \geq 0.5.$$

In the above-described formulae, x represents a mol content of ethylene in the copolymer, and y represents the total mol content of α-olefins having 4 to 20 carbon atoms in the copolymer.

The component (a) has an intrinsic viscosity [η] measured by using a tetralin solvent at a temperature of 135° C. preferably of 0.3 to 10, more preferably of 0.5 to 7, further preferably of 0.7 to 5. Measurement of the intrinsic viscosity [η] is conducted in tetralin at 135° C. using a Ubbelohde viscometer. 300 mg of the sample is dissolved in 100 ml of tetralin to prepare a solution having a concentration of 3 mg/ml. This solution is further diluted to ½, ⅓ and ⅕, and the resulting diluted solutions are subjected to measurement in a thermostatic oil bath at 135° C. (±0.1° C.). The measurement is repeated 3 times at respective concentrations, and the average of the resulting values is taken.

The component (a) preferably has a molecular weight distribution (Mw/Mn) measured by gel permeation chromatography (GPC) of 3 or less. The molecular weight distribution is measured by a gel permeation chromatography method (for example, using a 150C/GPC apparatus manufactured by Waters Corporation). The elution temperature is 140° C., for example, a Shodex Packed Column A-80M manufactured by Showa Denko K.K. is used as a column, and a polystyrene (for example, that having a molecular weight from 68 to 8,400,000 manufactured by Tosoh Corp.) is used as a molecular weight standard substance. The weight-average molecular weight in terms of a polystyrene and the number average molecular weight are measured, and the molecular weight distribution (Mw/Mn) is calculated. About 5 mg of a polymer is dissolved in 5 ml of o-dichlorobenzene to prepare a sample to be measured having a concentration of about 1 mg/ml. 400 μl of the resulting sample solution is injected, and the molecular weight is detected by a refractive index detector at an eultion solvent flow rate of 1.0 ml/min.

It is preferable that the component (a) has neither a peak of 1 J/g or more based on melting of a crystal nor a peak of 1 J/g or more based on crystallization when measured by differential scanning calorimetry (DSC). DSC220 manufactured by Seiko Instruments Inc. is used as the differential scanning calorimeter in the present application, and the measurement is conducted at a speed of 10° C./min in both the temperature raising process and temperature lowering process.

The component (a) can be produced by using a known Ziegler-Natta type catalyst or metallocene-based catalyst. A metallocene-based catalyst is preferably used since a copolymer is obtained having high molecular weight, narrow molecular weight distribution and narrow composition distribution. As the metallocene-based catalyst, there may be mentioned complexes of a transition metal of group IVA to group VIA of the periodic table of element, containing at least one cyclopentadienyl skeleton. As specific examples of the metallocene-based catalyst, there may be, for example, listed metallocene-based catalysts described in JP-A Nos. 9-12635 and 9-151205 which are incorporated herein by reference in their entirety.

Particularly, in the component (a), it is preferable that the configuration of the propylene and/or the α-olefin side chain having 4 to 20 carbon atoms is an atactic structure. In order to provide atactic stereoregularity in a copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a catalyst for olefin polymerization composed of the following component (A), component (B) and/or component (C).

(A): at least one transition metal complex represented by the following formula [I], [II] or [III]:

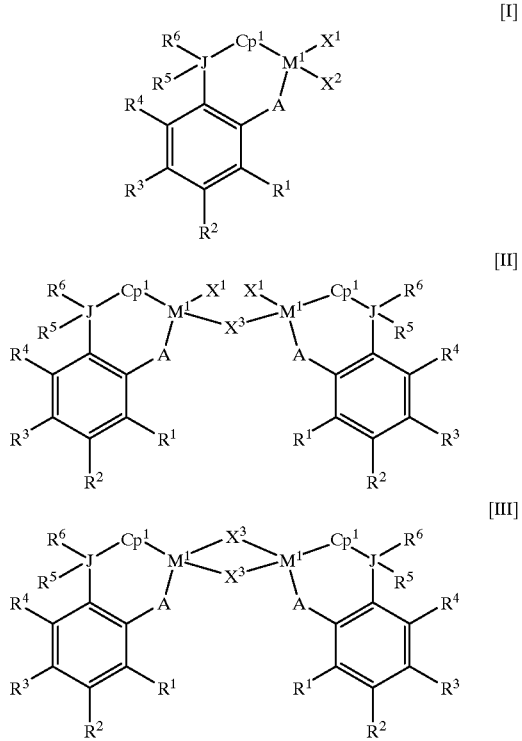

wherein $M^1$ represents a transition metal atom of group IV in the Periodic Table of the Elements; A represents an atom of group XVI in the Periodic Table of the Elements; J represents an atom of group XIV in the Periodic Table of the Elements; $Cp^1$ represents a group having a cyclopentadiene type anion skeleton; $X^1$, $X^2$, $R^1$, $R^2$, $R^3$, $R^4$, $R^5$ and $R^6$ independently represent a hydrogen atom, a halogen atom, an alkyl group, an aralkyl group, an aryl group, a substituted silyl group, an alkoxy group, an aralkyloxy group, an aryloxy group, or a disubstituted amino group; and $R^1$, $R^2$, $R^3$, $R^4$, $R^5$ and $R^6$ may be combined optionally to form a ring.

$X^3$ represents an atom of group XVI in the Periodic Table of Elements; Two of $M^1$, A, J, $Cp^1$, $X^1$, $X^2$, $X^3$, $R^1$, $R^2$, $R^3$, $R^4$, $R^5$ and $R^6$ may be the same or different:

(B): one or more of aluminum compounds selected from the following (B1)-(B3):

(B1) An organoaluminum compound represented by the general formula $E^1{}_a AlZ_{3-a}$, (B2) cyclic aluminoxane represented by the general formula $\{-Al(E^2)-O-\}_b$ and (B3) linear aluminoxane represented by the general formula $E^3\{-Al(E^3)-O-\}_c AlE^3{}_2$ (wherein $E^1$, $E^2$ and $E^3$ respectively represent a hydrocarbon group and each of the $E^1$, $E^2$ and $E^3$ groups may be the same or different; Z represents a hydrogen atom or a halogen atom and each of the Z groups may be the same or different; a satisfies the following equation: $0 < a \leq 3$; b represents an integer of 2 or more; and c represents an integer of 1 or more.)

(C): any one boron compound of the following (C1)-(C3):

(C1) a boron compound represented by the general formula $BQ^1Q^2Q^3$, (C2) a boron compound represented by the general formula $G^+(BQ^1Q^2Q^3Q^4)^-$ and (C3) a boron compound represented by the general formula $(L-H)^+(BQ^1Q^2Q^3Q^4)^-$ (wherein B represents a trivalent boron atom in the valence state; $Q^1$ to $Q^4$ may each be the same or different and represent a halogen atom, a hydrocarbon group, a halogenated hydrocarbon group, a substituted silyl group, an alkoxy group or a disubstituted amino group; $G^+$ is an inorganic or organic cation; L is a neutral Lewis base; and $(L-H)^+$ is a Bronsted acid.)

Hereinafter, the present invention will be described in more detail.

(A) Transition metal complex is explained.

In the general formula [I], [II] and [III], the transition metal atom represented by $M^1$ is a transition metal element of group IV in the Periodic Table of the Elements (Revised Version 1989 of IUPAC, Inorganic Chemistry Nomenclature) and examples thereof include a titanium atom, a zirconium atom, a hafnium atom, or the like, preferably a titanium atom or a zirconium atom.

Examples of the atom of the group XVI in the Periodic Table of the element represented by "A" in the general formula [I], [II] or [III] include an oxygen atom, a sulfur atom, a selenium atom, etc., and preferably an oxygen atom.

Examples of the atom of group XIV in the Periodic Table of the element represented by "J" in the general formula [I], [II] or [III] include a carbon atom, a silicon atom, a germanium atom and the like, preferably a carbon atom or a silicon atom.

Examples of the group having a cyclopentadiene type anion skeleton represented by the substituent $Cp^1$ include a η⁵-(substituted)cyclopentadienyl group, η⁵-(substituted)indenyl group, η⁵-(substituted)fluorenyl group, etc. Examples thereof are η⁵-cyclopentadienyl group, η⁵-methylcyclopentadienyl group, η⁵-dimethylcyclopentadienyl group, η⁵-trimethylcyclopentadienyl group, η⁵-tetramethylcyclopentadienyl group, η⁵-ethylcyclopentadienyl group, η⁵-n-propylcyclopentadienyl group, η⁵-isopropylcyclopentadienyl group, η⁵-n-butylcyclopentadienyl group, η⁵-sec-butylcyclopentadienyl group, η⁵-tert-butylcyclopentadienyl group, η⁵-n-pentylcyclopentadienyl group, $\eta^5$-neopentylcyclopentadienyl group, $\eta^5$-n-hexylcyclopentadienyl group, $\eta^5$-n-octylcyclopentadienyl group, $\eta^5$-n-phenylcyclopentadienyl group, $\eta^5$-naphthylcyclopentadienyl group, $\eta^5$-trimethylsilylcyclopentadienyl group, $\eta^5$-triethylsilylcyclopentadienyl group, $\eta^5$-tert-butyldimethylsilylcyclopentadienyl group, $\eta^5$-indenyl group, $\eta^5$-methylindenyl group, $\eta^5$-dimethylindenyl group, $\eta^5$-methylindenyl group, $\eta^5$-n-propylindenyl group, $\eta^5$-isopropylindenyl group, $\eta^5$-n-butylindenyl group, $\eta^5$-sec-butylindenyl group, $\eta^5$-tert-butylindenyl group, $\eta^5$-n-pentylindenyl group, $\eta^5$-neopentylindenyl group, $\eta^5$-n-hexylindenyl group, $\eta^5$-n-octylindenyl group, $\eta^5$-n-decylindenyl group, $\eta^5$-phenylindenyl group, $\eta^5$-methylphenylindenyl group, $\eta^5$-naphthylindenyl group, $\eta^5$-trimethylsilylindenyl group, $\eta^5$-triethylsilylindenyl group, $\eta^5$-tert-butyldimethylsilylindenyl group, $\eta^5$-tetrahydroindenyl group, $\eta^5$-fluorenyl group, $\eta^5$-methylfluorenyl group, $\eta^5$-dimethylfluorenyl group, $\eta^5$-ethylfluorenyl group, $\eta^5$-diethylfluorenyl group, $\eta^5$-n-propylfluorenyl group, $\eta^5$-di-n-propylfluorenyl group, $\eta^5$-isopropylfluorenyl group, $\eta^5$-diisopropylfluorenyl group, $\eta^5$-n-butylfluorenyl group, $\eta^5$-sec-butylfluorenyl group, $\eta^5$-tert-butylfluorenyl group, $\eta^5$-di-n-butylfluorenyl group, $\eta^5$-di-sec-butylfluorenyl group, $\eta^5$-di-tert-butylfluorenyl group, $\eta^5$-n-pentylfluorenyl group, $\eta^5$-neopentylfluorenyl group, $\eta^5$-n-hexylfluorenyl group, $\eta^5$-n-octylfluorenyl group, $\eta^5$-n-decylfluorenyl group, $\eta^5$-n-dodecylfluorenyl group, $\eta^5$-phenylfluorenyl group, $\eta^5$-di-phenylfluorenyl group, $\eta^5$-methylphenylfluorenyl group, $\eta^5$-naphthylfluorenyl group, $\eta^5$-trimethylsilylfluorenyl group, $\eta^5$-bis-trimethylsilylfluorenyl group, $\eta^5$-triethylsilylfluorenyl group, $\eta^5$-tert-butyldimethylsilylfluorenyl group, etc., preferably a $\eta^5$-cyclopentadienylgroup, $\eta^5$-methylcyclopentadienyl group, $\eta^5$-tert-butylcyclopentadienyl group, $\eta^5$-tetramethylcyclopentadienyl group, $\eta^5$-indenyl group and $\eta^5$-fluorenyl group.

Examples of the halogen atom in the substituents $X^1$, $X^2$, $R^1$, $R^2$, $R^3$, $R^4$, $R^5$ and $R^6$ include a fluorine atom, chlorine atom, bromine atom, iodine atom and the like, preferably a chlorine atom or a bromine atom, more preferably a chlorine atom.

As the alkyl group in the substituents $X^1$, $X^2$, $R^1$, $R^2$, $R^3$, $R^4$, $R^5$ and $R^6$, an alkyl group having carbon atoms of 1–20 in is preferable. Examples of such an alkyl group include methyl group, ethyl group, n-propyl group, isopropyl group, n-butyl group, sec-butyl group, tert-butyl group, n-pentyl group, neopentyl group, amyl group, n-hexyl group, n-octyl group, n-decyl group, n-dodecyl group, n-pentadecyl group, n-eicosyl group, etc., preferably a methyl group, ethyl group, isopropyl group, tert-butyl group or amyl group.

These alkyl groups may be substituted with a halogen atom such as a fluorine atom, chlorine atom, bromine atom, iodine atom or the like. Examples of alkyl groups having 1–20 carbon atoms substituted with halogen atom(s) include a fluoromethyl group, difluoromethyl group, trifluoromethyl group, chloromethyl group, dichloromethyl group, trichloromethyl group, bromomethyl group, dibromomethyl group, tribromomethyl group, iodomethyl group, diiodomethyl group, triiodomethyl group, fluoroethyl group, difluoroethyl group, trifluoroethyl group, tetrafluoroethyl group, pentafluoroethyl group, chloroethyl group, dichloroethyl group, trichloroethyl group, tetrachloroethyl group, pentachloroethyl group, bromoethyl group, dibromoethyl group, tribromoethyl group, tetrabromoethyl group, pentabromoethyl group, perfluoropropyl group, perfluorobutyl group, perfluoropentyl group, perfluorohexyl group, perfluorooctyl group, perfluorododecyl group, perfluoropentadecyl group, perfluoroeicosyl group, perchloropropyl group, perchlorobutyl group, perchloropentyl group, perchlorohexyl group, perchlorooctyl group, perchlorododecyl group, perchloropentadecyl group, perchloroeicosyl group, perbromopropyl group, perbromobutyl group, perbromopentyl group, perbromohexyl group, perbromooctyl group, perbromododecyl group, perbromopentadecyl group, perbromoeicosyl group or the like.

These alkyl groups may be partially substituted by an alkoxy group such as a methoxy group, ethoxy group, an aryloxy group (such as phenoxy group), or aralkyloxy group (such as benzyloxy group), etc.

As the aralkyl group in the substituents $X^1$, $X^2$, $R^1$, $R^2$, $R^3$, $R^4$, $R^5$ and $R^6$, an aralkyl group having 7–20 carbon atoms is preferable. Examples of such aralkyl groups include a benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (4,6-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (n-pentylphenyl)methyl group, (neopentylphenyl)methyl group, (n-hexylphenyl)methyl group, (n-octylphenyl)methyl group, (n-decylphenyl)methyl group, (n-dodecylphenyl)methyl group, (n-tetradecylphenyl)methyl group, naphthylmethyl group, anthracenylmethyl group, etc., and preferably a benzyl group.

These aralkyl groups may be partially substituted with a halogen atom such as a fluorine atom, chlorine atom, bromine atom, iodine atom, alkoxy group such as a methoxy, ethoxy, aryloxy group (such as phenoxy), or aralkyloxy group (such as benzyloxy), or the like.

As the aryl group in the substituents $X^1$, $X^2$, $R^1$, $R^2$, $R^3$, $R^4$, $R^5$ and $R^6$, the aryl group having 6–20 carbon atoms is preferable. Examples of such aryl groups include a phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, etc., and preferably a phenyl group.

These aryl groups may be partially substituted with a halogen atom such as fluorine atom, chlorine atom, bromine atom, iodine atom, alkoxy group such as a methoxy, ethoxy, aryloxy group (such as phenoxy), or aralkyloxy group (such as benzyloxy), and the like.

The substituted silyl group in the substituents $X^1$, $X^2$, $R^1$, $R^2$, $R^3$, $R^4$, $R^5$ and $R^6$ is a silyl group substituted with a hydrocarbon group, and examples of the hydrocarbon group include an alkyl group having 1–10 carbon atoms such as methyl group, ethyl group, n-propyl group, isopropyl group, n-butyl group, sec-butyl group, tert-butyl group, isobutyl group, n-pentyl group, n-hexyl group, cyclohexyl group, etc.; and an aryl group (such as phenyl group), etc. Examples of the substituted silyl group having 1–20 carbon atoms include a monosubstituted silyl group having 1–20 carbon atoms such as a methylsilyl group, ethylsilyl group, phenylsilyl group, etc.; a disubstituted silyl group having 2–20 carbon atoms such as dimethylsilyl group, diethylsilyl group, diphenylsilyl group, etc.; and a trisubstituted silyl group having 3–20 carbon atoms such as trimethylsilyl group, triethylsilyl group, tri-n-propylsilyl group, triisopropylsilyl group, tri-n-butylsilyl group, tri-sec-butylsilyl group, tri-tert-butylsilyl group, tri-isobutylsilyl group, tert-butyl-dimethylsilyl group, tri-n-pentylsilyl group, tri-n-hexylsilyl group, tricyclohexylsilyl group, triphenylsilyl group, etc., and preferably a trimethylsilyl group, tert-butyldimethylsilyl group or triphenylsilyl group.

The hydrocarbon group of these substituted silyl groups may be substituted with a halogen atom such as a fluorine atom, chlorine atom, bromine atom, iodine atom and the like; and/or an alkoxy group such as methoxy, ethoxy, aryloxy group (such as phenoxy), or aralkyloxy group (such as benzyloxy), and the like.

With respect to the alkoxy group in the substituents $X^1$, $X^2$, $R^1$, $R^2$, $R^3$, $R^4$, $R^5$ and $R^6$, an alkoxy group having 1–20 carbon atoms is preferable. Examples of such alkoxy groups include a methoxy group, ethoxy group, n-propoxy group, isopropoxy group, n-butoxy group, sec-butoxy group, t-butoxy group, n-pentoxy group, neopentoxy group, n-hexoxy group, n-octoxy group, n-dodexoxy group, n-pentadecoxy group, n-icosoxy group, etc., and preferably a methoxy group, ethoxy group or t-butoxy group.

These alkoxy groups may be partially substituted with a halogen atom such as a fluorine atom, chlorine atom, bromine atom, iodine atom and the like; an alkoxy group such as methoxy, ethoxy, aryloxy group (such as phenoxy), or aralkyloxy group (such as benzyloxy), and the like.

With respect to the aralkyloxy group in the substituents $X^1$, $X^2$, $R^1$, $R^2$, $R^3$, $R^4$, $R^5$ and $R^6$, an aralkyloxy group having 7–20 carbon atoms is preferable. Examples of the aralkyloxy group include a benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trimethylphenyl)methoxy group, (2,4,5-trimethylphenyl)methoxy group, (2,4,6-trimethylphenyl)methoxy group, (3,4,5-trimethylphenyl)methoxy group, (2,3,4,5-tetramethylphenyl)methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl)methoxy group, (tert-butylphenyl)methoxy group, (n-hexylphenyl)methoxy group, (n-octylphenyl)methoxy group, (n-decylphenyl)methoxy group, (n-tetradecylphenyl)methoxy group, naphthylmethoxy group, anthracenyl-methoxy group, etc., and preferably a benzyloxy group.

These aralkyloxy groups may be partially substituted with a halogen atom such as fluorine atom, chlorine atom, bromine atom, iodine atom and the like; an alkoxy group such as methoxy, ethoxy, aryloxy group (such as phenoxy), an aralkyloxy group (such as benzyloxy), and the like.

Examples of the aryloxy group in the substituents $X^1$, $X^2$, $R^1$, $R^2$, $R^3$, $R^4$, $R^5$ and $R^6$ include an aryloxy group having 6–20 carbon atoms such as a phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,6-trimethylphenoxy group, 2,4,5-trimethylphenoxy group, 2,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenyl group, ethylphenoxy group, n-propylphenoxy group, isopropylphenoxy group, n-butylphenoxy group, sec-butylphenoxy group, tert-butylphenoxy group, n-hexylphenoxy group, n-octylphenoxy group, n-decylphenoxy group, n-tetradecylphenoxy group, naphthoxy group, anthracenoxy group and the like.

These aryloxy groups may be partially substituted with a halogen atom such as a fluorine atom, chlorine atom, bromine atom, iodine atom and the like, an alkoxy group such as methoxy, ethoxy, aryloxy group (such as phenoxy), or an aralkyloxy group (such as benzyloxy), and the like.

The disubstituted amino group in the substituents $X^1$, $X^2$, $R^1$, $R^2$, $R^3$, $R^4$, $R^5$ and $R^6$ is an amino group substituted with two hydrocarbon groups. Examples of the hydrocarbon group include an alkyl group having 1–10 carbon atoms such as a methyl group, ethyl group, n-propyl group, isopropyl group, n-butyl group, sec-butyl group, tert-butyl group, isobutyl group, n-pentyl group, n-hexyl group, cyclohexyl group, etc.; an aryl group having 6–10 carbon atoms (such as phenyl group); an aralkyl group having 7–10 carbon atoms etc. Examples of the amino group disubstituted with hydrocarbon groups having 1–10 carbon atoms include a dimethylamino group, diethylamino group, di-n-propylamino group, diisopropylamino group, di-n-butylamino group, di-sec-butylamino group, di-tert-butylamino group, di-isobutylamino group, tert-butylisopropylamino group, di-n-hexylamino group, di-n-octylamino group, di-n-decylamino group, diphenylamino group, bistrimethylsilylamino group, bis-tert-butyldimethylsilylamino group, etc., and preferably a dimethylamino group or diethylamino group.

These disubstituted amino groups may be substituted partly with a halogen atom such as a fluorine atom, chlorine atom, bromine atom, iodine atom and the like; an alkoxy group such as methoxy group, ethoxy group and the like; an aryloxy group (such as phonoxy group) and the like; or an aralkyloxy group (such as benzyloxy group) and the like.

The substituents $R^1$, $R^2$, $R^3$, $R^4$, $R^5$ and $R^6$ may be optionally combined to form a ring.

$R^1$ is preferably an alkyl group, an aralkyl group, an aryl group, or a substituted silyl group.

$X^1$ and $X^2$ independently and preferably represent a halogen atom, an alkyl group, an aralkyl group, an alkoxy group, an aryloxy group, or a disubstituted amino group, more preferably a halogen atom or an alkoxy group.

Examples of the atom of group XVI in the Periodic Table include an oxygen atom, sulfur atom, selenium atom, and preferably oxygen atom.

Examples of the transition metal complex represented by the general formula [I] include: methylene (cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy)titanium dichloride, methylene(methylcyclopentadienyl)(3-tert-butyl-5-methyl-2-phenoxy)titanium dichloride, methylene(methylcyclopentadienyl)(3-phenyl-2-phenoxy)titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy)titanium dichloride, methylene(tert-butylcyclopentadienyl)(3,5-dimethyl-2-phenoxy)titanium dichloride, methylene(tert-butylcyclopentadienyl)(3-tert-butyl-2-phenoxy)titanium dichloride, methylene(tert-butylcyclopentadienyl)(3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene(tetramethylcyclopentadienyl)(3-tert-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert-butyl-2-phenoxy)titanium dichloride, methylene(trimethylsilylcyclopentadienyl)(3-tert-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert-butyl-5-methoxy-2-phenoxy)titanium dichloride, methylene(trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene(fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert-butyl-2-phenoxy)titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene(tetramethylcyclopentadienyl)(3-tert-butyl-5-methoxy-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert-butyl-2-phenoxy)titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy)titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy) titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, etc., transition metal complexes wherein J in the chemical formula [I] is a carbon atom, such as compounds wherein titanium of these compounds is replaced by zirconium or hafnium, compounds wherein the dichloride of these compounds is replaced by dibromide, diiodide, bis (dimethylamide), bis(diethylamide), di-n-butoxide or diisopropoxide, compounds wherein cyclopentadienyl of these compounds is replaced by dimethylcyclopentadienyl, trimethylcyclopentadienyl, n-butylcyclopentadienyl, tert-butyldimethylsilylcyclopentadienyl or indenyl, and compounds wherein 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy or 3-trimethylsilyl-2-phenoxy; and dimethylsilyl(cyclopentadienyl)(2-phenoxy)titanium dichloride, dimethylsilyl(cyclopentadienyl)(3-methyl-2-phenoxy)titanium dichloride, dimethylsilyl(cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl(cyclopentadienyl)(3-tert-butyl-5-methyl-2-phenoxy)titanium dichloride, dimethylsilyl(cyclopentadienyl)(3,5-di-tert-butyl-2-phenoxy)titanium dichloride, dimethylsilyl(cyclopentadienyl)(5-methyl-3-phenyl-2-phenoxy)titanium dichloride, dimethylsilyl(cyclopentadienyl)(3-tert-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl)(3-tert-butyl-5-methoxy-2-phenoxy)titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy)titanium dichloride, dimethylsilyl(methylcyclopentadienyl)(2-phenoxy)titanium dichloride, dimethylsilyl(methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl(methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,5-di-tert-butyl-2-phenoxy)titanium dichloride, dimethylsilyl(methylcyclopentadienyl)(5-methyl-3-phenyl-2-phenoxy)titanium dichloride, dimethylsilyl(methylcyclopentadienyl)(3-tert-butyldimethylsilyl-5-methyl-2-phenoxy)titanium dichloride, dimethylsilyl(methylcyclopentadienyl)(5-methyl-3-trimethylsilyl-2-phenoxy)titanium dichloride, dimethylsilyl(methylcyclopentadienyl)(3-tert-butyl-5-methoxy-2-phenoxy)titanium dichloride, dimethylsilyl(methylcyclopentadienyl)(3-tert-butyl-5-chloro-2-phenoxy)titanium dichloride, dimethylsilyl(methylcyclopentadienyl)(3,5-diamyl-2-phenoxy)titanium dichloride, dimethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy)titanium dichloride, dimethylsilyl(n-butylcyclopentadienyl)(3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy)titanium dichloride, dimethylsilyl(n-butylcyclopentadienyl)(3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy)titanium dichloride, dimethylsilyl(tert-butylcyclopentadienyl)(3,5-di-tert-butyl-2-phenoxy)titanium dichloride, dimethylsilyl(tert-butylcyclopentadienyl)(5-methyl-3-phenyl-2-phenoxy)titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy)titanium dichloride, dimethylsilyl(tert-butylcyclopentadienyl)(3-tert-butyl-5-chloro-2-phenoxy)titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl(tetramethylcyclopentadienyl)(3-methyl-2-phenoxy)titanium dichloride, dimethylsilyl(tetramethylcyclopentadienyl)(3,5-dimethyl-2-phenoxy)titanium dichloride, dimethylsilyl(tetramethylcyclopentadienyl)(3-tert-butyl-2-phenoxy)titanium dichloride, dimethylsilyl(tetramethylcyclopentadienyl)(3-tert-butyl-5-methyl-2-phenoxy)titanium dichloride, dimethylsilyl(tetramethylcyclopentadienyl)(3,5-di-tert-butyl-2-phenoxy)titanium dichloride, dimethylsilyl(tetramethylcyclopentadienyl)(5-methyl-3-phenyl-2-phenoxy)titanium dichloride, dimethylsilyl(tetramethylcyclopentadienyl)(3-tert-butyldimethylsilyl-5-methyl-2-phenoxy)titanium dichloride, dimethylsilyl(tetramethylcyclopentadienyl)(5-methyl-3-trimethylsilyl-2-phenoxy)titanium dichloride, dimethylsilyl(tetramethylcyclopentadienyl)(3-tert-butyl-5-methoxy-2-phenoxy)titanium dichloride, dimethylsilyl(tetramethylcyclopentadienyl)(3-tert-butyl-5-chloro-2-phenoxy)titanium dichloride, dimethylsilyl(tetramethylcyclopentadienyl)(3,5-diamyl-2-phenoxy)titanium dichloride, dimethylsilyl(trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl(trimethylsilylcyclopentadienyl)(3,5-dimethyl-2-phenoxy)titanium dichloride, dimethylsilyl(trimethylsilylcyclopentadienyl)(3-tert-butyl-2-phenoxy)titanium dichloride, dimethylsilyl(trimethylsilylcyclopentadienyl)(3-tert-butyl-5-methyl-2-phenoxy)titanium dichloride, dimethylsilyl(trimethylsilylcyclopentadienyl)(3,5-di-tert-butyl-2-phenoxy)titanium dichloride, dimethylcyclopentadienyl)(5-methyl-3-phenyl-2-phenoxy)titanium dichloride, dimethylsilyl(trimethylsilylcyclopentadienyl)(3-tert-butyldimethylsilyl-5-methyl-2-phenoxy)titanium dichloride, dimethylsilyl(trimethylsilylcyclopentadienyl)(5-methyl-3-trimethylsilyl-2-phenoxy)titanium dichloride, dimethylsilyl(trimethylsilylcyclopentadienyl)(3-tert-butyl-5-methoxy-2-phenoxy)titanium dichloride, dimethylsilyl(trimethylsilylcyclopentadienyl)(3-tert-butyl-5-chloro-2-phenoxy)titanium dichloride, dimethylsilyl(trimethylsilylcyclopentadienyl)(3,5-diamyl-2-phenoxy)titanium dichloride, dimethylsilyl(indenyl)(2-phenoxy)titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl(indenyl)(3-tert-butyl-2-phenoxy)titanium dichloride, dimethylsilyl(indenyl)(3-tert-butyl-5-methyl-2-phenoxy)titanium dichloride, dimethylsilyl(indenyl)(3,5-di-tert-butyl-2-phenoxy)titanium dichloride, dimethylsilyl(indenyl)

(5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy) titanium dichloride, dimethylsilyl(indenyl)(3-tert-butyl-5-chloro-2-phenoxy)titanium dichloride, dimethylsilyl (indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl (fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl (fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(tetramethylcyclopentadienyl)(1-naphthoxy-2-il)titanium dichloride, etc., the compounds wherein the (cyclopentadienyl) of these compounds have been changed to (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilyl cyclopentadienyl), (phenylcyclopentadienyl), (methylindenyl), or (phenylindenyl); the compounds wherein (2-phenoxy) has been changed to (3-phenyl 2-phenoxy), (3-trimethylsilyl-2-phenoxy), or (3-tert-butyl dimethylsilyl-2-phenoxy); the compounds wherein dimethyl silyl has been changed to diethyl silyl, diphenyl silyl, or dimethoxy silyl; the compounds wherein titanium has been changed to zirconium or hafnium; the compounds wherein dichloride has been changed to dibromide, diiodide, bis(dimethylamide), bis (diethylamide), di-n-buthoxide, or diisopropoxide, which are transition metal complexes wherein J in the chemical formula [I] is an atom of the group XIV in the Periodic Table of the elements other than the carbon atoms.

Examples of the transition metal complex represented by the general formula [II] include:

$\mu$-oxo bis{isopropylidene(cyclopentadienyl)(2-phenoxy) titanium chloride}, $\mu$-oxo bis{isopropylidene(cyclopentadienyl)(2-phenoxy) titanium methoxide}, $\mu$-oxo bis{isopropylidene(cyclopentadienyl)(3-tert-butyl-5-methyl-2-phenoxy)titanium chloride}, $\mu$-oxo bis{isopropylidene(cyclopentadienyl)(3-tert-butyl-5-methyl-2-phenoxy)titanium methoxide}, $\mu$-oxo bis{isopropylidene(methylcyclopentadienyl)(2-phenoxy)titanium chloride}, $\mu$-oxo bis{isopropylidene(methylcyclopentadienyl)(2-phenoxy)titanium methoxide}, $\mu$-oxo bis{isopropylidene(methylcyclopentadienyl)(3-tert-butyl-5-methyl-2-phenoxy)titanium chloride}, $\mu$-oxo bis{isopropylidene(methylcyclopentadienyl)(3-tert-butyl-5-methyl-2-phenoxy)titanium methoxide}, $\mu$-oxo bis{isopropylidene(tetramethylcyclopentadienyl)(2-phenoxy)titanium chloride}, $\mu$-oxo bis{isopropylidene(tetramethylcyclopentadienyl)(2-phenoxy)titanium methoxide}, $\mu$-oxo bis{isopropylidene(tetramethylcyclopentadienyl)(3-tert-butyl-5-methyl-2-phenoxy)titanium chloride}, $\mu$-oxo bis{isopropylidene(tetramethylcyclopentadienyl)(3-tert-butyl-5-methyl-2-phenoxy)titanium methoxide}, $\mu$-oxo bis{dimethylsilylene(cyclopentadienyl)(2-phenoxy) titanium chloride}, $\mu$-oxo bis{dimethylsilylene(cyclopentadienyl)(2-phenoxy) titanium methoxide}, $\mu$-oxo bis{dimethylsilylene(cyclopentadienyl)(3-tert-butyl-5-methyl-2-phenoxy)titanium chloride}, $\mu$-oxo bis{dimethylsilylene(cyclopentadienyl)(3-tert-butyl-5-methyl-2-phenoxy)titanium methoxide}, $\mu$-oxo bis{dimethylsilylene(methylcyclopentadienyl)(2-phenoxy)titanium chloride}, $\mu$-oxo bis{dimethylsilylene(methylcyclopentadienyl)(2-phenoxy)titanium methoxide}, $\mu$-oxo bis{dimethylsilylene(methylcyclopentadienyl)(3-tert-butyl-5-methyl-2-phenoxy)titanium chloride}, $\mu$-oxo bis{dimethylsilylene(methylcyclopentadienyl)(3-tert-butyl-5-methyl-2-phenoxy)titanium methoxide}, $\mu$-oxo bis{dimethylsilylene(tetramethylcyclopentadienyl) (2-phenoxy)titanium chloride}, $\mu$-oxo bis{dimethylsilylene(tetramethylcyclopentadienyl) (2-phenoxy)titanium methoxide}, $\mu$-oxo bis{dimethylsilylene(tetramethylcyclopentadienyl) (3-tert-butyl-5-methyl-2-phenoxy)titanium chloride} and $\mu$-oxo bis{dimethylsilylene(tetramethylcyclopentadienyl) (3-tert-butyl-5-methyl-2-phenoxy)titanium methoxide}.

Examples of the transition metal complex represented by the general formula [III] include:

di-$\mu$-oxo bis{isopropylidene(cyclopentadienyl)(2-phenoxy) titanium}, di-$\mu$-oxo bis{isopropylidene(cyclopentadienyl)(3-tert-butyl-5-methyl-2-phenoxy)titanium}, di-$\mu$-oxo bis{isopropylidene(methylcyclopentadienyl)(2-phenoxy)titanium}, di-$\mu$-oxo bis{isopropylidene(methylcyclopentadienyl)(3-tert-butyl-5-methyl-2-phenoxy)titanium}, di-$\mu$-oxo bis{isopropylidene(tetramethylcyclopentadienyl) (2-phenoxy)titanium}, di-$\mu$-oxo bis{isopropylidene(tetramethylcyclopentadienyl) (3-tert-butyl-5-methyl-2-phenoxy)titanium}, di-$\mu$-oxo bis{dimethylsilylene(cyclopentadienyl)(2-phenoxy)titanium}, di-$\mu$-oxo bis{dimethylsilylene(cyclopentadienyl)(3-tert-butyl-5-methyl-2-phenoxy)titanium}, di-$\mu$-oxo bis{dimethylsilylene(methylcyclopentadienyl)(2-phenoxy)titanium}, di-$\mu$-oxo bis{dimethylsilylene(methylcyclopentadienyl)(3-tert-butyl-5-methyl-2-phenoxy)titanium}, di-$\mu$-oxo bis{dimethylsilylene (tetramethylcyclopentadienyl)(2-phenoxy)titanium} and di-$\mu$-oxo bis{dimethylsilylene (tetramethylcyclopentadienyl)(3-tert-butyl-5-methyl-2-phenoxy)titanium}.

The transition metal complex represented by the general formula [I] can be synthesized according to the method described in WO 97/03992, which is incorporated herein by reference in its entirely.

The transition metal compound represented by the general formula [II] or [III] can be prepared by reacting a transition metal compound [I] with 1 or 2 equivalent amounts of water or oxygen.

Examples of the above reaction method include: a method of reacting a transition metal compound and necessary amounts of water or oxygen directly; a method of charging a transition metal compound into a solvent, such as a hydrocarbon solvent, which contains necessary amount of water or oxygen; and a method of charging a transition metal compound into a dry solvent, such as a dry hydrocarbon solvent and passing through an inert gas containing necessary amount of water or oxygen.

Next, an explanation is given on the aluminum compound (B).

As the aluminum compounds (B), these are selected one or more of aluminum compounds from the following (B1)–(B3).

(B1) an organoaluminum compound represented by the general formula $E^1_a AlZ_{3-a}$,
(B2) a cyclic aluminoxane having a structure represented by the general formula $\{-Al(E^2)-O-\}_b$ and
(B3) a linear aluminoxane having a structure represented by the general formula $E^3\{-Al(E^3)-O-\}_c AlE^3_2$
(wherein $E^1$, $E^2$ and $E^3$ respectively represent a hydrocarbon group, and each of $E^1$, $E^2$ and $E^3$ may be the same or different; Z represents a hydrogen atom or a halogen atom, and each of the Z may be the same or different; "a" satisfies the following equation: $0<a\leq3$; "b" represents an integer of 2 or more; and "c" represents an integer of 1 or more).

As the hydrocarbon group in $E^1$, $E^2$ and $E^3$, a hydrocarbon group having 1–8 carbon atoms is preferable, and an alkyl group having 1–8 carbon atoms is more preferable.

Specific examples of the organoaluminum compound (B1) represented by the general formula $E^1_a AlZ_{3-a}$ include trialkylaluminum compounds such as trimethylaluminum, triethylaluminum, tripropylaluminum, triisobutylaluminum, trihexylaluminum, etc.; dialkylaluminum chlorides such as dimethylaluminum chloride, diethylaluminum chloride, dipropylaluminum chloride, diisobutylaluminum chloride, dihexylaluminum chloride, etc.; alkylaluminum dichlorides such as methylaluminum dichloride, ethylaluminum dichloride, propylaluminum dichloride, isobutylaluminum dichloride, hexylaluminum dichloride, etc.; and dialkylaluminum hydrides such as dimethylaluminum hydride, diethylaluminum hydride, dipropylaluminum hydride, diisobutylaluminum hydride, dihexylaluminum hydride, etc.

Among them, trialkylaluminum compounds are preferable, and triethylaluminum and triisobutylaluminum are more preferable.

Specific examples of $E^2$ and $E^3$ in the cyclic aluminoxane (B2) having a structure represented by the general formula $\{-Al(E^2)-O-\}_b$ and linear aluminoxane (B3) having a structure represented by the general formula $E^3\{-Al(E^3)-O-\}_c AlE^3_2$ include alkyl groups such as a methyl group, ethyl group, normal propyl group, isopropyl group, normal butyl group, isobutyl group, normal pentyl group, neopentyl group and the like, "b" is an integer of not less than 2, and "c" is an integer of not less than 1. $E^2$ and $E^3$ are preferably methyl groups or isobutyl groups, "b" is preferably 2 to 40 and "c" is preferably 1 to 40.

The above aluminoxane is produced by various methods. The method is not specifically limited, and the aluminoxane may be produced according to known methods. For example, it can be produced by bringing a solution prepared by dissolving a trialkylaluminum (e.g. trimethylaluminum, etc.) in a suitable solvent (e.g. benzene, aliphatic hydrocarbon, etc.), into contact with water. There can also be used a method of bringing a trialkylaluminum (e.g. trimethylaluminum, etc.) into contact with a metal salt containing crystallization water (e.g. copper sulfate hydrate, etc.).

Boron compound (C) is explained as follows:
As the boron compound (C), any one of boron compound (C1) represented by the general formula $BQ^1Q^2Q^3$, boron compound(C2) represented by the general formula $G^+(BQ^1Q^2Q^3Q^4)^-$ and boron compound(C3) represented by the general formula $(L-H)^+(BQ^1Q^2Q^3Q^4)^-$ can be used.

In the boron compound $(C_1)$ represented by the general formula $BQ^1Q^2Q^3$, B represents a trivalent boron atom; and $Q^1$ to $Q^3$ may be the same or different and represent a halogen atom, a hydrocarbon group, a halogenated hydrocarbon group, a substituted silyl group, a alkoxy group or a disubstituted amino group. $Q^1$ to $Q^3$ represent preferably a halogen atom, a hydrocarbon atom having 1–20 carbon atoms, a halogenated hydrocarbon atom having 1–20 carbon atoms, a substituted silyl group having 1–20 carbon atoms, a alkoxy group having 1–20 carbon atoms or a disubstituted amino group having 2–20 carbon atoms. $Q^1$ to $Q^3$ represent more preferably a halogen atom, a hydrocarbon group having 1–20 carbon atoms or a halogenated hydrocarbon group having 1–20 carbon atoms. $Q^1$ to $Q^4$ represent further more preferably a fluorinated hydrocarbon group having 1–20 carbon atoms and having at least one fluorine atom. $Q^1$ to $Q^4$ represent especially preferably a fluorinated aryl group having 6–20 carbon atoms and having at least one fluorine atom.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among them, tris(pentafluorophenyl)borane is most preferable.

In the boron compound (C2) represented by the general formula $G^+(BQ^1Q^2Q^3Q^4)^-$, $G^+$ represents an inorganic or organic cation; B represents a trivalent boron; and $Q^1$ to $Q^4$ are the same as $Q^1$ to $Q^3$ in the above (C1).

In the compound represented by the general formula $G^+(BQ^1Q^2Q^3Q^4)^-$, specific examples of $G^+$ as an inorganic cation include ferrocenium cation, alkyl-substituted ferrocenium cation, silver cation, etc. and specific examples of $G^+$ as an organic cation include triphenylmethyl cation, etc. $G^+$ is preferably a carbenium cation, more preferably triphenylmethyl cation.

Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, tetrakis(3,5-bistrifluorophenylmethyl)borate and the like.

Examples of the specific combinations of compounds of general formula $C_2$ include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluorophenyl)borate and the like. Among them, triphenylmethyl tetrakis(pentafluorophenyl)borate is most preferable.

In the compound (C3) represented by the general formula $(L-H)^+(BQ^1Q^2Q^3Q^4)^-$, L represents a neutral Lewis acid; $(L-H)^+$ represents a Brønsted acid; B represents a trivalent boron; and $Q^1$ to $Q^4$ are the same as $Q^1$ to $Q^3$ in the above (C1).

In the compound represented by the general formula $(L-H)^+(BQ^1Q^2Q^3Q^4)^-$, specific examples of $(L-H)^+$ as Brønsted acid include trialkyl-substituted ammonium, N,N-dialkylanilinium, dialkylammonium, triarylphosphonium, etc. and specific examples of $(BQ^1Q^2Q^3Q^4)^-$ include the same ones as those described above.

Examples of the specific combination of $(L-H)^+$ $(BQ^1Q^2Q^3Q^4)^-$ include triethylammonium tetrakis (pentafluorophenyl)borate, tripropylammonium tetrakis (pentafluorophenyl)borate, tri(n-butyl)ammonium tetrakis (pentafluorophenyl)borate, tri(n-butyl)ammonium tetrakis (3,5-bistrifluoromethylphenyl)borate, N,N-dimethylanilium tetrakis(pentafluorophenyl)borate, N,N-diethylanilium tetrakis(pentafluorophenyl)borate, N,N-2,4,6-pentamethylanilium tetrakis(pentafluorophenyl)borate, N,N-dimethylanilium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl) phosphonium tetrakis(pentafluorophenyl)borate, tri (dimethylphenyl)phosphonium tetrakis(pentafluorophenyl) borate, etc. Among them, tri(n-butyl)ammonium tatrakis (pentafluoro)borate or N,N-dimethylanilinium tetrakis (pentafluorophenyl)borate is most preferable.

In copolymerizing, there is used a catalyst for olefin polymerization comprising the transition metal complex (A) represented by the general formula [I] and above-mentioned compound(s) (B) and/or (C). In case of using a catalyst for olefin polymerization comprising the two components of (A) and (B), preferable compounds (B) are the above-mentioned cyclic aluminoxane (B2) and/or the linear aluminoxane (B3). As the other preferable mode of a catalyst for olefin polymerization, there can be given a catalyst for olefin polymerization comprising (A), (B) and (C), wherein said (B1) is preferable Each catalyst component is used so that a molar ratio of (B) to (A) is preferably from about 0.1 to 10000, more preferably from about 5 to 2000, and a molar ratio of (C) to (A) is preferably from about 0.1 to 100, more preferably from about 0.5 to 10.

With regard to the concentration of each catalyst component used in the state of a solution or in a state of suspension in the solvent, optional selection is made depending on the capacity of the apparatus for supplying each component to the polymerization reactor and the like. Each component is used so that an amount of (A) is preferably from about 0.01 to 500 $\mu$mol/g, more preferably from about 0.05 to 100 $\mu$mol/g, further preferably from about 0.05 to 50 $\mu$mol/g, the amount of (B) is preferably from about 0.01 to 10000 $\mu$mol/g, more preferably from about 0.1 to 5000 $\mu$mol/g, most preferably from about 0.1 to 2000 $\mu$mol/g, in terms of Al atom, and an amount of (C) is preferably from about 0.01 to 500 $\mu$mol/g, more preferably from about 0.05 to 200 $\mu$mol/g, most preferably from about 0.05 to 100 $\mu$mol/g.

For production of the component (a), solvent polymerization using, as a solvent, an aliphatic hydrocarbon such as butane, pentane, hexane, heptane, octane and the like, an aromatic hydrocarbon such as benzene, toluene and the like, or a halogenated hydrocarbon such as methylene dichloride and the like, or slurry polymerization, gas phase polymerization in a gaseous monomer, and the like are possible, and such polymerization methods may be carried out as a continuous or batch-wise process. The polymerization temperature may be in the range from about −50 to 200° C., preferably the range from about −20 to 100° C., and the polymerization pressure is preferably from about atmospheric pressure to about 60 kg/cm² G. The polymerization time is appropriately determined generally depending on the kind of a catalyst used and a reaction apparatus, and ranges from about 1 minute to 20 hours can be adopted. Further, a chain transfer agent such as hydrogen and the like can also be added for controlling the molecular weight of the polymer, if so desired.

As specific examples of the component (b), a polypropylene, poly-1-butene, poly-4-methyl-1-pentene, poly-1-hexene, crystalline propylene-ethylene copolymer, crystalline propylene-1-butene copolymer and the like are listed, and among them, a polypropylene, and poly-1-butene having a melting point measured by differential scanning calorimetry (DSC) of about 30 to 130° C. are preferable. As polypropylene, isotactic polypropylenes or syndiotactic polypropylenes can be used, and exemplary among them, homo type propylenes, random type propylenes containing a comonomer, or block type propylenes obtained by multi-stage polymerization are mentioned. The propylene can be produced by a gas phase polymerization method, bulk polymerization method and solvent polymerization method, or by a multistage polymerization method obtained by any combination thereof. The number average molecular weight of this polymer is not particularly restricted, but is preferably controlled within the range from about 10,000 to 1,000,000.

As the component (b), corresponding commercially available products can be used.

When the olefin-based copolymer composition containing the components (a) and (b) is required to have excellent impact resistance, heat resistance and anti-whitening agent, it is preferably an olefin-based copolymer composition wherein the composition comprises from about 1 to 30% by weight of the component (a) and about 70 to 99% by weight of the component (b), and the component (b) is a polypropylene-based resin composition obtained by copolymerization of ethylene with propylene by a two or more-stage process in which in the first stage, a homopolymer of propylene or an ethylene-propylene copolymer having an ethylene content of 5.0% by weight or less is obtained, in the second and later stages, an ethylene-propylene copolymer having an ethylene content of 40 to 85% by weight is obtained, and the ratio by weight of the polymer obtained in the first stage to the polymer obtained in the second and later stages is from 50/50 to 90/10. The olefin-based copolymer composition preferably comprises 3–15% by weight of (a) and 85–97% by weight of (b). The component (a) in the olefin-based copolymer composition having excellent impact resistance, heat resistance and anti-whitening property is an olefin-based copolymer obtained by copolymerizing two or more olefins wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in heat resistance and anti-whitening property.

The α-olefins having 4 to 20 carbon atoms and combinations thereof include those described for component (a).

The component (a) in the olefin-based copolymer composition is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) in the olefin-based copolymer composition is preferably from about 0.01 to 20 mol %, more preferably from about 0.05 to 15 mol %, further preferably from about 0.1 to 10 mol %, particularly preferably from about 0.15 to 5 mol %. When the content of a cyclic olefin is too low, a molded article obtained by using the resulting olefin-based copolymer composition may be poor in heat resistance, on the other hand, when the content of a cyclic olefin is too high, a molded article obtained by using the resulting olefin-based copolymer composition may be poor in balance between impact resistance and anti-whitening property.

As the olefin in the component (a) in the olefin-based copolymer composition, propylene, or ethylene and propylene can be contained therein.

The content of ethylene as the olefin in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less, in view of effect for improving anti-whitening property of the olefin-based copolymer composition. When the content is not within the above-described range, the olefin-based copolymer may contain a crystal derived from methylene chain and a molded article obtained by using the resulting olefin-based copolymer composition may be poor in anti-whitening property.

On the other hand, when lower temperature resistance is particularly required, the content of propylene in the component (a) in the olefin-based copolymer composition is preferably about 90 mol % or less, more preferably about 80 mol % or less, still more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperatures.

It is preferable that the component (a) in the olefin-based copolymer composition satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5.$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in anti-whitening property.

The component (a) in the olefin-based copolymer composition has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in heat resistance. On the other hand, when the intrinsic viscosity is too high, a molded article obtained by using the resulting olefin-based copolymer composition may be poor in anti-whitening property. The method for measuring the intrinsic viscosity [η] is the same as that described for component (a).

The component (a) in the olefin-based copolymer composition preferably has a molecular weight distribution (Mw/Mn) measured by gel permeation chromatography (GPC) of 3 or less. When the molecular weight distribution is too wide, if the copolymer is used as a modifier, the resulting olefin-based copolymer composition may be poor in anti-whitening property. The method for measuring the molecular weight distribution is the same as that described for component (a).

It is preferable that the component (a) in the olefin-based copolymer composition has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in anti-whitening property. The measuring method by differential scanning calorimetry is the same as that described for component (a).

The component (a) in the olefin-based copolymer composition can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As the specific example of the metallocene-based catalyst, there may be, for example, mentioned the metallocene-based catalysts described in JP-A Nos. 9-12635 and 9-151205, which are incorporated herein by reference in their entirety.

Particularly, in the component (a) in the olefin-based copolymer composition, it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in anti-whitening property. For providing atactic stereoregularity in the copolymer, two or more olefins wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

The component (a) in the olefin-based copolymer composition can be produced by copolymerizing two or more olefins wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization composed of the component (A), (B) and/or (C) described for component (a).

Specific examples, amounts used and methods for using the components (A), (B) and (C) include those described in the clause for the component (a).

The component (b) in the olefin-based copolymer composition having excellent impact resistance, heat resistance and anti-whitening property is a polypropylene-based resin composition obtained by copolymerization of ethylene with propylene by a two or more-stage process in which in the first stage, a homopolymer of propylene or an ethylene-propylene copolymer having an ethylene content of about 5.0% by weight or less is obtained, in the second and later stages, an ethylene-propylene copolymer having an ethylene content of about 40 to 85% by weight is obtained, and the ratio by weight of the polymer obtained in the first stage to the polymer obtained in the second and later stages is from about 50/50 to about 90/10. (Hereinafter, a homopolymer of propylene or an ethylene-propylene copolymer obtained in the first stage is sometimes referred to as "copolymer-1". And, an ethylene-propylene copolymer obtained in the second or later stage is sometimes referred to as "copolymer-2".)

The ethylene content of the copolymer-1 is about 5.0% by weight or less. When the ethylene content is over about 5.0% by weight, a molded article obtained by using the resulting olefin-based copolymer composition is poor in heat resistance.

The ethylene content of the copolymer-2 is from about 40 to 85% by weight. When the ethylene content is too low, a molded article obtained by using the resulting olefin-based copolymer composition has insufficient anti-whitening property, on the other hand, when the ethylene content is too high, a molded article obtained by using the resulting olefin-based copolymer composition has decreased impact resistance.

The ratio by weight of the copolymer-1 to the copolymer-2 is from about 50/50 to about 90/10. When the amount of the copolymer-1 is too low (the amount of the copolymer-2 is too high), sufficient anti-whitening property can not be obtained, on the other hand, when the amount of the copolymer-1 is too high (the amount of the copolymer-2 is too low), sufficient impact resistance can not be obtained.

The copolyme1 and copolymer-2 may contain a small amount, for example about 1 to 5% by weight, of one or more of α-olefins (for example, butene-1, hexene-1, octene-1 and the like) other than propylene and ethylene.

The component (b) in the olefin-based copolymer composition is sometimes popularly called "block polypropylene" or "high impact polypropylene", and corresponding commercially available products can be used.

When the amount of the component (a) is too low (the amount of the component (b) is too high), effect for improving anti-whitening property by addition of the component (a) may become poor. On the other hand, when the amount of the component (a) is too high (the amount of the component (b) is too low), a molded article obtained by using the resulting olefin-based copolymer composition exhibits remarkable reduction in heat resistance which is practically disadvantageous.

The olefin-based copolymer composition having excellent impact resistance, heat resistance and anti-whitening property may be an olefin-based copolymer composition comprising 100 parts by weight of the above-described olefin-based copolymer composition and 20 parts by weight or less of the following component (j).

(j): a polyethylene having a density of 0.940 g/cm$^3$ or more

By using the component (j), the anti-whitening property of a molded article obtained by using the resulting olefin-based copolymer composition is further improved. The density of the component (j) is 0.940 g/cm$^3$ or more. When the density is too low, embossing property which is one of secondary processing properties in molding a sheet product by an extrusion molding method using the resulting olefin-based copolymer composition undesirably deteriorates. The ratio of the component (j) is 20 parts by weight at maximum, and preferably from 5 to 15 parts by weight. When it is used in an amount over 20 parts by weight, the embossing property of a sheet in producing a sheet molded article by an extrusion molding method deteriorates, and further, peeling between layers of the sheet is caused undesirably.

When a sheet molded article is produced by an extrusion molding method using the olefin-based copolymer composition, it is desirable that the melt flow rate of the olefin-based copolymer composition is set at about 0.1 to 10 g/10 minutes, preferably about 0.5 to 5 g/10 minutes. When the melt flow rate is less than about 0.1 g/10 minutes, the productivity in extrusion-molding decreases excessively, and further, warping, waving and the like occur on the resulting sheet molded article, likewise, the embossing property exhibits failure and the appearance lowers, therefore, commercial value decreases.

To the olefin-based copolymer composition, additives such as an antioxidant and further, antistatic agent, anti-weathering agent, ultraviolet absorber, slipping agent, coloring agent, dispersing agent and the like; fillers such as glass fiber, carbon fiber, metal fiber, glass bead, asbestos, mica, calcium carbonate, potassium titanate whisker, talc, aramide fiber, barium sulfate, glass flake, fluorine resin and the like; and other rubber-like polymers or thermoplastic resins and the like can be appropriately added as additional components.

The olefin-based copolymer composition can also be subjected to vulcanization such as sulfur vulcanization, peroxide vulcanization, metal ion vulcanization, silane vulcanization, resin vulcanization and the like by a conventionally known method.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of a closed type or open type apparatus may be adopted, and a closed type apparatus which can be utilized in conjunction with by an inert gas is preferable. The kneading temperature is a temperature at which all of mixed constituent components are melted, and usually from 160 to 250° C., preferably from 180 to 240° C. The kneading time can not be generally discussed since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of the constituent components is kneaded, the remaining constituent components are added and kneading of the constituent components is continued.

The olefin-based copolymer composition can be applied to various molding methods such as an injection molding method, sheet extrusion molding method, vacuum molding method, hollow molding method, press molding method, extrusion molding method, form molding method and the like, to obtain various molded articles.

When the olefin-based copolymer composition containing the component (a) and the component (b) is required to have excellent impact resistance and high rigidity, it is preferably an olefin-based copolymer composition wherein the composition comprises about 1 to 30% by weight of the component (a) and about 70 to 99% by weight of the component (b), and the component (b) is an isotactic polypropylene containing about 98% by weight or more of propylene.

Further, the composition comprises preferably about 2 to 20% by weight of the component (a) and about 80 to 98% by weight of the component (b), particularly preferably about 3 to 15% by weight of the component (a) and about 85 to 97% by weight of the component (b).

The component (a) in the olefin-based copolymer composition is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in anti-stress-whitening property.

The α-olefins having 4 to 20 carbon atoms and combination thereof include those described for component (a).

The component (a) in the olefin-based copolymer composition is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) in the olefin-based copolymer composition is preferably from about 0.01 to 20 mol %, more preferably from about 0.05 to 15 mol %, still more preferably from about 0.1 to 10 mol %, and particularly preferably from about 0.15 to 5 mol %. When the content of a cyclic olefin is too low, a molded article obtained by using the resulting olefin-based copolymer composition may be poor in heat resistance, on the other hand, when the content of a cyclic olefin is too high, a molded article obtained by using the resulting olefin-based copolymer composition may be poor in impact resistance.

As the olefin in the component (a) in the olefin-based copolymer composition, propylene, or ethylene and propylene can be contained.

The content of ethylene as the olefin in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less, in view of producing the effect of improving the anti-stress-whitening property of the olefin-based copolymer composition. When the content is not included in the above-described range, the olefin-based copolymer may contain a crystal derived from methylene chain and a molded article obtained by using the resulting olefin-based copolymer composition may be poor in anti-stress-whitening property.

On the other hand, when lower temperature resistance is particularly required, the content of propylene in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperatures.

It is preferable that the component (a) in the olefin-based copolymer composition satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5.$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in anti-stress-whitening properties.

The component (a) in the olefin-based copolymer composition has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in anti-stress-whitening property. On the other hand, when the intrinsic viscosity is too high, a molded article obtained by using the resulting olefin-based copolymer composition may be poor in processing property. The method for measuring the intrinsic viscosity [η] is the same as that described for component (a).

The component (a) in the olefin-based copolymer composition preferably has a molecular weight distribution (Mw/Mn) measured by gel permeation chromatography (GPC) of 3 or less. When the molecular weight distribution is too wide, if the copolymer is used as a modifier, the resulting olefin-based copolymer composition may be poor in anti-stress-whitening property. The method for measuring the molecular weight distribution is the same as that described for component (a).

It is preferable that the component (a) in the olefin-based copolymer composition has neither a peak of 1 J/g or more based on melting of a crystal nor a peak of 1 J/g or more based on crystallization, when measured by differential scanning calorimetry (DSC). When such a peak exists, a molded article obtained by using the resulting olefin-based copolymer composition may be poor in anti-stress-whitening property. The measuring method by differential scanning calorimetry is the same as that described for component (a).

The component (a) in the olefin-based copolymer composition can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As a specific example of the metallocene-based catalyst, there may be, for example, listed metallocene-based catalysts described in JP-A Nos. 9-12635 and 9-151205, which are incorporated herein by reference in their entirety.

Particularly, in the component (a) in the olefin-based copolymer composition, it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in anti-stress-whitening property. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode nor Cn antipode (n represents an integer of 1 or more).

The component (a) in the olefin-based copolymer composition can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization composed of the component (A), (B) and/or (C) described for component (a).

Specific examples, amounts used and methods of using the components (A), (B) and (C) include those described for component (a).

The component (b) in the olefin-based copolymer composition is an isotactic polypropylene containing about 98% by weight or more of propylene, and preferably an isotactic polypropylene containing about 98.5 to 100% by weight of propylene.

When the propylene content in the component (b) in the olefin-based copolymer composition having excellent impact resistance and high rigidity is too low, rigidity and anti-stress-whitening property lower.

The isotactic polypropylene which is the component (b) in the olefin-based copolymer composition is polymerized by a gas phase polymerization method, bulk polymerization method, solvent polymerization method and the like. The number average molecular weight of this polymer is not particularly restricted, and preferably in the range from 10,000 to 1,000,000.

The propylene content in the isotactic polypropylene which is the component (b) in the olefin-based copolymer composition can be measured by using $^{13}$C-NMR and the like.

The isotactic stereoregularity of the component (b) in the olefin-based copolymer composition can be judged from an isotactic pentad ratio fraction (mmmm) obtained from peaks of methyl carbons using $^{13}$C-NMR. The isotactic pentad ratio fraction (mmmm) of an isotactic polypropylene is about 0.70 or more, preferably about 0.80 or more, particularly preferably about 0.90 or more, most preferably about 0.95 or more. When the isotactic pentad ratio fraction is not within the above-described range, the melting point and rigidity of polypropylene may undesirably decrease. The assignment of a methyl carbon peak and isotactic ratio pentad ratio (mmmm) are described in New Edition Polymer Handbook II. 2. 3 (Copyright The Japan Society for Analytical Chemistry, Research Committee of Polymer Analysis, 1995), which is incorporated herein by reference in its entirely.

As the component (b) in the olefin-based copolymer composition, the corresponding commercially available products can be used.

When the amount of the component (a) is too low (the amount of the component (b) is too high), the effect of improving anti-stress-whitening property is poor. Likewise, when the amount of the component (a) is too high (the amount of the component (b) is too low), the rigidity of the resulting olefin-based copolymer composition lowers sometimes.

To the olefin-based copolymer composition, additives such as an antioxidant and further, antistatic agent, anti-weathering agent, ultraviolet absorber, slipping agent, coloring agent, dispersing agent and the like; fillers such as glass fiber, carbon fiber, metal fiber, glass bead, asbestos, mica, calcium carbonate, potassium titanate whisker, talc, aramide fiber, barium sulfate, glass flake, fluorine resin and the like; and other rubber-like polymers or thermoplastic resins and the like can be appropriately added as additional components.

The olefin-based copolymer composition can also be subjected, if required, to vulcanization such as sulfur vulcanization, peroxide vulcanization, metal ion vulcanization, silane vulcanization, resin vulcanization and the like by a conventionally known method.

For obtaining the olefin-based copolymer composition, the above-described components may advantageously be kneaded using an extruder, kneader, Banbury mixer, single or twin screw extruder, and the like. Further, dry blend by an injection molding machine is also possible.

The olefin-based copolymer composition can be applied to automobile interior and exterior equipment, office automation instruments associated parts, audio & visual and electric household appliance associated parts, caps of various bottles, stationary, business machine parts, various containers and battery cases and the like, by utilizing the excellent properties as described above.

When the olefin-based copolymer composition containing the components (a) and (b) is required to have excellent elongation, flexibility, transparency and processability, it is preferably an olefin-based copolymer composition wherein the composition comprises about 1 to 99% by weight of the component (a) and about 1 to 99% by weight of the component (b), and the component (b) is a propylene-ethylene composition having a JIS A hardness measured according to JIS K6301 of 70 to 97, and a flexural modulus measured according to JIS K7203 of 50 to 500 MPa, each of which are incorporated herein by reference in their entirety. The olefin-based composition preferably comprises about 5 to 95% by weight of the component (a) and about 5 to 95% by weight of the component (b).

The component (a) in the olefin-based copolymer composition having excellent elongation, flexibility, transparency and processability is an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combination thereof include those described for component (a).

The component (a) in the olefin-based copolymer composition is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) in the olefin-based copolymer composition is preferably from about 0.01 to 20 mol %, more preferably from about 0.05 to 15 mol %, even more preferably from about 0.1 to 10 mol %, particularly preferably from about 0.15 to 5 mol %. When the content of a cyclic olefin is too low, a molded article obtained by using the resulting olefin-based copolymer composition may be poor in heat resistance, on the other hand, when the content of a cyclic olefin is too high, a molded article obtained by using the resulting olefin-based copolymer composition may be poor in flexibility.

As the olefin in the component (a) in the olefin-based copolymer composition, propylene, or ethylene and propylene can be contained therein.

The content of ethylene as the olefin in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less, in view of producing the effect of improving the flexibility and transparency of the olefin-based copolymer composition. When the content is not within the above-described range, the olefin-based copolymer may contain a crystal derived from methylene chain and a molded article obtained by using the resulting olefin-based copolymer composition may be poor in flexibility and transparency.

On the other hand, when lower temperature resistance is particularly required, the content of propylene in the component (a) in the olefin-based copolymer composition having excellent elongation, flexibility, transparency and processability according to the present invention is preferably about 90 mol % or less, more preferably about 80 mol % or less, even more preferably about 70 mol % or less, particularly preferably about 60% or less, and most preferably about 50 mol % or less. When the content is not included in the above-described range, a molded article obtained by using the resulting olefin-based copolymer composition may be poor in impact resistance at lower temperature.

It is preferable that the component (a) in the olefin-based copolymer composition satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5.$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) in the olefin-based copolymer composition has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in elongation. On the other hand, when the intrinsic viscosity is too high, a molded article obtained by using the resulting olefin-based copolymer composition may be poor in flexibility. The method for measuring the intrinsic viscosity [η] is the same as that described for component (a).

The component (a) in the olefin-based copolymer composition preferably has a molecular weight distribution (Mw/Mn) measured by gel permeation chromatography (GPC) of 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) in the olefin-based copolymer composition has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) in the olefin-based copolymer composition can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of elements, containing at least one cyclopentadienyl skeleton. As the specific example of the metallocene-based catalyst, there may be, for example, listed metallocene-based catalysts described in JP-A Nos. 9-12635 and 9-151205, which are incorporated hereby reference in their entirety.

Particularly, in the component (a) in the olefin-based copolymer composition having excellent elongation, flexibility, transparency and processability according to the present invention, it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in transparency. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

The component (a) in the olefin-based copolymer composition can be produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization composed of the component (A), (B) and/or (C) described for component (a).

Specific examples, amounts used and methods of using the components (A), (B) and (C) include those described for component (a).

The component (b) in the olefin-based copolymer composition having excellent elongation, flexibility, transparency and processability is a propylene-ethylene composition having a JIS A hardness measured according to JIS K6301 of about 70 to 97, and a flexural modulus measured according to JIS K7203 of about 50 to 500 MPa, each of which are incorporated herein by reference in their entirety. The component (b) in the olefin-based copolymer composition having excellent elongation, flexibility, transparency and processability according to the present invention excludes those included in the category of the component (a).

The component (b) in the olefin-based copolymer composition has a JIS A hardness measured according to JIS K6301 of about 70 to 97, preferably of about 75 to 97. When this hardness is too low, the resulting olefin-based copolymer composition may be poor in heat resistance. On the other hand, when this hardness is too high, the resulting olefin-based copolymer composition may be poor in flexibility.

The component (b) in the olefin-based copolymer composition has a flexural modulus measured according to JIS K7203 of about 50 to 500 MPa, preferably of about 55 to 450 MPa. When this flexural modulus is too low, the resulting olefin-based copolymer composition may be poor in heat resistance. On the other hand, when this flexural modulus is too high, the resulting olefin-based copolymer composition may be poor in flexibility.

The component (b) in the olefin-based copolymer composition is a propylene-ethylene copolymer, and as monomer components constituting the copolymer, about 5 to 85 mol % of a monomer unit derived from ethylene and about 95 to 15 mol % of a monomer unit derived from propylene are preferable, and an α-olefin other than ethylene and propylene, for example, 1-butene, 4-methyl-1-pentene, 1-hexene, 3-methyl-1-butene, or a non-conjugated diene monomer such as 1,4-hexadiene, dicyclopentadiene, 5-ethylidene-2-norbornene and the like may be contained in an amount of about 5 mol % or less.

The component (b) in the olefin-based copolymer composition may be a component obtained by copolymerizing a monomer having a functional group in addition to the above-described monomers. As such a functional group, a hydroxyl group, carboxyl group, acid anhydride group, amino group, isocyanate group, epoxy group, ester group and the like are listed. As such as a monomer, for example, (meth)acrylic acid, acrylate hydroxy alkyl ester, maleic acid (anhydride), glycidyl (meth)acrylate, and the like are listed. Further, a propylene-ethylene copolymer may also be modified for introduction of the above-described functional group.

As this propylene-ethylene copolymer, random type copolymers, or block type copolymers obtained by multistage polymerization are listed. This propylene-ethylene copolymer can be produced by a gas phase polymerization method, bulk polymerization method and solvent polymerization method, or by a multistage polymerization method obtained by any combination thereof. The number average molecular weight of this polymer is not particularly restricted, and preferably controlled within the range from about 10,000 to 1,000,000.

As the component (b) in the olefin-based copolymer composition, corresponding commercially available products can be used.

When the amount of the component (a) is too low (the amount of the component (b) is too high), the resulting olefin-based copolymer composition is poor in flexibility and transparency. On the other hand, when the amount of the component (a) is too high (the amount of the component (b) is too low), the resulting olefin-based copolymer composition is poor in heat resistance.

The olefin-based copolymer composition invention may contain the following component (k) in addition to the component (a) and the component (b).

(k): a polyolefin-based resin having a flexural modulus measured according to JIS K7203 of about 550 to 1800 MPa The component (k) has a flexural modulus measured according to JIS K7203 of about 550 to 1800 MPa, preferably of about 600 to 1800 MPa. When the flexural modulus is too low, the resulting olefin-based copolymer composition may be poor in heat resistance, on the other hand, when the flexural modulus is too high, the resulting olefin-based copolymer composition may be poor in flexibility. When the component (k) is used, the amount used is preferably from about 50/50 to 99/1 in terms of ratio by weight of (total amount of (a) and (b))/(k). By using the component (k) in this range, a molded article obtained by using the resulting olefin-based copolymer composition can be endowed with an excellent balance between flexibility and strength.

To the olefin-based copolymer composition, additives such as an antioxidant, antistatic agent, anti-weathering agent, ultraviolet absorber, slipping agent, coloring agent, dispersing agent and the like, coloring agents such as carbon black and the like, or other rubber-like polymers or thermoplastic resins and the like can be appropriately added as additional components.

The olefin-based copolymer composition can also be subjected, if required, to vulcanization such as sulfur vulcanization, peroxide vulcanization, metal ion vulcanization, silane vulcanization, resin vulcanization and the like by a conventionally known method.

For obtaining the olefin-based copolymer composition, the above-described components may be kneaded using a usual kneading apparatus, for example, a rubber mill, Brabender mixer, Banbury mixer, kneader, twin screw extruder, and the like. As the kneading apparatus, any of a closed type or open type apparatuses may be adopted, and a closed type apparatus which can be utilized in combination with an inert gas is preferable. The kneading temperature is a temperature at which all of mixed constituent components are melted, and usually from about 160 to 250° C., preferably from about 180 to 240° C. The kneading time can not be generally discussed since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of the constituent components is kneaded, the remaining constituent components are added and kneading of the constituent components is continued.

The olefin-based copolymer composition can be applied to various molding methods such as an injection molding method, sheet extrusion molding method, vacuum molding method, hollow molding method, press molding method, extrusion molding method, form molding method and the like, to obtain various molded articles.

When the olefin-based copolymer composition containing the component (a) and the component (b) is required to have excellent strength, flexibility, transparency and heat resistance, and to have no possibility of causing hygienic and other problems on use accompanied with elution of a plasticizer like in a soft poly (vinyl chloride) material, it is preferably an olefin-based copolymer composition wherein the composition is composed of the above-described components (a) and (b), the component (b) is composed of the component (b-1) and the component (b-2), and the composition comprises about 1 to 98% by weight of the component (a), about 1 to 98% by weight of the component (b-1) and about 1 to 98% by weight of the component (b-2).

(b-1): a polypropylene (b-2): a poly-1-butene having a melting point measured by differential scanning calorimetry (DSC) of about 30 to 130° C.

The composition preferably comprises about 5 to 95% by weight of the component (a), about 10 to 90% by weight of the component (b-1) and about 10 to 90% by weight of the component (b-2).

The component (a) in the olefin-based copolymer composition having excellent strength, flexibility, transparency and heat resistance, and having no possibility to cause hygienic and other problems on use accompanied with elution of a plasticizer like in a soft poly (vinyl chloride) material is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combinations thereof include those described for component (a).

The component (a) in the olefin-based copolymer composition according to the present invention is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) in the olefin-based copolymer composition is preferably from about 0.01 to 20 mol %, more preferably from about 0.05 to 15 mol %, even more preferably from about 0.1 to 10 mol %, and particularly preferably from about 0.15 to 5 mol %. When the content of a cyclic olefin is too low, a molded article obtained by using the resulting olefin-based copolymer composition may be poor in heat resistance, on the other hand, when the content of a cyclic olefin is too high, a molded article obtained by using the resulting olefin-based copolymer composition may be poor in balance between strength and flexibility.

As the olefin in The component (a) in the olefin-based copolymer composition, propylene, or ethylene and propylene can be contained therein.

The content of ethylene as the olefin in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less, in view of producing the effect of improving the flexibility and transparency of the olefin-based copolymer composition. When the content is not within the above-described range, the olefin-based copolymer may contain a crystal derived from methylene chain and a molded article obtained by using the resulting olefin-based copolymer composition may be poor in flexibility and transparency.

On the other hand, when lower temperature resistance is particularly required, the content of propylene in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperature.

It is preferable that the component (a) in the olefin-based copolymer composition satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and particularly preferably the formula:

$$[y/(x+y)] \geq 0.5$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) in the olefin-based copolymer composition has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in heat resistance. On the other hand, when the intrinsic viscosity is too high, a molded article obtained by using the resulting olefin-based copolymer composition may be poor in flexibility. The method for measuring the intrinsic viscosity [η] is the same as that described for component (a).

The component (a) in the olefin-based copolymer composition preferably has a molecular weight distribution (Mw/Mn) measured by gel permeation chromatography (GPC) of 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) in the olefin-based copolymer composition has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) in the olefin-based copolymer composition can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As the specific example of the metallocene-based catalyst, there may be, for example, listed metallocene-based catalysts described in JP-A Nos. 9-12635 and 9-151205, which are incorporated herein by reference in their entirety.

Particularly, in the component (a) in the olefin-based copolymer composition, it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) in the olefin-based copolymer composition can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization composed of the component (A), (B) and/or (C) described for component (a).

Specific examples, amounts used and methods of using the components (A), (B) and (C) include those described for component (a).

The component (b-1) is a polypropylene.

As the polypropylene of the present invention, isotactic polypropylenes or syndiotactic polypropylenes are adopted, and among them, homo type propylenes, random type propylenes containing a comonomer, or block type propylenes obtained by multistage polymerization are mentioned. This propylene can be produced by a gas phase polymerization method, bulk polymerization method and solvent polymerization method, or by a multistage polymerization method based on any combination thereof. The number average molecular weight of this polymer is not particularly restricted, and preferably controlled within the range from about 10,000 to 1,000,000.

As the component (b-1), corresponding commercially available products can be used.

The component (b-2) is a poly-1-butene having a melting point measured by differential scanning calorimetry (DSC) of about 30 to 130° C. The component (b-2) excludes those included in the category of the component (a) or the component (b-1).

The component (b-2) is a poly-1-butene homopolymer resin or a poly-1-butene copolymer resin obtained by using a Ziegler-Natta type catalyst or metallocene-based catalyst by a known technology, and has a melting point measured by differential scanning calorimetry (DSC) preferably of about 30 to 130° C., more preferably of about 40 to 130° C., particularly preferably of about 50 to 130° C. When this melting point is too low, a molded article obtained by using the resulting olefin-based copolymer composition may be poor in heat resistance and strength. For example, DSC220 manufactured by Seiko Instruments Inc. is used as the differential scanning calorimeter, and the measurement is conducted at a speed of 10° C./min in both temperature raising process and temperature lowering process.

The poly-1-butene copolymer resin is obtained by copolymerizing 1-butene, and ethylene or α-olefins having 3 to 8 carbon atoms. As the preferable α-olefin, propylene, 1-hexene, 1-octene and the like are listed. The ratio of these α-olefins is usually about 50% by weight or less, preferably from about 0.5 to 40% by weight, particularly preferably from about 1 to 30% by weight.

As the poly-1-butene having a melting point of about 30 to 130° C. as the component (b-2), commercially available products can used.

When the amount of the component (a) is too low, a molded article obtained by using the resulting olefin-based copolymer composition is poor in flexibility and transparency leading to practical disadvantages. Similarly, when the amount of the component (a) is too high, a molded article obtained by using the resulting olefin-based copolymer composition is poor in heat resistance and strength leading to disadvantages. When the amount of the component (b-1) is too low, a molded article obtained by using the resulting olefin-based copolymer composition exhibits a remarkable decrease in heat resistance and strength leading to practical disadvantages. Likewise, when the amount of the component (b-1) is too high, a molded article obtained by using the resulting olefin-based copolymer composition is poor in flexibility and transparency leading to disadvantages. When the amount of the component (b-2) is too low, a molded article obtained by using the resulting olefin-based copolymer composition is poor in heat resistance, strength and transparency leading to practical disadvantages. Furthermore, when the amount of the component (b-2) is too high, a molded article obtained by using the resulting olefin-based copolymer composition is poor in flexibility and transparency leading to disadvantages.

To the olefin-based copolymer composition, additives such as an antioxidant and further, an antistatic agent, anti-weathering agent, ultraviolet absorber, slipping agent, coloring agent, dispersing agent and the like; fillers such as glass fiber, carbon fiber, metal fiber, glass bead, asbestos, mica, calcium carbonate, potassium titanate whisker, talc, aramide fiber, barium sulfate, glass flake, fluorine resin and the like; and other rubber-like polymers or thermoplastic resins and the like, can be appropriately added as additional components.

The olefin-based copolymer composition can also be subjected, if necessary, to a vulcanization such as sulfur vulcanization, peroxide vulcanization, metal ion vulcanization, silane vulcanization, resin vulcanization and the like by a conventionally known method.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of the closed type and open type apparatuses may be adopted, and a closed type apparatus which can be utilized in combination with an inert gas is preferable. The kneading temperature is a temperature at which all of mixed constituent components are melted, and usually from about 160 to 250° C., preferably from about 180 to 240° C. The kneading time can not be generally determined since it depends on the kind and amount of mixed constituent components and the kind of kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of constituent components is kneaded, the remaining constituent components are added and kneading of the constituent components is continued.

The olefin-based copolymer composition can be applied to various molding methods such as an injection molding method, sheet extrusion molding method, vacuum molding method, hollow molding method, press molding method, extrusion molding method, form molding method and the like, to obtain various molded articles.

When the olefin-based copolymer composition containing the component (a) and the component (b) is required to have excellent gas permeability, heat resistance and transparency, and exhibit sufficient flexibility without using a softener which becomes a cause of bleeding out, it is preferable to make a laminate in which a layer composed of an olefin-based copolymer composition containing about 40 to 90% by weight of the component (a) and about 10 to 60% by weight of the component (b), and a layer composed of the following component (l) are laminated via an adhesive layer composed of the following component (m).

(l): a thermoplastic polyamide elastomer
(m): a functional group-containing polyolefin The component (a) in the olefin-based copolymer composition contained in the laminate is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, the resulting laminate is poor in transparency and flexibility.

The α-olefins having 4 to 20 carbon atoms and combination thereof include those described for component (a).

The component (a) in the olefin-based copolymer composition contained in the laminate is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) in the olefin-based copolymer composition contained in the laminate is preferably from about 0.01 to 20 mol %, more preferably from about 0.05 to 15 mol %, even more preferably from about 0.1 to 10 mol %, particularly preferably from about 0.15 to 5 mol %. When the content of a cyclic olefin is too low, the resulting laminate may be poor in heat resistance, on the other hand, when the content of a cyclic olefin is too high, the resulting laminate may be poor in flexibility.

As the olefin in the component (a) in the olefin-based copolymer composition contained in the laminate, propylene or ethylene and propylene can be contained therein.

The content of ethylene as the olefin in the component (a) in the olefin-based copolymer composition contained in the laminate is preferably about 90 mol % or less, more preferably about 80 mol % or less, even more preferably about 70 mol % or less, particularly preferably about 60 mol % or less, and most preferably about 50 mol % or less, in view of producing an effect of improving the flexibility and transparency of the laminate. When the content is not within the above-described range, the olefin-based copolymer may contain a crystal derived from methylene chain and the resulting laminate may be poor in flexibility and transparency.

On the other hand, when lower temperature resistance is particularly required, the content of propylene in the component (a) in the olefin-based copolymer composition contained in the laminate is preferably about 90 mol % or less, more preferably about 80 mol % or less, even more preferably about 70 mol % or less, particularly preferably about 60 mol % or less, and most preferably about 50 mol % or less. When the content is not within the above-described range, the resulting laminate may be poor in impact resistance at lower temperature.

It is preferable that the component (a) in the olefin-based copolymer composition contained in the laminate according to the present invention satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5,$$

(wherein, x represents the content (mol %) of ethylene in the component (a), and y represents the content (mol %) of α-olefins having 4 to 20 carbon atoms in the component (a))

When the above-described formula is not satisfied, the resulting laminate may be poor in transparency.

The component (a) in the olefin-based copolymer composition contained in the laminate has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, the resulting laminate may be poor in strength and heat resistance. Similarly, when the intrinsic viscosity is too high, the resulting laminate may be poor in flowability and processability. The method for measuring the intrinsic viscosity [η] is the same as that described for component (a).

The component (a) in the olefin-based copolymer composition contained in the laminate preferably has a molecular weight distribution (Mw/Mn) measured by gel permeation chromatography (GPC) of 3 or less. When the molecular weight distribution is too wide, if the copolymer is used as a modifier, the resulting laminate may be poor in flexibility. The method for measuring the molecular weight distribution is the same as that described for component (a).

It is preferable that the component (a) in the olefin-based copolymer composition contained in the laminate has neither a peak of 1 J/g or more based on melting of a crystal nor a peak of 1 J/g or more based on crystallization when measured by differential scanning calorimetry (DSC). When such a peak exists, the resulting laminate may be poor in flexibility. The measuring method by differential scanning calorimetry is the same as that described for component (a).

The component (a) in the olefin-based copolymer composition contained in the laminate can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of elements, containing at least one cyclopentadienyl skeleton. As a specific example of the metallocene-based catalyst, there may be, for example, listed metallocene-based catalysts described in JP-A Nos. 9-12635 and 9-151205, which are incorporated by reference in their entirety.

Particularly, in the component (a) in the olefin-based copolymer composition contained in the laminate, it is preferable that the configuration of propylene and/or the α-olefin side chain having 4 to 20 carbon atoms is an atactic structure. When it is not an atactic structure, if the copolymer is used as a modifier, the resulting laminate may be poor in transparency and flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having non-stereospecific structure, for producing the copolymer. The complex of a transition metal having non-stereospecific structure means a complex comprising no Cs antipode and Cn antipode (n represents an integer of 1 or more).

Further, the component (a) in the olefin-based copolymer composition contained in the laminate can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization composed of the component (A), (B) and/or (C) as described for component (a).

Specific examples, amounts used and methods of using the components (A), (B) and (C) include those described for component (a).

The layer composed of the olefin-based copolymer composition preferably contains about 40 to 90% by weight of the component (a) and about 10 to 60% by weight of the component (b). The layer contains more preferably about 50 to 85% by weight of the component (a) and about 15 to 50% by weight of the component (b), particularly preferably about 55 to 85% by weight of the component (a) and about 15 to 45% by weight of the component (b). When the amount of the component (a) is too low (the amount of the component (b) is too high), flexibility and gas permeability are poor sometimes. Similarly, when the amount of the component (a) is too high (the amount of the component (b) is too low), flowability and heat resistance are sometimes poor.

To the olefin-based copolymer composition contained in the laminate, additives such as an antioxidant and further, an antistatic agent, anti-weathering agent, ultraviolet absorber, slipping agent, coloring agent, dispersing agent and the like; fillers such as glass fiber, carbon fiber, metal fiber, glass bead, asbestos, mica, calcium carbonate, potassium titanate whisker, talc, aramide fiber, barium sulfate, glass flakes, fluorine resin and the like; and other rubber-like polymers or thermoplastic resins and the like can be appropriately added as additional components.

The olefin-based copolymer composition contained in the laminate can also be subjected, if necessary, to a vulcanization, such as a sulfur vulcanization, peroxide vulcanization, metal ion vulcanization, silane vulcanization, resin vulcanization and the like by a conventionally known method.

For obtaining the olefin-based copolymer composition contained in the laminate according to the present invention, the above-described components may advantageously be kneaded using a usual kneading apparatus, for example, a twin screw extruder and the like, and subjected to a lamination process.

The component (l) is a thermoplastic polyamide elastomer.

The thermoplastic polyamide elastomer is a polyamide block copolymer, and has, in its polymer chain, a crystalline segment (S-A) having a high melting point comprising an aliphatic polyamide unit and a polymer segment (S-B) having low melting point comprising an aliphatic polyether unit.

The aliphatic polyamide unit of the crystalline segment (S-A) having high melting point, which is a hard segment used in the elastomer is formed from a lactam or amino acid of which hydrocarbon chain has 4 to 14 carbon atoms, or a condensation product of a dicarboxylic acid with a diamine, and a dicarboxylic acid. Among them, the lactam component includes caprolactam, lauryllactam, undecalactam, dodecalactam or the like, and preferably is caprolactam or lauryllactam. The amino acid component is 11-amino-undecanoic acid, 12-amino-dodecanoic acid or the like.

As the dicarboxylic acid used in the condensation product of a dicarboxylic acid with a diamine, adipic acid, azelaic acid, sebacic acid, 1,12-dodecanedioic acid and the like are listed, and as the diamine, hexamethylenediamine, nonamethylenediamine and the like are listed. This condensation product is preferably a condensation product of adipic acid with hexamethylenediamine. The above-described dicarboxylic acid is necessary for obtaining a polyamide having a carboxylic acid at the end, and is an aliphatic dicarboxylic acid having 4 to 20 carbon atoms, for example, succinic acid, adipic acid, suberic acid, azelaic acid, sebacic acid, undecanoic acid, dodecanoic acid or the like, and preferably is adipic acid. The average molecular weight of the aliphatic polyamide is usually from 300 to 15,000, preferably from 800 to 5,000.

The aliphatic polyether unit constituting the polymer segment (S-B) having a low melting point, which is a soft segment, is formed from a polyalkylene glycol having a number average molecular weight in the range from 200 to 6,000. As this polyalkylene glycol, for example, polyethylene glycol, polypropylene glycol, polytetramethylene glycol, polyethylene glycol-polypropylene glycol block copolymer and the like are listed, and particularly, polytetramethylene glycol is preferable. These can be used alone of course, and also can be used as a mixture, providing that the ratio of the number of carbon atoms to the number of oxygen atoms is from about 2.0 to 4.5. Regarding ratio by weight of the crystalline segment (S-A) having high melting point and the polymer segment (S-B) having low melting point, the amount of the segment (S-A) is from about 10 to 90% by weight, preferably from about 20 to 80% by weight, and the amount of the segment (S-B) is from about 10 to 90% by weight, preferably from about 20 to 80% by weight.

As the thermoplastic polyamide elastomer (1), corresponding commercially available products can be used.

The component (m) is a functional group-containing polyolefin.

The component (m) is a functional group-containing polyolefin adhesive layer.

The functional group-containing polyolefin is obtained by modifying a polyolefin-based resin or rubber with a functional group. The polyolefin-based resin or rubber is a resin or rubber obtained by polymerizing an α-olefin as a main component. As this α-olefin, ethylene, propylene, 1-butene, 4-methyl-1-butene, 4-methyl-1-pentene and a mixture thereof are listed, and ethylene and propylene are preferable. As the rubber, ethylene-propylene rubber and ethylene-propylene-diene rubber are listed.

As the functional group, unsaturated carboxylic acids, unsaturated carboxylic acid derivatives and the like are listed, and specific examples of this functional group-containing compound include maleic acid, fumaric acid, itaconic acid, citraconic acid, allylsuccinic acid, maleic anhydride, fumaric anhydride, itaconic anhydride and the like, and maleic anhydride are preferable.

For the modification method, the above-described functional group-containing compound is grafted to a polyolefin-based resin or rubber in an alkyl aromatic hydrocarbon solvent using a radical initiator at a temperature of about 115° C. or more, or an extremely small amount of an alkyl peroxide, preferably an aliphatic bifunctional peroxide, a functional group-containing compound and a polyolefin-based resin and/or rubber are kneaded at a temperature of about 200° C. or more, or the like.

Specific examples of the functional group-containing polyolefin include a maleic anhydride-modified LDPE (low density polyethylene), maleic anhydride-modified HDPE (high density polyethylene), maleic anhydride-modified LLDPE (linear low density polyethylene), maleic anhydride-modified EVA (ethylene-vinyl acetate copolymer), maleic anhydride-modified PP (polypropylene), ethylene-acrylate-maleic anhydride terpolymer and the like, and maleic anhydride-modified LLDPE is preferable.

As the functional group-containing polyolefin (m), corresponding commercially available products can be used.

The laminate having excellent gas permeability, heat resistance and transparency, and exhibiting sufficient flexibility without using a softener which becomes a cause of bleeding out is a laminate obtained by laminating a layer comprising an olefin-based copolymer composition containing the component (a) and the component (b), and a layer comprising the thermoplastic polyamide elastomer (l) via the functional group-containing polyolefin adhesive layer (m).

As the method for obtaining the laminate, there are listed a co-extrusion method using an apparatus in which layers are melted in separate extruders respectively, and three layers can be combined though a dice commonly held at the leading ends of the machines, a so-called lamination method in which the layer (l) and the adhesive layer (m) are previously pressed under melted conditions onto a sheet or film prepared by a co-extrusion method, with melting and extruding an olefin-based copolymer composition layer, a method in which sheets or films previously prepared are heated and pressed, as well as other methods. Among them, a co-extrusion method is suitably used in view of workability. Further, processing such as painting, plating and the like can also be performed in producing the laminate.

The co-extrusion temperatures are temperatures at which all components to be mixed are melted, and they are usually in the range from about 180 to 250° C., preferably from about 180 to 230° C. When sheets or films previously prepared are heated and pressed, the heating temperature is from about 70 to 150° C., preferably from about 80 to 140° C., and the pressure is from about 1 to 10 kg/cm², preferably from about 2 to 8 kg/cm². The thickness of layers in the laminate is appropriately selected depending on use, and the thickness of the olefin-based copolymer composition is usually from about 40 to 900 μm, preferably from about 40 to 800 μm, the thickness of the layer (l) is usually from about 1 to 900 μm, preferably from about 2 to 800 μm, the thickness of the adhesive layer (m) is usually from about 1 to 900 μm, preferably from about 2 to 800 μm, and the total thickness of the laminate is usually from about 50 to 1,000 μm, preferably from about 50 to 900 μm.

The laminate according to the present invention having excellent gas permeability, heat resistance and transparency, and exhibiting sufficient flexibility without using a softener which becomes a cause of bleeding out, can be optimally applied to a sheet type use such as a meat and fresh fish tray, fruit and vegetables pack, frozen food container and the like; a film type use such as food pack, daily general merchandise pack, industrial material pack, various rubber products, resin product, clothes, laminate of leather product and the like, expansion tape used for diapers, and the like; hose, tube, belt and the like; shoe use such as in sport shoes, leisure shoes, fashion sandals, leather shoes, and the like; electric household appliances use such as a television, stereo, clothes washer and the like; automobile interior and exterior parts use such as bumper parts, body panels, side seals and the like; asphalt blending materials, such as road pavement, water-proof sheets, piping coatings and the like; other daily goods, leisure goods, toys, industrial materials; and the like.

When the olefin-based copolymer composition characteristically containing the components (a) and (b) is required to have excellent mechanical strength, elastic recovery property and flexibility, it is preferably an olefin-based copolymer composition which is obtained by dynamic thermal treatment of a mixture containing about 5 to 95% by weight of the component (a) and about 5 to 95% by weight of the component (b) in the presence of a cross-linking agent. The composition preferably contains about 10 to 90% by weight of the component (a) and about 10 to 90% by weight of the component (b).

The component (a) in the olefin-based copolymer composition having excellent mechanical strength, elastic recovery property and flexibility is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combinations thereof include those described for component (a).

The component (a) in the olefin-based copolymer composition is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) in the olefin-based copolymer composition is preferably from about 0.01 to 20 mol %, more preferably from about 0.05 to 15 mol %, even more preferably from about 0.1 to 10 mol %, and particularly preferably from about 0.15 to 5 mol %. When the content of a cyclic olefin is too low, a molded article obtained by using the resulting olefin-based copolymer composition may be poor in mechanical strength and elastic recovering property, similarly, when the content of a cyclic olefin is too high, a molded article obtained by using the resulting olefin-based copolymer composition may be poor in balance between mechanical strength and flexibility.

As the olefin in the component (a) in the olefin-based copolymer composition, propylene or ethylene and propylene can be contained therein.

The content of ethylene as the olefin in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less, in view of producing the effect of improving the flexibility of the olefin-based copolymer composition. When the content is not within the above-described range, the olefin-based copolymer may contain a crystal derived from methylene chain and a molded article obtained by using the resulting olefin-based copolymer composition may be poor in flexibility.

On the other hand, when lower temperature resistance is particularly required, the content of propylene in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperature.

It is preferable that the component (a) in the olefin-based copolymer composition satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and particularly preferably the formula:

$$[y/(x+y)] \geq 0.5,$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) in the olefin-based copolymer composition has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in mechanical strength. On the other hand, when the intrinsic viscosity is too high, a molded article obtained by using the resulting olefin-based copolymer composition may be poor in flexibility. The method for measuring the intrinsic viscosity [η] is the same as that described for component (a).

The component (a) in the olefin-based copolymer composition preferably has a molecular weight distribution (Mw/Mn) measured by gel permeation chromatography (GPC) of 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) in the olefin-based copolymer composition has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) in the olefin-based copolymer composition can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of elements, containing at least one cyclopentadienyl skeleton. As a specific example of the metallocene-based catalyst, there may be, for example, mentioned metallocene-based catalysts described in JP-A Nos. 9-12635 and 9-151205 which are incorporated herein by reference in their entirety.

Particularly, in the component (a) in the olefin-based copolymer composition, it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of element, containing at least one cyclopentadienyl skeleton and having non-stereospecific structure, for producing the copolymer. The complex of a transition metal having non-stereospecific structure means a complex comprising no Cs antipode and Cn antipode (n represents an integer of 1 or more).

Further, the component (a) in the olefin-based copolymer composition can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

When the amount of the component (a) is too low (the amount of the component (b) is too high), the resulting olefin-based copolymer composition is poor in flexibility and elastic recovering property. On the other hand, when the amount of the component (a) is too high (the amount of the component (b) is too low), the resulting olefin-based copolymer composition is poor in mechanical strength.

The olefin-based copolymer composition may be an olefin-based copolymer composition obtained by dynamic thermal treatment of a mixture containing about 10 to 900 parts by weight of the following component (f-1) per 100 parts by weight of the total amount of the component (a) and the component (b), in the presence of a cross-linking agent.

(f-1): ethylene-propylene (-non-conjugated diene) random copolymer rubber

The component (f-1) is an ethylene-propylene (-non-conjugated diene) random copolymer rubber, and includes ethylene-propylene random copolymer rubber and ethylene-propylene-non-conjugated diene random copolymer rubber.

Specific examples of the non-conjugated diene include dicyclopentadiene, tricyclopentadiene, 5-methyl-2,5-norbornadiene, 5-methylene-2-norbornene, 5-ethylidene-2-norbornene, 5-isopropenyl-2-norbornene, 5-isopropylidene-2-norbornene, 5-(1-butenyl)-2-norbornene, cyclooctadiene, vinylcyclohexene, 1,5,9-cyclododecatriene, 1,4-hexadiene, 1,6-octadiene, 1,7-octadiene, 1,8-nonadiene, 1,9-decadiene, 3,6-dimethyl-1,7-octadiene and the like. Preferably, 5-ethylidene-2-norbornene and dicyclopentadiene are listed.

The above-described copolymer may be that modified with a functional group, and can be modified with an unsaturated compound having at least one functional group selected from an acid anhydride group, carboxyl group, hydroxyl group, amino group, isocyanate group and epoxy group by using an extruder and the like.

The ethylene content of the component (f-1) is preferably less than about 90 mol %, more preferably from about 50 to 85 mol %. When the ethylene content is too high, a molded article obtained by using the resulting olefin-based copolymer composition may be poor in flexibility. On the other hand, when the ethylene content is too low, a molded article obtained by using the resulting olefin-based copolymer composition may be poor in mechanical strength.

When the component (f-1) contains a non-conjugated diene, the content of the non-conjugated diene is preferably from about 0.1 to 5 mol %. When the content of the non-conjugated diene is too high, a molded article obtained by using the resulting olefin-based copolymer composition may be poor in balance between strength and flexibility.

The component (f-1) is preferably that which has a Mooney viscosity $ML_{1+4}$ (100° C.) of about 3 to 120 and has a molecular weight distribution Mw/Mn of about 1.3 to 10 (wherein, Mw represents weight-average molecular weight). When the Mooney viscosity is too low, a molded article obtained by using the resulting olefin-based copolymer composition may be poor in strength, on the other hand, when the Mooney viscosity is too high, a molded article obtained by using the resulting olefin-based copolymer composition may be poor in flexibility. When the Mw/Mn is too low, the resulting olefin-based copolymer composition may be poor in processability, on the other hand, when the Mw/Mn is too high, a molded article obtained by using the resulting olefin-based copolymer composition may be poor in flexibility.

The component (f-1) is obtained by copolymerizing ethylene and propylene, or a non-conjugated diene by using, for example, a Ziegler-Natta type catalyst or the above-described metallocene catalyst.

As the component (f-1), corresponding commercially available products can be used.

The amount used of the component (f-1) is from 10 to 900 parts by weight per 100 parts by weight of the total amount of the component (a) and the component (b). When the amount of the component (f-1) is too low, the resulting olefin-based copolymer composition may be poor in elastic recovering property and flexibility, on the other hand, when the amount of the component (f-1) is too high, the resulting olefin-based copolymer composition may be poor in mechanical strength.

The olefin-based copolymer composition having excellent mechanical strength, elastic recovering property and flexibility can be an olefin-based copolymer composition obtained by dynamic thermal treatment of a mixture containing 1 to 200 parts by weight of the following component (n) per 100 parts by weight of the total amount of the component (a) and the component (b), in the presence of a cross-linking agent.

(n): a mineral oil-based softener

As the mineral oil-based softener (n), there may be exemplified naphthene oil, paraffin oil and the like.

The amount used of the component (n) is from 1 to 200 parts by weight, preferably from 2 to 50 parts by weight per 100 parts by weight of the total amount of the components (a), (b) and (f-1). When the amount of the component (n) is too low, the resulting olefin-based copolymer composition may be poor in flexibility, on the other hand, when the amount of the component (n) is too high, the resulting olefin-based copolymer composition may be poor in mechanical strength.

In the olefin-based copolymer composition, additives such as an antioxidant, antistatic agent, anti-weathering agent, ultraviolet absorber, slipping agent, coloring agent, dispersing agent and the like; coloring agents such as carbon black and the like; and other rubber-like polymers or thermoplastic resins and the like can be appropriately compounded as additional components, in addition to the above-described components.

As the method for dynamic thermal treatment, in the presence of a cross-linking agent, of the essential components (a) and (b), the components (f-1) and (n) which are components used when necessary, and the additional components appropriately used in the olefin-based copolymer composition, the following methods are listed.

Production Method 1

1: The components (a) and (b), and the components (f-1) and (n) which are components used when necessary are kneaded until all components are uniformly mixed at a temperature (usually from about 120 to 200° C.) at which the component (b) is melted.

2: A cross-linking agent and optionally a cross-linking aid are added, and the mixture is set at or heated to a temperature at which a cross-linking reaction occurs, and dynamic thermal treatment is conducted.

The various additional components, and the like, may be added at any time during the processes 1 and 2, or after completion of the whole process.

Production Method 2

1: The components (a) and (b), the components (f-1) and (n) which are components used when necessary, the cross-linking agent and optionally a cross-linking aid are kneaded until all components are uniformly mixed at a temperature (usually from about 120 to 170° C.) at which the component (b) is melted and a cross-linking reaction does not occur.

2: The mixture is set at or heated to a temperature at which a cross-linking reaction occurs, and dynamic thermal treatment is conducted.

Various additional components, and the like, may be added at any time during the processes 1 and 2, or after completion of the whole process.

Though the production methods 1 and 2 are divided into separate stages, there is no need to take out a sample at the completion of the each stage, and the separate stage may be conducted continuously. Further, there can be also adopted a multi-divided kneading method in which a part of the constituent components is kneaded, then, the remaining constituent components are added and kneading is continued.

As to the methods for producing the olefin-based copolymer composition, any of the production method 1 and 2 is preferable. As an apparatus for producing the olefin-based copolymer composition, a closed type kneading machine such as a roll mill, Banbury mixer, kneader and the like, or single screw extruder, twin screw extruder and the like usually used in rubber and resin industries can be used, and they are not particularly restricted in order to carry out the above-described production method.

As to the cross-linking agent, cross-linking agents usually used for vulcanization of olefin-based rubber can be used. Among them, organic peroxides or phenol resin-based cross-linking agents are preferable. Example of the organic peroxide include dicumyl peroxide, di-tert-butyl peroxide, 2,5-dimethyl-2,5-di(tert-butyl peroxy)hexane, 2,5-dimethyl-di(tert-butyl peroxy)hexyne-3,1,3-bis(tert-butyl peroxy isopropyl)benzene, 1,1-bis(tert-butyl peroxy)-3,3,5-trimethylcyclohexane, n-butyl-4,4-bis(tert-butyl peroxide) pivalate, benzoyl oxide, p-chlorobenzoyl peroxide, 2,4-dicyclobenzoyl peroxide, tert-butyl peroxy benzoate, tert-butyl peroxy isopropyl carbonate, diacetyl peroxide, lauroyl peroxide, tert-butyl peroxide and the like. Among these organic peroxides, organic peroxides are preferable which initiate decomposition after dispersion of the rubber and resin component, and preferably examples include 2,5-dimethyl-2,5-di(tert-butyl peroxy)-hexyne-3,2,5-dimethyl-2,5-di(tert-butyl peroxy)hexane and 1,3-bis(tert-butyl peroxyisopropyl)benzene, and 2,5-dimethyl-2,5-di(tert-butyl peroxy)-hexyne-3 having a high decomposition temperature is most preferable. The amount used of these organic peroxides is from about 0.02 to 1.5 parts by weight, preferably from about 0.05 to 1.0 part by weight based on 100 parts by weight of the total amount of the component (a) and the component (b). When the amount of the organic peroxides is too low, the resulting olefin-based copolymer composition may be poor in elastic recovering property, similarly, when the amount of the organic peroxides is too high, the resulting olefin-based copolymer composition may be poor in flexibility.

In the olefin-based copolymer composition, when a suitable cross-linking aid is added together with the above-described peroxide type cross-linking agent, a uniform and gentle cross-linking reaction can be expected. As the cross-linking aid, for example, there are mentioned sulfur, p-quinone dioxime, p,p'-dibenzoylquinone dioxime, ethylene glycol dimethacrylate, diethylene glycol dimethacrylate, triethylene glycol dimethacrylate, tetraethylene dimethacrylate, polyethylene glycol dimethacrylate, trimethylolpropane trimethacrylate, diallylphthalate, tetraallyloxyethane, triallyl isocyanurate, N,N'-m-phenylenebismaleimide, maleic anhydride, divinylbenzene, zinc diacrylate, zinc dimethacrylate and the like. Among them, N,N'-m-phenylenebismaleimide, p,p'-dibenzoylquinone dioxime, divinylbenzene and triallyl isocyanurate are preferably used. Further, N,N'-m-phenylenebismaleimide can also be used alone as a cross-linking agent, so desired. The amount used of these cross-linking aids is usually from about 0.05 to 3 parts by weight, preferably from about 0.2 to 2 part by weight based on 100 parts by weight of the total amount of the component (a) and the component (b). When the amount of the cross-linking aids is too low, the resulting olefin-based copolymer composition may be poor in cross-linking efficiency for dynamic vulcanization, similarly, when the amount of the cross-linking aids is too high, the resulting olefin-based copolymer composition may be poor in flexibility and mechanical physical properties.

The phenol resin-based cross-linking agent is represented by the following general formula.

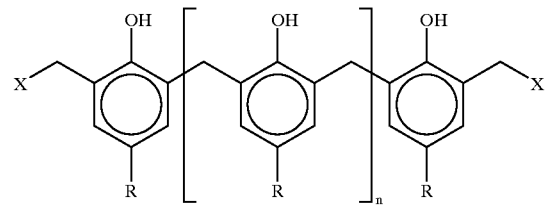

wherein, n is an integer from 0 to 10, X is a hydroxyl group or halogen atom, and R is an saturated hydrocarbon group having 1 to 15 carbon atoms. Compounds of the above-described general formula are generally used as cross-linking agents for rubber, as described, for example, in U.S. Pat. Nos. 3,287,440 and 3,709,840, which are incorporated herein by reference in their entirety. These cross-linking agents are obtained by polycondensation of a substituted phenol with an aldehyde in the presence of an alkaline catalyst. The cross-linking agent may be used alone, and for controlling cross-linking rate, a cross-linking accelerator may also be used together therewith. As the cross-linking accelerator, metal halides such as tin (II) chloride, iron (III) chloride and the like, organic halogenated compounds such as chlorinated polyethylene, butyl bromide rubber, chloroprene rubber and the like can be used. Further, a metal oxide such as zinc oxide and the like and stearic acid may also be used together as a dispersing agent.

As the derivative of p-quinone dioxime, p-benzoquinone dioxide, p-dibenzoylquinonediamide and the like are used. The cross-linking agent can be used alone, and for controlling cross-linking rate, a cross-linking accelerator may also be used together therewith. As the cross-linking accelerator, oxidizing agents such as red lead, dibenzothiazoyl sulfide and the like can be used. Further, a metal oxide such as zinc oxide and the like and stearic acid may also be used together as a dispersing agent.

As the metal oxide, zinc oxide, magnesium oxide, lead oxide, calcium oxide and the like are used, and zinc oxide and magnesium oxide are preferable. The cross-linking agent can be used alone, and for controlling cross-linking rate, a cross-linking accelerator may also be used together therewith. As the cross-linking accelerator, there can be used 2,6-di-t-butyl-p-cresol, N,N-diethylthiourea, di-o-tolylguanidine, dipentamethylenethiuram tetrasulfide, ethylenetrithio carbonate, 2-mercapto-benzothiazole, benzothiazole disulfide, N-phenyl-β-naphthylamine, tetramethylthiuram disulfide, zinc diethyldithiocarbamate, zinc dibutyldithiocarbamate, zinc dimethyldithiocarbamate and the like.

The amount of the cross-linking agent used is preferably from about 0.5 to 15 parts by weight, even more preferably from about 1 to 10 part by weight, particularly preferable from about 2 to 8 parts by weight, based on 100 parts by weight of the amount (a). When the amount of the cross-linking agent is too low, the resulting cross-linked olefin-based copolymer composition may be poor in elastic recovering property, on the other hand, when the amount of the cross-linking agent is too high, the resulting olefin-based copolymer composition may be poor in flexibility.

The above-described phenol-based cross-linking agent may be used alone, and for controlling cross-linking rate, a cross-linking accelerator may also be used together therewith. As the cross-linking accelerator, metal halides such as tin (II) chloride, iron (III) chloride and the like, organic halogenated compounds such as chlorinated polypropylene, butyl bromide rubber, chloroprene rubber and the like can be used. Further, it is more preferable to use a metal oxide such as zinc oxide and the like or stearic acid as a dispersing agent. As the other cross-linking agent, sulfur and sulfur-based compounds, p-quinone, derivatives of p-quinone dioxime, bismaleimide compounds, epoxy compounds, silane compounds, amino resins and the like are used.

The olefin-based copolymer composition having excellent mechanical strength, elastic recovering property and flexibility can be used for automobile interior and exterior equipment, parts such as for a housing and the like of weak electric parts, industrial parts, waterproof parts and the like in which conventional vulcanized rubber or soft vinyl chloride-based resins have been used.

When the olefin-based copolymer composition containing the components (a) and (b) is required to have excellent mechanical strength, flexibility and flowability, it is preferably that an olefin-based copolymer composition comprises about 1 to 80% by weight of the component (a), about 5 to 84% by weight of the component (b), about 10 to 89% by weight of the above-described component (f-1) and about 5 to 84% by weight of the following component (h-1), and the component (a) is an olefin-based copolymer having an ethylene content of less than about 90 mol %, and the component (f-1) is an ethylene-propylene (non-conjugated diene) random copolymer rubber of having an ethylene content of less than about 90 mol %.

(h-1): an ethylene-based polymer of having an ethylene content of about 90 mol % or more.

The component (a) in the olefin-based copolymer composition is an olefin-based copolymer having an ethylene content that is less than about 90 mol % obtained by copolymerizing two or more olefins, wherein the olefins are selected from the group consisting of ethylene, propylene and α-olefins having 4 to 20 carbon atoms, and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The content of ethylene as the olefin in the component (a) in the olefin-based copolymer composition is preferably about 90 mol % or less, in view of providing an effect of improving flexibility of the olefin-based copolymer composition. When the content is not within the above-described range, a molded article obtained by using the resulting olefin-based copolymer composition is poor in flexibility since the olefin-based copolymer contains a crystal derived from methylene chain.

The α-olefins having 4 to 20 carbon atoms and combination thereof include those described for component (a).

The component (a) in the olefin-based copolymer composition is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) in the olefin-based copolymer composition is preferably from about 0.01 to 20 mol %, more preferably from about 0.05 to 15 mol %, even more preferably from about 0.1 to 10 mol %, and particularly preferably from about 0.15 to 5 mol %. When the content of a cyclic olefin is too low, a molded article obtained by using the resulting olefin-based copolymer composition may be poor in heat resistance, similarly, when the content of a cyclic olefin is too high, a molded article obtained by using the resulting olefin-based copolymer composition may be poor in its balance between mechanical strength and flexibility.

As the olefin in the component (a) in the olefin-based copolymer composition, propylene, or ethylene and propylene can be contained therein.

The content of ethylene as the olefin in the component (a) in the olefin-based copolymer composition is more preferably about 80 mol % or less, even more preferably about 70 mol % or less, particularly preferably about 60 mol % or less, and most preferably about 50 mol % or less, in view of producing an effect of improving flexibility of the olefin-based copolymer composition. When the content is not within the above-described range, the olefin-based copolymer may contain a crystal derived from methylene chain and a molded article obtained by using the resulting olefin-based copolymer composition may be poor in flexibility.

Furthermore, when lower temperature resistance is particularly required, the content of propylene in the component (a) in the olefin-based copolymer composition is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperatures.

It is preferable that the component (a) in the olefin-based copolymer composition satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

particularly preferably the formula:

$$[y/(x+y)] \geq 0.5,$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) in the olefin-based copolymer composition has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in mechanical strength. On the other hand, when the intrinsic viscosity is too high, a molded article obtained by using the resulting olefin-based copolymer composition may be poor in flexibility. The method for measuring the intrinsic viscosity [η] is the same as that described for component (a).

The component (a) in the olefin-based copolymer composition preferably has a molecular weight distribution (Mw/Mn) measured by gel permeation chromatography (GPC) of 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) in the olefin-based copolymer composition has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) in the olefin-based copolymer composition can be produced by using a known Ziegler-Natta type catalyst or metallocene-based catalyst. A metallocene-based catalyst is preferably used since a copolymer having high molecular weight, a narrow molecular weight distribution and a narrow composition distribution is obtained. As the metallocene-based catalyst, there may be mentioned complexes of a transition metal of group IVA to group VIA in the periodic table of elements, containing at least one cyclopentadienyl skeleton. As the specific example of the metallocene-based catalyst, there may be, for example, listed metallocene-based catalysts described in JP-A Nos. 9-12635 and 9-151205 which are incorporated herein by reference in their entirety.

Particularly, in the component (a) in the olefin-based copolymer composition, it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing an atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) in the olefin-based copolymer composition can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization composed of the component (A), (B) and/or (C) described for component (a).

Specific examples, amounts used and methods of using the components (A), (B) and (C) include those described for component (a).

The component (f-1) in the olefin-based copolymer composition is an ethylene-propylene (-non-conjugated diene) random copolymer rubber, of which the ethylene content is less than 90 mol %.

The ethylene-propylene (-non-conjugated diene) random copolymer rubber includes ethylene-propylene random copolymer rubber and ethylene-propylene-non-conjugated diene random copolymer rubber.

Specific examples of the non-conjugated diene include dicyclopentadiene, tricyclopentadiene, 5-methyl-2,5-norbornadiene, 5-methylene-2-norbornene, 5-ethylidene-2-norbornene, 5-isopropenyl-2-norbornene, 5-isopropylidene-2-norbornene, 5-(1-butenyl)-2-norbornene, cyclooctadiene, vinylcyclohexene, 1,5,9-cyclododecatriene, 1,4-hexadiene, 1,6-octadiene, 1,7-octadiene, 1,8-nonadiene, 1,9-decadiene, 3,6-dimethyl-1,7-octadiene and the like. Preferably, 5-ethylidene-2-norbornene and dicyclopentadiene are listed.

The above-described copolymer may be that modified with a functional group, and can be modified with an unsaturated compound having at least one functional group selected from an acid anhydride group, carboxyl group, hydroxyl group, amino group, isocyanate group and epoxy group by using an extruder and the like.

The ethylene content of the component (f-1) in the olefin-based copolymer composition is preferably from about 50 to 85 mol %. When the ethylene content is too high, a molded article obtained by using the resulting olefin-based copolymer composition may be poor in flexibility. On the other hand, when the ethylene content is too low, a molded article obtained by using the resulting olefin-based copolymer composition may be poor in mechanical strength.

When the component (f-1) in the olefin-based copolymer composition contains a non-conjugated diene, the content of the non-conjugated diene is preferably from about 0.1 to 5 mol %. When the content of the non-conjugated diene is too high, a molded article obtained by using the resulting olefin-based copolymer composition may be poor in balance between strength and flexibility.

The component (f-1) in the olefin-based copolymer composition preferably has a Mooney viscosity $ML_{1+4}$ (100° C.) of about 3 to 120 and has a molecular weight distribution Mw/Mn of about 1.3 to 10 (wherein, Mw represents weight-average molecular weight). When the Mooney viscosity is too low, a molded article obtained by using the resulting olefin-based copolymer composition may be poor in strength, on the other hand, when the Mooney viscosity is too high, a molded article obtained by using the resulting olefin-based copolymer composition may be poor in flexibility. When the Mw/Mn is too low, the resulting olefin-based copolymer composition may be poor in processability, on the other hand, when the Mw/Mn is too high, a molded article obtained by using the resulting olefin-based copolymer composition may be poor in flexibility.

The component (f-1) in the olefin-based copolymer composition is obtained by copolymerizing ethylene and propylene, or a non-conjugated diene ethylene and propylene using, for example, a Ziegler-Natta type catalyst or the above-described metallocene catalyst.

As the component (f-1) in the olefin-based copolymer composition, corresponding commercially available products can be used.

The component (h-1) is an ethylene-based polymer having an ethylene content of about 90 mol % or more.

As specific examples of the component (h-1), polyethylenes produced by a known low pressure method or high pressure method, copolymers of ethylene with α-olefins having 3 to 8 carbon atoms having an ethylene content of 90 mol % or more, copolymers of ethylene with vinyl acetate and the like are mentioned. Specific examples of the α-olefin having 3 to 8 carbon atoms include propylene, 1-butene, 4-methyl-1-petene, 1-hexene, 1-octene and the like.

The composition preferably comprises about 20 to 60% by weight of the component (a), about 20 to 40% by weight of the component (b), about 30 to 80% by weight of the component (f-1) and about 8 to 30% by weight of the component (h-1).

When the amount of the component (a) is too low, the resulting olefin-based copolymer composition may be poor in flexibility, on the other hand, when the amount of the component (a) is too high, the resulting olefin-based copolymer composition may be poor in mechanical strength. When the amount of the component (b) is too low, the resulting olefin-based copolymer composition is poor in mechanical strength and heat resistance, similarly, when the amount of the component (b) is too high, the resulting olefin-based copolymer composition is poor in flexibility. When the amount of the component (f-1) is too low, the resulting olefin-based copolymer composition is poor in flexibility, likewise, when the amount of the component (f-1) is too high, the resulting olefin-based copolymer composition is poor in mechanical strength and flowability. Furthermore, when the amount of the component (h-1) is too low, the resulting olefin-based copolymer composition is poor in mechanical strength and flowability, and moreover, when the amount of the component (h-1) is too high, the resulting olefin-based copolymer composition is poor in flexibility.

The ethylene content as the olefin content of the component (a) is about 90 mol % or less, and when the content is not within this range, the resulting olefin-based copolymer composition may be poor in flexibility.

The olefin-based copolymer composition may be an olefin-based copolymer composition comprising about 1 to 200 parts by weight of the above-described component (n) per 100 parts by weight of the total amount of the components (a), (b), (f-1) and (h-1).

As the (n) component in the olefin-based copolymer composition, the above-described examples of the component (n) can be used.

By containing the component (n) in an amount within the above-described range, the effect that processability, flowability and flexibility are further improved can be obtained. However, when the amount of the component (n) is too high, such problems as decrease in mechanical strength and bleeding of a softener may be caused to occur.

To the olefin-based copolymer composition, additives such as an antioxidant, antistatic agent, anti-weathering agent, ultraviolet absorber, slipping agent, coloring agent, dispersing agent and the like; coloring agents such as carbon black; fillers such as glass fiber, carbon fiber, metal fiber, aramide fiber, glass bead, asbestos, mica, calcium carbonate, potassium titanate whiskers, talc, barium sulfate, glass flakes and the like; and other rubber-like polymers or thermoplastic resins and the like can be appropriately added as additional components, in addition to the above-described components.

The olefin-based copolymer composition can also be subjected to vulcanization such as sulfur vulcanization, peroxide vulcanization, metal ion vulcanization, silane vulcanization, resin vulcanization and the like by a conventionally known method.

For obtaining the olefin-based copolymer composition, the above-described components, the essential components (a), (b), (f-1) and (h-1), and the component (n), which is used when necessary, and the additional components appropriately used may advantageously be kneaded using a usual kneading apparatus, for example, a rubber mill, Brabender mixer, Banbury mixer, kneader, twin screw extruder, and the like. As the kneading apparatus, any of a closed type and an open type apparatus may be adopted, and a closed type apparatus which can be utilized in combination with an inert gas is preferable. The kneading temperature is a temperature at which all of mixed constituent components are melted, and usually is from about 160 to 250° C., preferably from about 180 to 240° C. The kneading time can not be generally determined since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of the constituent components is kneaded, the remaining constituent components are added and kneading of the constituent component is continued.

The olefin-based copolymer composition having excellent mechanical strength, flexibility and flowability can be used for automobile interior and exterior equipment, parts such as a housing, packing and the like of weak electric parts, industrial parts, waterproof parts and the like in which conventional soft vinyl chloride-based resins have been used.

When the olefin-based copolymer composition containing the components (a) and (b) is required to have excellent mechanical strength, flexibility and gas permeability, it is preferably that an olefin-based copolymer composition comprises about 40 to 90% by weight of the component (a) and about 10 to 60% by weight of the component (b), and the component (a) is composed of about 1 to 99% by weight of the following component (a-1) and about 1 to 99% by weight of the following component (a-2). Further, it is preferable that the composition comprises about 50 to 85% by weight of the component (a) and about 15 to 50% by weight of the component (b), and the component (a) is composed of about 2 to 98% by weight of the following component (a-1) and about 2 to 98% by weight of the following component (a-2).

(a-1): an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, the olefin-based copolymer satisfying the following formula:

$$[y/(x+y)]<0.50$$

(wherein, x represents the content (mol %) of ethylene in the component (a-1), and y represents the content (mol %) of α-olefins having 4 to 20 carbon atoms in the component (a-1)).

(a-2): an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, the olefin-based copolymer satisfying the following formula:

$$[y/(x+y)] \geq 0.50$$

(wherein, x represents the content (mol %) of ethylene in the component (a-2), and y represents the content (mol %) of α-olefins having 4 to 20 carbon atoms in the component (a-2)).

(The component (a-1) in the present invention is an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, the olefin-based copolymer satisfying the following formula:

$$[y/(x+y)]<0.50$$

(wherein, x represents the content (mol %) of ethylene in the component (a-1), and y represents the content (mol %) of α-olefins having 4 to 20 carbon atoms in the component (a-1)).

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combination thereof include those described for component (a).

The component (a-1) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

As the preferable cyclic olefin, cyclic monoolefins and cyclic polyenes can be mentioned, and specific examples thereof include those described for component (a).

The content of a cyclic olefin in the component (a-1) is preferably from about 0.01 to 20 mol %, more preferably from about 0.05 to 15 mol %, even more preferably from about 0.1 to 10 mol %, particularly preferably from about 0.15 to 5 mol %. When the content of a cyclic olefin is too low, a molded article obtained by using the resulting olefin-based copolymer composition may be poor in heat resistance, similarly, when the content of a cyclic olefin is too high, a molded article obtained by using the resulting olefin-based copolymer composition may be poor in balance between mechanical strength and flexibility.

The content of ethylene as the olefin in the component (a-1) is preferably about 80 mol % or less. When the content is not within in the above-described range, a molded article obtained by using the resulting olefin-based copolymer composition may be poor in flexibility.

On the other hand, when lower temperature resistance is particularly required, the content of propylene in the component (a-1) is preferably about 90 mol % or less, more preferably about 80 mol % or less, even more preferably about 70 mol % or less, particularly preferably about 60 mol % or less, and most preferably about 50 mol % or less. When the content is not included in the above-described range, a molded article obtained by using the resulting olefin-based copolymer composition may be poor in impact resistance at lower temperature.

It is necessary that the component (a-1) satisfies the following formula:

$$[y/(x+y)]<0.5$$

more preferably the formula:

$$0.20\leq[y/(x+y)]<0.50,$$

and
even more preferably the formula:

$$0.30\leq[y/(x+y)]<0.50$$

(wherein, x represents the content (mol %) of ethylene in the component (a-1), and y represents the content (mol %) of α-olefins having 4 to 20 carbon atoms in the component (a-1)).

When the above-described formula is not satisfied, the resulting olefin-based copolymer composition may be poor in low temperature resistance.

The component (a-1) has an intrinsic viscosity [η] measured by using a tetralin solvent at a temperature of 135° C. preferably of about 0.3 to 10, more preferably of about 0.5 to 7, even more preferably of about 0.7 to 5. The reason for this is the same as that described for component (a). Also, the method for measuring the intrinsic viscosity [η] is the same as that described for component (a).

The component (a-1) preferably has a molecular weight distribution (Mw/Mn) measured by gel permeation chromatography (GPC) of 3 or less. The reason for this is the same as that described for component (a). Also, the method for measuring the molecular weight distribution is the same as that described for component (a).

The component (a-1) can be produced by using a known Ziegler-Natta type catalyst or metallocene-based catalyst.

The component (a-2) in the present invention is an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, the olefin-based copolymer satisfying the following formula:

$$[y/(x+y)]\geq 0.50$$

(wherein, x represents the content (mol %) of ethylene in the component (a-2), and y represents the content (mol %) of α-olefins having 4 to 20 carbon atoms in the component (a-2)).

It is necessary that the total number of carbon atoms of the selected olefins is 6 or more. When olefins are selected so that the total number of carbon atoms is less than 6, a molded article obtained by using the resulting olefin-based copolymer composition may be poor in flexibility.

The α-olefins having 4 to 20 carbon atoms and combinations thereof include those described for component (a).

The component (a-2) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The α-olefins having 4 to 20 carbon atoms and combinations thereof include those described for component (a).

In particular, when lower temperature resistance is particularly required, the content of propylene in the component (a-2) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperatures.

It is necessary that the component (a-2) satisfies the following formula:

$$[y/(x+y)] \geqq 0.5$$

more preferably the formula:

$$0.50 \leqq [y/(x+y)] \leqq 0.90,$$

and
even more preferably the formula:

$$0.50 \leqq [y/(x+y)] \leqq 0.80$$

(wherein, x represents the content (mol %) of ethylene in the component (a-2), and y represents the content (mol %) of α-olefins having 4 to 20 carbon atoms in the component (a-2)).

When the above-described formula is not satisfied, a molded article obtained by using the resulting olefin-based copolymer composition may be poor in flexibility and low temperature resistance.

The component (a-2) has an intrinsic viscosity [η] measured by using a tetralin solvent at a temperature of 135° C. preferably of about 0.3 to 10, more preferably of about 0.5 to 7, even more preferably of about 0.7 to 5. The reason for this is the same as that described for component (a). Also, the method for measuring the intrinsic viscosity [η] is the same as that described for component (a).

The component (a-2) preferably has a molecular weight distribution (Mw/Mn) measured by gel permeation chromatography (GPC) of 3 or less. The reason for this is the same as that described for component (a). Also, the method for measuring the molecular weight distribution is the same as that described for component (a).

It is preferable that the component (a-2) has neither a peak of 1 J/g or more based on melting of a crystal nor a peak of 1 J/g or more based on crystallization when measured by differential scanning calorimetry (DSC). The reason for this is the same as that described for component (a). Also, the measuring method by differential scanning calorimetry is the same as that described for component (a)

The component (a-2) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As a specific example of the metallocene-based catalyst, there may be, for example, listed metallocene-based catalysts described in JP-A Nos. 9-12635 and 9-151205 which are incorporated herein by reference in their entirety.

Particularly, in the component (a-2), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing an atactic stereo-regularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of element, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a-2) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

In the olefin-based copolymer composition having excellent mechanical strength, flexibility and gas permeability, when the amount of the component (a) is too low (the amount of the component (b) is too high), the resulting olefin-based copolymer composition may be poor in flexibility and gas permeability. Similarly, when the amount of the component (a) is too high (the amount of the component (b) is too low), the resulting olefin-based copolymer composition may be poor in mechanical strength.

Further, when the amount of the component (a-1) in the component (a) is too low (the amount of the component (a-2) is too high), the resulting olefin-based copolymer composition may be poor in balance between mechanical strength and flexibility. Moreover, when the amount of the component (a-1) is too high (the amount of the component (a-2) is too low), the resulting olefin-based copolymer composition may be poor in flexibility.

To the olefin-based copolymer composition, additives such as an antioxidant, antistatic agent, anti-weathering agent, ultraviolet absorber, slipping agent, coloring agent, dispersing agent and the like; coloring agents such as carbon black; and other rubber-like polymers or thermoplastic resins and the like can be appropriately added as additional components.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of a closed type and open type apparatus may be adopted, and a closed type apparatus which can be utilized in combination with an inert gas is preferable. The kneading temperature is a temperature at which all of mixed constituent components are melted, and usually is from about 160 to 250° C., preferably from about 180 to 240° C. The kneading time can not be generally determined since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of the constituent components is kneaded, the remaining constituent components are added to this and kneading of the constituent components is continued.

The olefin-based copolymer composition can be applied to sheet use such as a meat and fresh fish tray, fruit and vegetables pack, frozen food container and the like; film use such as food pack, daily general merchandise pack, industrial material pack, various rubber products, resin product, clothes, laminate of leather product and the like, expansion tape used for diaper, and the like; hose, tube, belt and the like; shoe uses such as sport shoes, leisure shoes, fashion sandals, leather shoes, and the like; electric household appliances use such as a television, stereo, clothes washer and the like; automobile interior and exterior parts uses such as for bumper parts, body panels, side seals, inner panels and the like; asphalt blending materials such as road pavement, water-proof sheets, piping coatings and the like; other daily goods, leisure goods, toys, stationery, industrial materials and the like.

The invention also relates to an olefin-based copolymer composition comprising (a) an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, and the component (c) comprising the following component (c-1) and/or component (c-2)

(c-1): a block copolymer comprising a polymer block comprising a vinyl aromatic compound and a polymer block comprising a conjugated diene compound (c-2): a hydrogenated copolymer of the component (c-1)

The component (a) is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combinations thereof include those described for component (a).

The component (a) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) is preferably from about 0.01 to 20 mol %, more preferably from about 0.05 to 15 mol %, even more preferably from about 0.1 to 10 mol %, particularly preferably from about 0.15 to 5 mol %. When the content of a cyclic olefin is too low, a molded article obtained by using the resulting olefin-based copolymer composition may be poor in heat resistance, similarly, when the content of a cyclic olefin is too high, a molded article obtained by using the resulting olefin-based copolymer composition may be poor in its balance between mechanical strength and flexibility.

As the olefin in the component (a), propylene or ethylene and propylene can be contained therein.

The content of ethylene as the olefin in the component (a) is preferably about 90 mol % or less, more preferably about 80 mol % or less, even more preferably about 70 mol % or less, particularly preferably about 60 mol % or less, and most preferably about 50 mol % or less, in view of producing an effect of improving flexibility of the olefin-based copolymer composition. When the content is not within the above-described range, the olefin-based copolymer may contain a crystal derived from methylene chain and a molded article obtained by using the resulting olefin-based copolymer composition may be poor in flexibility.

On the other hand, when a lower temperature resistance is particularly required, the content of propylene in the component (a) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperature.

It is preferable that the component (a) satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

particularly preferably the formula:

$$[y/(x+y)] \geq 0.5.$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in strength. Similarly, when the intrinsic viscosity is too high, a molded article obtained by using the resulting olefin-based copolymer composition may be poor in flexibility. The method for measuring the intrinsic viscosity [η] is the same as that described for component (a).

The component (a) preferably has a molecular weight distribution (Mw/Mn) as measured by gel permeation chromatography (GPC) of about 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As a specific example of the metallocene-based catalyst, there may be, for example, listed metallocene-based catalysts described in JP-A Nos. 9-12635 and 9-151205 which are incorporated herein by reference in their entirety.

Particularly, in the component (a), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

The component (c-1) is a block copolymer comprising a polymer block comprising a vinyl aromatic compound and a polymer block comprising a conjugated diene compound.

The polymer block comprising a vinyl aromatic compound is a polymer block containing a vinyl aromatic compound as a main component, and containing a conjugated diene compound, and the like, as other constituent components. Examples of the vinyl aromatic compound include styrene, α-methylstyrene, p-methylstyrene, vinylxylene, monochlorostyrene, dichlorostyrene, monobromostyrene, dibromostyrene, fluorostyrene, p-tert-butylstyrene, ethylstyrene, vinylnaphthalene and the like. These are used alone or in combinations thereof. Among them, styrene is particularly preferable. The content of the vinyl aromatic compound in the polymer block is preferably from about 60 to 99% by weight. When the content is too low, a molded article obtained by using the resulting olefin-based copolymer composition may be poor in mechanical strength. Similarly, when the content is too high, a molded article obtained by using the resulting olefin-based copolymer composition may be poor in flexibility.

The polymer block comprising a conjugated diene compound is a polymer block containing a conjugated diene compound as a main component, and containing a vinyl aromatic compound and the like as other constituent components. Examples of the conjugated diene compound include 1,3-butadiene, isoprene, 2,3-dimethyl-1,3-butadiene, 2-neopentyl-1,3-butadiene, 2-chloro-1,3-butadiene, 2-cyano-1,3-butadiene, substituted straight-chain conjugated pentadienes, straight-chain and side chain conjugated hexadienes and the like. These are used alone or in combination thereof. Among them, 1,3-butadiene and isoprene are particularly preferable. The content of the conjugated diene compound in the polymer block is preferably from about 60 to 99% by weight. When the content is too low, a molded article obtained by using the resulting olefin-based copolymer composition may be poor in flexibility. Likewise, when the content is too high, a molded article obtained by using the resulting olefin-based copolymer composition may be poor in mechanical strength.

Specifically, the block copolymer (c-1) is represented by the general formula: (cH-cS)n, (cH-cS)n-cH, (cH-cS)n-X (wherein, cH represents a polymer block comprising a vinyl aromatic compound, cS represented a polymer block comprising a conjugated diene compound, X represents a coupling agent residual group, and n represents an integer of 1 or more).

In the block copolymer comprising a polymer block comprising a vinyl aromatic compound and a polymer block comprising a conjugated diene compound, the ratio of (a polymer block comprising a vinyl aromatic compound)/(a polymer block comprising a conjugated diene compound) is preferably from about 2/98 to 50/50. When the ratio is too low, a molded article obtained by using the resulting olefin-based copolymer composition may be poor in elasticity and high elasticity may not be obtained. Similarly, when the ratio is too high, a molded article obtained by using the resulting olefin-based copolymer composition may be poor in flexibility.

For obtaining the block copolymer (c-1), for example, the following process may advantageously be used: a block cH or a block cS is first polymerized using a polymerization initiator such as an organic lithium compound and the like generally in an organic solvent, then, the block cS or the block cH is polymerized. Any of the block cH and the block cS may be polymerized first. Further, a (cH-cS)n block copolymer (n is an integer of 1 or more) can also be obtained by repeating the above-described process.

Further, a cH-cS-cH block copolymer can be obtained by polymerizing a block cH, then polymerizing a block cS, and further polymerizing the block cH using a polymerization initiator such as an organic lithium compound and the like. Further, a (cH-cS)n-cH block copolymer (n is an integer of 1 or more) can also be obtained by repeating the above-described process.

Further, a (cH-cS)n-X block copolymer (X is a coupling agent residual group, n is an integer of 1 or more) can also be obtained by adding a coupling agent to the thus obtained (cH-cS)n block copolymer.

Examples of the coupling agent include diethyl adipate, divinylbenzene, tetrachlorosilane, butyltrichlorosilane, tetrachlorotin, butyltrichlorotin, dimethyldichlorosilane, tetrachlorogermanium, 1,2-dibromoethane, 1,4-chloromethylbenzene, bis(trichlorosilyl)ethane, epoxidized linseed oil, tolylene diisocyanate, 1,2,4-benzene triisocyanate and the like.

As the block copolymer comprising a polymer block comprising a vinyl aromatic compound and a polymer block comprising a conjugated diene compound (c-1), corresponding commercially available products can also be used.

The component (c-2) is a hydrogenated copolymer of the compound (c-1).

For obtaining the component (c-2), for example, the above-described component (c-1) may be dissolved in an inert solvent, and hydrogenation may be conducted in the presence of a hydrogenation catalyst under a pressure of about 1 to 100 kg/cm$^2$G at a temperature of about 20 to 150° C.

The hydrogen addition ratio in the conjugated diene compound in the above-described component (c-1) is controlled by changing the amount added of a hydrogenation catalyst or a hydrogenation compound, or hydrogen pressure and reaction time in conducting hydrogenation reaction.

As the hydrogenation copolymer (c-2) of the component (c-1), corresponding commercially available products can also be used.

The component (c) in the present invention comprises the component (c-1) and/or the component (c-2). Namely, the components (c-1) and (c-2) may be used alone, or in combinations thereof.

When the olefin-based copolymer composition containing the components (a) and (c) is required to have excellent flexibility and mechanical strength, it is preferably that an olefin-based copolymer composition comprises about 1 to 98% by weight of the component (a), about 1 to 98% by weight of the component (b) and about 1 to 98% by weight of the component (c). It is further preferable that an olefin-based copolymer composition comprises about 5 to 90% by weight of the component (a), about 5 to 90% by weight of the component (b) and about 5 to 90% by weight of the component (c).

As a specific example of the component (b), those described for the component (b) as previously stated may be listed.

When the amount of the component (a) is too low, a molded article obtained by using the resulting olefin-based copolymer composition may be poor in anti-weathering property and flexibility. Similarly, when the amount the component (a) is too high, a molded article obtained by using the resulting olefin-based copolymer composition may be poor in mechanical property. When the amount of the component (b) is too low, a molded article obtained by using the resulting olefin-based copolymer composition may be poor in mechanical strength. Likewise, when the amount the component (b) is too high, a molded article obtained by using the resulting olefin-based copolymer composition may be poor in flexibility. When the amount of the component (c) is too low, a molded article obtained by using the resulting olefin-based copolymer composition is poor in mechanical strength. Moreover, when the amount the component (c) is too high, a molded article obtained by using the resulting olefin-based copolymer composition may be poor in anti-weathering property and flexibility.

To the olefin-based copolymer composition, additives such as an antioxidant, antistatic agent, anti-weathering agent, ultraviolet absorber, slipping agent, coloring agent, dispersing agent and the like; coloring agents such as carbon black; and other rubber-like polymers or thermoplastic resins and the like can be appropriately added as additional components.

The olefin-based copolymer composition can also be subjected to vulcanization such as sulfur vulcanization, peroxide vulcanization, metal ion vulcanization, silane vulcanization, resin vulcanization and the like by a conventionally known method.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of close type and open type apparatuses may be adopted, and a close type apparatus which can be utilized in combination with an inert gas is preferable. The kneading temperature is a temperature at which all of mixed constituent components are melted, and usually from about 160 to 250° C., preferably from about 180 to 240° C. The kneading time can not be generally determined since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of the constituent components is kneaded, the remaining constituent components are added and kneading of the constituent components is continued.

The olefin-based copolymer composition can be applied to various molding methods such as an injection molding method, sheet extrusion molding method, vacuum molding method, hollow molding method, press molding method, extrusion molding method, form molding method and the like, to obtain various molded articles.

The invention also relates to an olefin-based copolymer composition comprising (a) an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, and the component (d) comprising the component (b) and
(d-1) an isobutylene-isoprene copolymer rubber and/or halogenated isobutylene-isoprene copolymer rubber.

The component (a) is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combinations thereof include those described for component (a).

The component (a) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more, and wherein, the above-described "two or more olefins" and "cyclic olefin" are distinct moieties from each other.

The preferable cyclic olefins include those described for component (a).

The content of a cyclic olefin in the component (a) is preferably from about 0.01 to 20 mol %, more preferably from about 0.05 to 15 mol %, even more preferably from about 0.1 to 10 mol %, particularly preferably from about 0.15 to 5 mol %. When the content of a cyclic olefin is too low, a molded article obtained by using the resulting olefin-based copolymer composition may be poor in heat resistance, similarly, when the content of a cyclic olefin is too high, a molded article obtained by using the resulting olefin-based copolymer composition may be poor in balance between mechanical strength and flexibility.

As the olefin in the component (a), propylene or ethylene and propylene can be contained therein.

The content of ethylene as the olefin in the component (a) is preferably about 90 mol % or less, more preferably about 80 mol % or less, even more preferably about 70 mol % or less, particularly preferably about 60 mol % or less, and most preferably about 50 mol % or less, in view of producing an effect of improving flexibility of the olefin-based copolymer composition. When the content is not within the above-described range, the olefin-based copolymer may contain a crystal derived from methylene chain and a molded article obtained by using the resulting olefin-based copolymer composition may be poor in flexibility.

Likewise, when lower temperature resistance is particularly required, the content of propylene in the component (a) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperature.

It is preferable that the component (a) satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in mechanical strength. Similarly, when the intrinsic viscosity is too high, a molded article obtained by using the resulting olefin-based copolymer composition may be poor in flexibility. The method for measuring the intrinsic viscosity [η] is the same as that described for component (a).

The component (a) preferably has a molecular weight distribution (Mw/Mn) measured by gel permeation chromatography (GPC) of about 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As to a specific example of the metallocene-based catalyst, there may be, for example, mentioned metallocene-based catalysts described in JP-A Nos. 9-12635 and 9-151205 which are incorporated herein by reference in their entirety.

Particularly, in the component (a), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing an atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

As the specific example of the component (b), those described for the component (b) as previously stated may be listed.

The component (d-1) is an isobutylene-isoprene copolymer rubber and/or halogenated isobutylene-isoprene copolymer rubber.

The isobutylene-isoprene copolymer rubber is a rubber-like polymer comprising isobutylene and isoprene containing usually from about 0.5 to 15 mol %, preferably from about 0.8 to 5.0 mol % of isoprene. When the amount of isoprene is too low, the resulting olefin-based copolymer composition may be poor in elastic recovering property. Likewise, when the amount isoprene is too high, the resulting olefin-based copolymer composition may be poor in flexibility.

As a halogen in the halogenated isobutylene-isoprene copolymer rubber, chlorine and bromine are mentioned. The content of halogen is usually from about 0.5 to 4.0% by weight. When the amount of a halogen is too low, the resulting olefin-based copolymer composition may be poor in mechanical strength. Likewise, when the amount halogen is too high, the resulting olefin-based copolymer composition may be poor in flexibility.

As the component (d-1), corresponding commercially available products can be used.

When the olefin-based copolymer composition containing the components (a) and (d) is required to have excellent gas impermeability, mechanical strength, elastic recovering property, flexibility and flowability, it is preferably that an olefin-based copolymer composition comprises about 1 to 80% by weight of the component (a), about 10 to 89% by weight of the component (b) and about 10 to 89% by weight of the component (d-1). Further, it is preferable that the composition comprises about 20 to 60% by weight of the component (a), about 20 to 40% by weight of the component (b) and about 30 to 80% by weight of the component (d-1).

When the amount of the component (a) is too low, the resulting olefin-based copolymer composition may be poor in flexibility. Similarly, when the amount the component (a) is too high, the resulting olefin-based copolymer composition may be poor in mechanical strength. When the amount of the component (b) is too low, the resulting olefin-based copolymer composition may be poor in mechanical strength. Likewise, when the amount the component (b) is too high, the resulting olefin-based copolymer composition may be poor in flexibility and elastic recovering property. When the amount of the component (d-1) is too low, the resulting olefin-based copolymer composition may be poor in gas impermeability. Moreover, when the amount the component (d-1) is too high, the resulting olefin-based copolymer composition may be poor in mechanical strength.

To the olefin-based copolymer composition, additives such as an antioxidant, antistatic agent, anti-weathering agent, ultraviolet absorber, slipping agent, coloring agent, dispersing agent and the like; coloring agents such as carbon black; and other rubber-like polymers or thermoplastic resins and the like can be appropriately added as additional components.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of a closed type and open type apparatus may be adopted, and a closed type apparatus which can be utilized in combination with an inert gas is preferable. The kneading temperature is a temperature at which all of mixed constituent components are melted, and is usually from about 160 to 250° C., preferably from about 180 to 240° C. The kneading time can not be generally determined since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of constituent components is kneaded, the remaining constituent components are added to this and kneading of the constituent components is continued.

For obtaining the olefin-based copolymer composition, the above-described components (a), (b) and (d-1) can be vulcanized dynamically in the presence of a cross-linking agent.

As the cross-linking agent, those usually used for vulcanization of isobutylene-isoprene copolymer rubber can be used, and there can be exemplified sulfur, phenol resins, metal oxides, metal hydroxides, metal chlorides, p-quinone dioxime or bismaleimide-based cross-linking agents, and the like. Among them, the phenol resin-based cross-linking agents, p-quinone dioxime derivatives are preferred, and when the component (d-1) is halogenated isobutylene-isoprene rubber, metal oxides or metal hydroxides are preferable.

The phenol-based cross-linking agent includes those substances described for olefin-based copolymer compositions having excellent mechanical strength, elastic recovering property and flexibility which comprise components (a) and (b).

As the p-quinone dioxime derivative, p-benzoquinone dioxide orp-dibenzoylquinone diamide and the like are used. The cross-linking agent can be used alone, and for controlling cross-linking rate, a cross-linking accelerator may also be used together therewith. As the cross-linking accelerator, oxidizing agents such as red lead, dibenzothiazoyl sulfide and the like can be used. Further, a metal oxide such as zinc oxide and the like and stearic acid may also be used together as a dispersing agent.

As the metal oxide, zinc oxide, magnesium oxide, lead oxide, calcium oxide and the like are used, and zinc oxide and magnesium oxide are preferable. The cross-linking agent can be used alone, and for controlling cross-linking rate, a cross-linking accelerator may also be used together therewith. As the cross-linking accelerator, there can be used 2,6-di-t-butyl-p-cresol, N,N-diethylthiourea, di-o-tolylguanidine, dipentamethylenethiuram tetrasulfide, ethylenetrithio carbonate, 2-mercapto-benzothiazole, benzothiazole disulfide, N-phenyl-β-naphthylamine, tetramethylthiuram disulfide, zinc diethyldithiocarbamate, zinc dibutyldithiocarbamate, zinc dimethyldithiocarbamate and the like.

The used amount of the cross-linking agent is preferably from about 0.5 to 15 parts by weight, more preferably from about 1 to 10 part by weight, even more preferably from about 2 to 8 part by weight based on 100 parts by weight of the isobutylene-isoprene copolymer rubber. When the amount of the cross-linking agent is too low, the resulting cross-linked olefin-based copolymer composition may be poor in elastic recovering property, similarly, when the amount of the cross-linking agent is too high, the resulting olefin-based copolymer composition may be poor in flexibility.

For obtaining the olefin-based copolymer composition, the following component (n) can be contained in a mixture in addition to the above-described components (a), (b) and (d-1), and the resulting mixture can be vulcanized dynamically in the presence of a cross-linking agent.

(n): a mineral oil-based softener

Specific examples of the component (n) include those substances described for component (n) in the embodiment of the present invention comprising components (a) and (b).

The amount of the component (n) utilized is from about 1 to 200 parts by weight, preferably from about 2 to 100 part by weight based on 100 parts by weight of the total amount of the components (a), (b) and (d-1). When the amount of the component (n) is too low, the resulting cross-linked olefin-based copolymer composition may be poor in flexibility, similarly, when the amount of the component (n) is too high, the resulting cross-linked olefin-based copolymer composition may be poor in mechanical strength.

As a method for dynamic vulcanization, in the presence of a cross-linking agent, of the essential components (a), (b) and (d-1), the component (n) which is used when necessary, and the additional components appropriately used in the present invention, the following methods are mentioned.

Production Method 1

1: The components (a), (b), (d-1) and (n) are kneaded until all components are uniformly mixed at a temperature (usually from about 120 to 200° C.) at which the component (b) is melted.

2: A cross-linking agent and optionally a cross-linking accelerator are added, and the mixture is set at or heated to a temperature at which a cross-linking reaction occurs, and dynamic thermal treatment is conducted.

The various additional components and the like may be added at any time during the processes 1 and 2, or after completion of the whole process.

Production Method 2

1: The components (a), (b), (d-1) and (n), cross-linking agent and optionally a cross-linking accelerator are kneaded until all components are uniformly mixed at a temperature at which the component (b) is melted and cross-linking reaction does not occur (usually from about 120 to 170° C.)

2: The mixture is set at or heated to a temperature at which a cross-linking reaction occurs, and dynamic thermal treatment is conducted.

The various additional components, and the like, may be added at any time during the processes 1 and 2, or after completion of the whole process.

Though the production methods 1 and 2 are divided into separate stages, there is no need to take out a sample at the completion of each of the stages, since the separate stage may be conducted continuously. Further, there can be also adopted a multi-divided kneading method in which a part of the constituent components is kneaded, then, the remaining constituent components are added and kneading is continued.

As the method for producing the cross-linked olefin-based copolymer composition, any of the provided production methods 1 and 2 is preferable. As the apparatus for producing the cross-linked olefin-based copolymer composition, a closed type kneading machine such as a roll mill, Banbury mixer, kneader and the like, or single screw extruder, twin screw extruder and the like usually used in rubber and resin industries are used, and they are not particularly restricted to the above-described production method.

The olefin-based copolymer composition and cross-linked olefin-based copolymer composition having excellent gas impermeability, mechanical strength, elastic recovering property, flexibility and flowability according to the present invention can be used for automobile interior and exterior equipment, parts such as for a housing and the like of weak electric parts, industrial parts, waterproof parts and the like in which conventional vulcanized rubber and soft vinyl chloride-based resins have been used.

The invention also relates to an olefin-based copolymer composition comprising (a) an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, and the component (e) comprising the component (b) and (e-1) a tackifier resin.

The component (a) is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combinations thereof include those described for component (a).

The component (a) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more; and wherein, the above-described "two or more olefins" and "cyclic olefin" are distinct moieties from each other.

The preferable cyclic olefins include those described for component (a).

The content of a cyclic olefin in the component (a) is preferably from about 0.01 to 20 mol %, more preferably from about 0.05 to 15 mol %, even more preferably from about 0.1 to 10 mol %, and particularly preferably from about 0.15 to 5 mol %. When the content of a cyclic olefin is too low, a molded article obtained by using the resulting olefin-based copolymer composition may be poor in heat resistance, similarly, when the content of a cyclic olefin is too high, a molded article obtained by using the resulting olefin-based copolymer composition may be poor in flexibility.

As the olefin in the component (a), propylene or ethylene and propylene can be contained therein.

The content of ethylene as the olefin in the component (a) is preferably about 90 mol % or less, more preferably about 80 mol % or less, even more preferably about 70 mol % or less, particularly preferably about 60 mol % or less, and most preferably about 50 mol % or less, in view of providing an effect of improving flexibility and transparency of the olefin-based copolymer composition. When the content is not within the above-described range, the olefin-based copolymer may contain a crystal derived from methylene chain and a molded article obtained by using the resulting olefin-based copolymer composition may be poor in flexibility and transparency.

Likewise, when lower temperature resistance is particularly required, the content of propylene in the component (a) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperatures.

It is preferable that the component (a) satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in mechanical strength. Similarly, when the intrinsic viscosity is too high, a molded article obtained by using the resulting olefin-based copolymer composition may be poor in flexibility. The method for measuring the intrinsic viscosity [η] is the same as that described for component (a).

The component (a) preferably has a molecular weight distribution (Mw/Mn) measured by gel permeation chromatography (GPC) of about 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As a specific example of the metallocene-based catalyst, there may be, for example, listed metallocene-based catalysts described in JP-A Nos. 9-12635 and 9-151205 which are incorporated herein by reference in their entirety.

Particularly, in the component (a), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in transparency and flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

As the specific example of the component (b), those described for the component (b) as previously stated may be listed.

The component (e-1) is a tackifier resin.

As the specific examples of the component (e-1), there is mentioned at least one resin selected from the group consisting of a rosin-based resin, polyterpene-based resin, synthetic petroleum resin, coumarone-based resin, phenol-based resin, xylene-based resin, styrene-based resin, isoprene-based resin, and the like.

As the rosin-based resin used in the present invention, natural rosins, polymerization rosins, partial and complete hydrogenated rosins, esterified compounds such as glycerin esters, pentaerythritol ester, ethylene glycol ester, methyl ester and the like of these rosins, further, rosin derivatives obtained by disproportionation, fumaration, limation and appropriate combinations thereof, are also mentioned in the instant discovery.

As the polyterpene resin, homopolymers or copolymer of cyclic terpenes such as α-pinene, β-pinene, dipentene and the like, and terpene-phenol-based resins such as α-pinene-phenol resin, dipentene-phenol resin, terpene-bisphenol resin and the like, which are copolymers of the above-described terpenes with phenol-based compounds (such as phenol, bisphenol and the like), further, aromatic modified terpene resins which are copolymers of the above-described terpenes with aromatic monomers, are also mentioned and are included in the instant discovery.

As the petroleum resin, homopolymers or copolymers of a $C_5$ cut, a $C_6$ to $C_{11}$ cut, and other olefinic cuts of a naphtha cracked oil, and aliphatic petroleum resins, aromatic petroleum resins, aliphatic petroleum resins, aliphatic-aromatic copolymer resins which are hydrogenated products of these polymers, and the like are mentioned. Further, copolymer-based petroleum resins which are copolymers of the above-described naphtha cracked oils with the above-described terpenes and hydrogenated products thereof, and the like are also mentioned. As the $C_5$ cut of the naphtha cracked oil, isoprene, cyclopentadiene, 1,3-pentadiene, methyl butenes such as 2-methyl-1-butene, 2-methyl-2-butene and the like, pentenes such as 1-pentene, 2-pentene and the like, dicyclopentadiene, and the like are preferable, as the $C_6$ to $C_1$ cut, indene, styrene, o-, m-, p-vinyltoluene, methylstyrenes such as α-, β-methylstyrene and the like, methylindene, ethylindene, vinylxylene, propenylbenzene and the like are preferable, and as other olefin-based cuts, butene, hexene, heptene, octene, butadiene, octadiene and the like are preferable.

As the phenol-based resin, alkylphenol resins, alkylphenol-actylene resins obtained by condensation of alkylphenols with acetylene, and modified products thereof, are mentioned. As these phenol-based resins, any of novolak type resins obtained by methylolation of phenol with an acid catalyst and resol type resins obtained by methylolation of phenol with an alkali catalyst are generally acceptable.

As the xylene-based resin, a xylene-formaldehyde resin comprising m-xylene and formaldehyde, modified resins obtained by adding the third component to this resin and allowing them to react, and the like are mentioned.

As the styrene resin, lower molecular weight products of polystyrene, copolymer resin of α-methylstyrene with vinyltoluene, copolymer resin of styrene, acrylonitrile and indene, and the like are mentioned.

As the isoprene resin, resins obtained by copolymerization of a $C_{10}$ alicyclic compound and a $C_{10}$ linear compound which are dimers of isoprene, are mentioned.

Among the above-described various tackifier resins, rosin-based resins, polyterpene-based resins, synthetic petroleum resins and the like are preferable, and of these resins, those having aliphatic and/or alicyclic structure are preferable in view of the transparency of molded article obtained by using the resulting olefin-based copolymer compositions. Particularly preferable as the tackifier resins having aliphatic and/or alicyclic structure are partial and complete hydrogenated rosins and derivatives thereof as the rosin-based resins, homopolymers and copolymers of cyclic terpenes as the polyterpene-based resins, and aliphatic petroleum resins, alicyclic petroleum resins, aliphatic-alicyclic copolymer resins, and hydrogenated products of copolymers of naphtha cracked oils with various terpenes as the synthetic petroleum resins.

These tackifier resins may be used alone or in combination thereof.

As the component (e-1), corresponding commercially available products can be used.

When the olefin-based copolymer composition containing the components (a) and (e) is required to have excellent flexibility, transparency, heat resistance, elastic recovering properties and shaping properties, and to provide an excellent appearance to a molded article, it is preferably that an olefin-based copolymer composition comprises about 1 to 98% by weight of the component (a), about 1 to 98% by weight of the component (b) and about 1 to 98% by weight of the component (e-1). Further, it is preferable that the composition comprises about 5 to 95% by weight of the component (a), about 5 to 95% by weight of the component (b) and about 1 to 85% by weight of the component (e-1).

When the amount of the component (a) is too low, a molded article obtained by using the resulting olefin-based copolymer composition may be poor in flexibility. On the other hand, when the amount the component (a) is too high, a molded article obtained by using the resulting olefin-based copolymer composition maybe poor in strength. When the amount of the component (b) is too low, a molded article obtained by using the resulting olefin-based copolymer composition may be poor in strength and heat resistance. On the other hand, when the amount the component (b) is too high, a molded article obtained by using the resulting olefin-based copolymer composition may be poor in flexibility. When the amount of the component (e-1) is too low, a molded article obtained by using the resulting olefin-based copolymer composition may be poor in elastic recovering properties and shaping properties. On the other hand, when the amount the component (e-1) is too high, a molded article obtained by using the resulting olefin-based copolymer composition may be poor in appearance.

To the olefin-based copolymer composition, additives such as an antioxidant and further, an antistatic agent, anti-weathering agent, ultraviolet absorber, slipping agent, coloring agent, dispersing agent and the like; fillers such as glass fiber, carbon fiber, metal fiber, glass bead, asbestos, mica, calcium carbonate, potassium titanate whiskers, talc, aramide fiber, barium sulfate, glass flakes, fluorine resin and the like; and other rubber-like polymers or thermoplastic resins and the like can be appropriately added as additional components.

The olefin-based copolymer composition can also be subjected to vulcanization such as sulfur vulcanization, peroxide vulcanization, metal ion vulcanization, silane vulcanization, resin vulcanization and the like by a conventionally known method.

For obtaining the olefin-based copolymer composition, the above-described components may advantageously be kneaded using an extruder, kneader, Banbury mixer, single or twin screw extruder, and the like. Further, dry blending by in an injection molding machine is also possible.

The olefin-based copolymer composition can be optimally applied to stationery products such as a desk mat, cutting mat and the like; automobile interior and exterior equipment such as an inner panel surface material, bumper material and the like; medical materials; food associated materials such as a cap liner, tube for water and the like; office automation machine associated parts; audio & visual electric household appliances associated parts such as a clothes washer and the like; business machine parts; sheet use such as a meat and fresh fish tray, a fruit and vegetables pack, frozen food container and the like; film use such as a food pack, daily general merchandise pack, industrial material pack, various rubber products, resin products, clothes, laminates of leather product and the like, expansion tape used for diapers, and the like, utilizing the excellent properties as described above.

The invention also relates to an olefin-based copolymer composition comprising (a) an olefin-based copolymer obtained by copolymerizing two or more olefins, wherein the olefins are selected from the group consisting of ethylene, propylene and $\alpha$-olefins having 4 to 20 carbon atoms, and the total number of carbon atoms of the selected olefins is 6 or more, and the component (f) comprising the component (b), (f-1) an ethylene-propylene (-non-conjugated diene) random copolymer rubber and (f-2) an inorganic filler.

The component (a) is an olefin-based copolymer obtained by copolymerizing two or more olefins, wherein the olefins are selected from the group consisting of ethylene, propylene and $\alpha$-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The $\alpha$-olefins having 4 to 20 carbon atoms and combinations thereof include those described for component (a).

The component (a) is preferably an olefin-based copolymer obtained by copolymerizing a cyclic olefin and two or more olefins, wherein the olefins are selected from the group consisting of ethylene, propylene and $\alpha$-olefins having 4 to 20 carbon atoms and the total number of carbon atoms of the selected olefins is 6 or more; and wherein, the above-described "two or more olefins" and "cyclic olefin" are distinct moieties from each other.

The preferable cyclic olefins include those described for component (a).

The content of a cyclic olefin in the component (a) is preferably from about 0.01 to 20 mol %, more preferably from about 0.05 to 15 mol %, even more preferably from about 0.1 to 10 mol %, and particularly preferably from about 0.15 to 5 mol %. When the content of a cyclic olefin is too low, a molded article obtained by using the resulting olefin-based copolymer composition may be poor in heat resistance, similarly, when the content of a cyclic olefin is too high, a molded article obtained by using the resulting olefin-based copolymer composition may be poor in its balance between strength and flexibility.

As the olefin in the component (a), propylene, or ethylene and propylene can be contained therein.

The content of ethylene as the olefin in the component (a) is preferably about 90 mol % or less, more preferably about 80 mol % or less, even more preferably about 70 mol % or less, particularly preferably about 60 mol % or less, and most preferably about 50 mol % or less, in view of producing an effect of improving flexibility and transparency of the olefin-based copolymer composition. When the content is not within the above-described range, the olefin-based copolymer may contain a crystal derived from methylene chain and a molded article obtained by using the resulting olefin-based copolymer composition may be poor in flexibility and transparency.

Likewise, when lower temperature resistance is particularly required, the content of propylene in the component (a) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperature.

It is preferable that the component (a) satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in heat resistance. On the other hand, when the intrinsic viscosity is too high, a molded article obtained by using the resulting olefin-based copolymer composition may be poor in flexibility. The method for measuring the intrinsic viscosity [η] is the same as that described for component (a).

The component (a) preferably has a molecular weight distribution (Mw/Mn) measured by gel permeation chromatography (GPC) of about 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As a specific example of the metallocene-based catalyst, there may be, for example, mentioned metallocene-based catalysts described in JP-A Nos. 9-12635 and 9-151205 which are incorporated herein by reference in their entirety.

Particularly, in the component (a), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and optionally a cyclic olefin, in the presence of a catalyst for olefin polymerization comprising the component (A), (B) and/or (C) described for component (a).

Specific examples, amounts used and methods of using the components (A), (B) and (C) include those described for component (a).

As the specific example of the component (b), those described for the component (b) in the instant invention which comprises components (a) and (b) may be listed.

As the specific example of the component (f-1), those described for the component (f-1) in the instant invention which comprises components (a) and (b) may be mentioned.

The component (f-2) is an inorganic filler.

As the inorganic filler, glass flakes, kaolin, clay, silica, glass balloons, glass beads, mica, talc, calcium carbonate, titanium oxide, potassium titanate whiskers, barium sulfate, aerosil and the like can be exemplified.

As the component (f-2), corresponding commercially available products can be used.

When the olefin-based copolymer composition containing the components (a) and (f) is required to have excellent flexibility, strength, processability and non-orientation property, it is preferably that an olefin-based copolymer composition comprises about 5 to 90% by weight of the component (a), about 5 to 90% by weight of the component (b) and about 5 to 90% by weight of the component (f-1) (wherein the total amount of the components (a), (b) and (f-1) is 100% by weight) and the content of the component (f-2) is from about 1 to 500 parts by weight per 100 parts by weight of the total amount of the components (a), (b) and (f-1). Further, it is preferable that the composition comprises about 10 to 80% by weight of the component (a), about 10 to 80% by weight of the component (b) and about 10 to 80% by weight of the component (f-1), and the content of the component (f-2) is from about 5 to 300 parts by weight per 100 parts by weight of the total amount of the components (a), (b) and (f-1).

When the amount of the component (a) is too low, a molded article obtained by using the resulting olefin-based copolymer composition may be poor in flexibility. On the other hand, when the amount the component (a) is too high, a molded article obtained by using the resulting olefin-based copolymer composition may be poor in strength. When the amount of the component (b) is too low, a molded article obtained by using the resulting olefin-based copolymer composition may be poor in strength. Similarly, when the amount the component (b) is too high, a molded article obtained by using the resulting olefin-based copolymer composition may be poor in flexibility. When the amount of the component (f-1) is too low, a molded article obtained by using the resulting olefin-based copolymer composition may be poor in impact resistance at lower temperature. Likewise, when the amount the component (f-1) is too high, a molded article obtained by using the resulting olefin-based copolymer composition may be poor in strength. When the amount of the component (f-2) is too low, the resulting olefin-based copolymer composition may be poor in non-orientation property. Furthermore, when the amount the component (f-2) is too high, the resulting olefin-based copolymer composition may be poor in processability.

To the olefin-based copolymer composition, additives such as an antioxidant, antistatic agent, anti-weathering agent, ultraviolet absorber, slipping agent, coloring agent, dispersing agent and the like; coloring agents such as carbon black and the like; and other rubber-like polymers or thermoplastic resins and the like can be appropriately added as additional components.

The olefin-based copolymer composition can also be subjected to vulcanization such as sulfur vulcanization, peroxide vulcanization, metal ion vulcanization, silane vulcanization, resin vulcanization and the like by a conventionally known method.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of a closed type and open type apparatus may be adopted, and a closed type apparatus which can be utilized in combination with an inert gas is preferable. The kneading temperature is a temperature at which all of mixed constituent components are melted, and is usually from about 160 to 250° C., preferably from about 180 to 240° C. The kneading time can not be generally determined since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of constituent components is kneaded, the remaining constituent components are added to this and kneading of the constituent components is continued.

The olefin-based copolymer composition can be applied to various molding methods such as an injection molding method, sheet extrusion molding method, vacuum molding method, hollow molding method, press molding method, extrusion molding method, form molding method and the like, to obtain various molded articles.

The invention also relates to an olefin-based copolymer composition comprising (a) an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, and the component (g) comprising the following (g-1) and/or (g-2).

(g-1): a benzotriazole light stabilizer having a benzotriazole skeleton and having a molecular weight of 100 to 5,000, (g-2): a hindered amine light stabilizer having a piperidyl group in the molecule skeleton and having a molecular weight of 200 or more.

The component (a) is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility.

The α-olefins having 4 to 20 carbon atoms and combination thereof include those described for component (a).

The component (a) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more. Wherein, the above-described "two or more olefins" and "cyclic olefin" are distinct moieties from each other.

The preferable cyclic olefins include those described for component (a).

The content of a cyclic olefin in the component (a) is preferably from about 0.01 to 20 mol %, more preferably from about 0.05 to 15 mol %, even more preferably from about 0.1 to 10 mol %, and particularly preferably from about 0.15 to 5 mol %. When the content of a cyclic olefin is too low, a molded article obtained by using the resulting olefin-based copolymer composition may be poor in heat resistance, on the other hand, when the content of a cyclic olefin is too high, a molded article obtained by using the resulting olefin-based copolymer composition may be poor in balance between strength and flexibility.

As the olefin in the component (a), propylene, or ethylene and propylene can be contained therein.

The content of ethylene as the olefin in the component (a) is preferably about 90 mol % or less, more preferably about 80 mol % or less, even more preferably about 70 mol % or less, particularly preferably about 60 mol % or less, and most preferably about 50 mol % or less, in view of providing the effect of improving flexibility and transparency of the olefin-based copolymer composition. When the content is not within the above-described range, the olefin-based copolymer may contain a crystal derived from methylene chain and a molded article obtained by using the resulting olefin-based copolymer composition may be poor in flexibility and transparency.

On the other hand, when lower temperature resistance is particularly required, the content of propylene in the component (a) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperatures.

It is preferable that the component (a) satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and
particularly preferably the formula:

$$[y/(x+y)] \geq 0.5$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in heat resistance. Similarly, when the intrinsic viscosity is too high, a molded article obtained by using the resulting olefin-based copolymer composition may be poor in flexibility. The method for measuring the intrinsic viscosity [η] is the same as that described for component (a).

The component (a) preferably has a molecular weight distribution (Mw/Mn) measured by gel permeation chromatography (GPC) of about 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of elements, containing at least one cyclopentadienyl skeleton. As a specific example of the metallocene-based catalyst, there may be, for example, listed metallocene-based catalysts described in JP-A Nos. 9-12635 and 9-151205 which are incorporated herein by reference in their entirety.

Particularly, in the component (a), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in transparency and flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having non-stereospecific structure, for producing the copolymer. The complex of a transition metal having non-stereospecific structure means a complex comprising no Cs antipode and Cn antipode (n represents an integer of 1 or more).

Further, the component (a) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

The molecular weight of the ultraviolet light absorber (g-1) is from 100 to 5,000, preferably from 200 to 4,000. When the molecular weight is too low, a large proportion of a light absorber itself is sublimated in kneading or molding the resulting olefin-based copolymer composition and the intended anti-weathering property is not obtained easily. Similarly, when the molecular weight is too high, dispersion failure of the a light absorber is easily caused after kneading or molding the resulting olefin-based copolymer composition and satisfactory anti-weathering property is not obtained easily.

Specific examples of the component (g-1) include 2-(5-methyl-2-hydroxyphenyl)benzotriazole, 2-(3-t-butyl-5-methyl-2-hydroxyphenyl)-5-chlorobenzotriazole, 2-(2'-hydroxy-5'-t-octylphenyl)benzotriazole, 2-(3,5-di-t-butyl-2-hydroxyphenyl)benzotriazole, 2-(3,5-di-t-amyl-2-hydroxyphenyl)benzotriazole, 2-(3,5-di-t-butyl-2-hydroxyphenyl)-5-chlorobenzotriazole, 2-(2-hydroxy-3-stearyl-5-methylphenyl)benzotriazole, 2-[2-hydroxy-3,5-bis (α,α-dimethylbenzyl)phenyl]-2H-benzotriazole, condensation product of methyl-3-[3-t-butyl-5(2-H-benzotriazole-2-yl)-4-hydroxyphenyl]propionate with poly (3–11) ethylene glycol, 2-[2-hydroxy-3(3,4,5,6-tetrahydrophthalimide-methyl)-5-methylphenyl]benzotriazole, 2-(2-hydroxy-5-t-butylphenyl)benzotriazole, 2,2'-methylenebis [6-(2-H-benzotriazole-2-yl)-4-(1,1,3,3-tetramethylbutyl)phenol], 2-ethylhexyl-3-[3-t-butyl-5-(5-chloro-2-H-benzotriazole-2-yl)-4-hydroxyphenyl] propionate, octyl-3-[3-t-butyl-5-(5-chloro-2H-benzotriazole-2-yl)-4-hydroxyphenyl]propionate, methyl-3-[3-t-butyl-5-(5-chloro-2H-benzotriazole-2-yl)-4-hydroxyphenyl]propionate, 3-[3-t-butyl-5-(5-chloro-2H-benzotriazole-2-yl)-4-hydroxyphenyl]propionate, 2,2'-methylenebis[4-t-butyl-6-(2H-benzotriazole-2-yl)phenol], and the like.

The molecular weight of the ultraviolet ray absorber (g-2) is usually 200 or more, preferably 300 or more, even more preferably from 300 to 100,000. When the molecular weight is too low, a large proportion of a light stabilizer itself is sublimated in kneading or molding the resulting olefin-based copolymer composition and the intended anti-weathering property is not obtained easily. Similarly, when the molecular weight is too high, the dispersibility of the component (g-2) may become insufficient.

Specific examples of the component (g-2) include (2,2,6,6-tetramethylene-4-piperidyl)2-propylene carboxylate, (1,2,2,6,6-pentamethyl-4-piperidyl)2-propylene carboxylate, bis(2,2,6,6-tetramethyl-4-piperidyl)sebacate, bis(1,2,2,6,6-pentamethyl-4-piperidyl)sebacate, 2-(3,5-di-t-butyl-4-hydroxybenzyl)-2-n-butylmalonic acid bis(1,2,2,6,6-pentamethyl-4-piperidyl), tetrakis(2,2,6,6-tetramethyl-4-piperidyl)1,2,3,4-butane tetracarboxylate, tetrakis(1,2,2,6,6-pentamethyl-4-piperidyl)1,2,3,4-butane tetracarboxylate, poly[{6-(1,1,3,3-tetramethylbutyl)amino-1,3,5-triazine-2,4-diyl}{(2,2,6,6-tetramethyl-4-piperidyl)imino}], polycondensate of 1-(2-hydroxyethyl)-4-hydroxy-2,2,6,6-tetramethylpiperidine with dimethyl succinate, 4-[3-(3,5-di-t-butyl-4-hydroxyphenyl)propionyloxy]-1-[2-{3-(3,5-di-t-butyl-4-hydroxydiphenyl)propionyloxy}ethyl]-2,2,6,6-tetramethylpiperidine, mixed ester compound of 1,2,3,4-butanetetracarboxylic acid with 1,2,2,6,6-pentamethyl-4-piperidinol and 1-tridecanol, mixed ester compound of 1,2,3,4-butanetetracarboxylic acid with 2,2,6,6-tetramethyl-4-piperidinol and 1-tridecanol, mixed ester compound of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro [5,5]undecane, mixed ester compound of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5,5 ]undecane, polycondensate of N,N'-bis(2,2,6,6-tetramethyl-4-piperidyl)hexamethylenediamine with 1,2-dibromoethane, 2-methyl-5(2,2,6,6-tetramethyl-4-piperidylamino)-N-(2,2,6,6-tetramethyl-4-piperidyl) propionamide, N,N',4,7-tetrakis[4,6-bis{N-butyl-N-(2,2,6,6-tetramethyl-4-piperidyl)amino}-1,3,5-triazine-2-yl]-4,7-diazadecane-1,10-diamine, N,N',4-tris [4,6-bis{N-butyl-N-(2,2,6,6-tetramethyl-4-piperidyl)amino}-1,3,5-triazine-2-yl]-4,7-diazadecane-1,10-diamine, bis(1-acryloyl-2,2,6,6-tetramethyl-4-piperidyl)2,2-bis(3,5-di-t-butyl-4-hydroxybenzyl)malonate, N,N',4,7-tetrakis[4,6-bis{N-butyl-N-(1,2,2,6,6-pentamethyl-4-piperidyl)amino}-1,3,5-triazine-2-yl]-4,7-diazadecane-1,10-diamine, N,N',4-tris[4,6-bis{N-butyl-N-(1,2,2,6,6-pentamethyl-4-piperidyl)amino}-1,3,5-triazine-2-yl]-4,7-diazadecane-1,10-diamine, bis(2,2,6,6-tetramethyl-4-piperidyl) succinate, 2,2,6,6-tetramethyl-4-piperidyl benzoate, tris(2,2,6,6-tetramethyl-4-piperidyl)nitrilo triacetate, and the like.

The component (g) is preferably composed of the component (g-1) and the component (g-2). By using the both components together, tackiness which is an indication of anti-weathering property can be kept low. The use ratio (g-1)/(g-2) of them is preferably from about 1/99 to 99/1, even more preferably from about 5/95 to 95/5, particularly preferably from about 10/90 to 90/10.

When the olefin-based copolymer composition containing the components (a) and (g) is required to have excellent transparency and flexibility, the content of the component (g) is preferably from about 0.01 to 5 parts by weight per 100 parts by weight of the component (a). Further, the content of the component (g) is more preferably from about 0.01 to 4.5 parts by weight, particularly preferably from about 0.01 to 4 parts by weight per 100 parts by weight of the component (a).

When the amount of the component (g) is too low, the finally resulting olefin-based copolymer composition may not have sufficient anti-weathering property, and when the amount of the component (g) is too high, the composition may lose transparency, and bleeding out of a light absorber may occur.

Further, when the olefin-based copolymer composition containing the components (a) and (g) is required to have excellent mechanical strength, transparency, heat resistance and flexibility, it is preferable that the component (b) other than (a) is contained therein, in addition to the above-described component (a).

As a specific example of the component (b), those described for the component (b) in the instant invention may be listed.

Regarding the contents of the components (a) and (b), the amount of the component (a) is from about 1 to 99% by weight and the amount of the component (b) is from about 1 to 99% by weight per 100% by weight of the total amount of the components (a) and (b). Preferably, the amount of the component (a) is from about 2 to 98% by weight and the amount of the component (b) is from about 2 to 98% by weight, and even more preferably, the amount of the component (a) is from about 5 to 95% by weight and the amount of the component (b) is from about 5 to 95% by weight. The content of the above-described component (g) is usually from about 0.01 to 5 parts by weight, preferably from about 0.01 to 4.5 parts by weight, even more preferably from about 0.01 to 4 parts by weight, per 100% by weight of the total amount of the components (a) and (b). When the amount of the component (g) is too low, the finally resulting olefin-based copolymer composition may not have sufficient anti-weathering property, and when the amount of the component (g) is too high, the composition loses transparency, and bleeding out of a light absorber may occur.

Additives used in usual olefin-based copolymer compositions may be, if necessary, added to or contained in the olefin-based copolymer composition. As such additives, a plasticizer such as a phthalate and the like; rubber softener; fillers or reinforcing agent such as silica, talc, glass fiber and the like; further, antioxidant, antistatic agent, flame retardant, lubricant, forming agent, coloring agent, pigment, nucleating agent and the like, and mixtures thereof can be listed, for example. Further, rubber-like polymers such as SBR, NBR, BR, EPDM, EPR, NR, IR, 1,2-polybutadiene, AR, CR, IIR and the like can also be added if necessary.

The olefin-based copolymer composition can also be subjected, if necessary, to vulcanization such as sulfur vulcanization, peroxide vulcanization, metal ion vulcanization, silane vulcanization, resin vulcanization and the like by a conventionally known method.

The olefin-based copolymer composition also has an effect as a modifier for a thermoplastic resin. Examples of such a thermoplastic resin include polyester resins such as a polyethylene terephthalate resin, polybutylene terephthalate resin; polyphenylene oxide resin, polyacetal-based resin, polyamide-based resin, polycarbonate-based resin and the like, and among them, a polybutylene terephthalate resin and a polyphenylane oxide resin are preferable.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of a closed type and open type apparatus may be adopted, and a close type apparatus which can be utilized in combination with an inert gas is preferable. The kneading temperature is a temperature at which all of mixed constituent components are melted, and is usually from about 160 to 250° C., preferably from about 180 to 240° C. The kneading time can not be generally determined since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of constituent components is kneaded, the remaining constituent components are added and kneading of the constituent components is continued.

The olefin-based copolymer composition can be subjected to conventionally known methods such as an extrusion molding method, injection molding method, hollow molding method, compression molding method, calender processing method and the like, to be processed into a practically useful molded article. The molded article thus obtained may also be subjected to processing treatment such as painting, plating and the like.

The olefin-based copolymer composition can be used in various fields, by utilizing excellent anti-weathering properties, transparency, heat resistance, impact resistance, processability, softness, lower temperature properties, temperature dependency, compatibility, paintability, printability, hot stamping properties, deep drawing properties, hot water resistance, rubber elasticity, rubber feeling, pliability, slipping resistance, stress cracking resistance, and the like possessed thereby. For example, the present composition can be applied to sheet use such as a meat and fresh fish tray, fruit and vegetables pack, frozen food container, and the like, due to its excellent tensile property, heat resistance, flexibility, transparency, heat sealing property and oil resistance; film use such as food pack, daily general merchandise pack, industrial material pack, various rubber products, resin products, clothes, laminates of leather products and the like, expansion tape used for diapers, and the like due to its excellent anti-weathering property, heat resistance, transparency, heat sealing property and flexibility; industrial hose, tubes, belts and the like due to its excellent heat resistance, oil resistance, flexibility, transparency and tensile property; shoe uses such as sport shoes, leisure shoes, fashion sandals, leather shoes, and the like due to its excellent anti-weathering property, flexibility and tensile property; housings used due to its excellent anti-weathering property, transparency and tensile property; electric household appliances uses such as a television, stereo, clothes washer and the like due to its excellent anti-weathering property, tensile property and transparency; automobile interior and exterior parts use such as in bumper parts, body panels, side seal, and the like due to its excellent anti-weathering property, tensile property and heat resistance; adhesive use due to its excellent anti-weathering property and heat resistance; medical bag use due to its excellent flexibility, transparency, heat sealing properties, heat resistance and tensile properties; medical tube and catheter use due to its excellent flexibility, heat resistance, heat sealing properties and tensile property; syringe gasket and rubber plug use due to its excellent flexibility and heat resistance; various hygienic products use due to its excellent flexibility, transparency and tensile property; asphalt blending materials use such as road pavement, water-proof sheets, piping coating and the like due to its excellent flexibility, anti-weathering property and heat resistance; wide uses such as other daily goods, leisure goods, toys, stationery, industrial materials, medical instruments and the like due to its excellent anti-weathering property, flexibility, heat resistance and tensile property.

The invention also relates to an olefin-based copolymer composition comprising (a) an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, and the component (h) comprising the component (f-1) and the component (b) and/or the following component (h-1).

(h-1): an ethylene-based polymer having an ethylene content of about 90 mol % or more.

The component (a) is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in flexibility. The content of ethylene as the olefin in the component (a) is preferably about 90 mol % or less in view of effect for improving flexibility of the olefin-based copolymer composition. When the content is not within the above-described range, a molded article obtained by using the resulting olefin-based copolymer composition may be poor in flexibility since the olefin-based copolymer contains a crystal derived from methylene chain.

The α-olefins having 4 to 20 carbon atoms and combination thereof include those described for component (a).

The component (a) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more; and wherein, the above-described "two or more olefins" and "cyclic olefin" are distinct moieties from each other.

The preferable cyclic olefins include those described for component (a).

The content of a cyclic olefin in the component (a) is preferably from about 0.01 to 20 mol %, more preferably from about 0.05 to 15 mol %, even more preferably from about 0.1 to 10 mol %, and particularly preferably from about 0.15 to 5 mol %. When the content of a cyclic olefin is too low, a molded article obtained by using the resulting olefin-based copolymer composition may be poor in heat resistance, on the other hand, when the content of a cyclic olefin is too high, a molded article obtained by using the resulting olefin-based copolymer composition may be poor in balance between mechanical strength and flexibility.

As the olefin in the component (a), propylene, or ethylene and propylene can be contained therein.

The content of ethylene as the olefin in the component (a) is preferably about 90 mol % or less, more preferably about 80 mol % or less, even more preferably about 70 mol % or less, particularly preferably about 60 mol % or less, and most preferably about 50 mol % or less, in view of providing the effect of improving flexibility of the olefin-based copolymer composition. When the content is not within the above-described range, the olefin-based copolymer may contain a crystal derived from methylene chain and a molded article obtained by using the resulting olefin-based copolymer composition may be poor in flexibility.

On the other hand, when lower temperature resistance is particularly required, the content of propylene in the component (a) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperature.

It is preferable that the component (a) satisfies the following formula:

$$[y/(x+y)] \geq 0.2,$$

more preferably the formula:

$$[y/(x+y)] \geq 0.3,$$

even more preferably the formula:

$$[y/(x+y)] \geq 0.4,$$

and particularly preferably the formula:

$$[y/(x+y)] \geq 0.5$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in flexibility.

The component (a) has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in mechanical strength. Similarly, when the intrinsic viscosity is too high, a molded article obtained by using the resulting olefin-based copolymer composition may be poor in flexibility. The method for measuring the intrinsic viscosity [η] is the same as that described for component (a).

The component (a) preferably has a molecular weight distribution (Mw/Mn) measured by gel permeation chromatography (GPC) of about 3 or less. When the molecular weight distribution is too wide, if the copolymer is used as a modifier, the resulting olefin-based copolymer composition may be poor in flexibility. The method for measuring the molecular weight distribution is the same as that described for component (a).

It is preferable that the component (a) has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in flexibility. The measuring method by differential scanning calorimetry is the same as that described for component (a).

The component (a) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of element, containing at least one cyclopentadienyl skeleton. As a specific example of the metallocene-based catalyst, there may be, for example, listed metallocene-based catalysts described in JP-A Nos. 9-12635 and 9-151205 which are incorporated herein by reference in their entirety.

Particularly, in the component (a), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in flexibility. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

As a specific example of the component (b), the component (b) as previously stated in the instant disclosure of the Inventor's discovery may be mentioned.

As the specific example of the component (f-1), the component (f-1) as previously stated in the instant disclosure of the Inventor's discovery may be mentioned.

As the specific example of the component (h-1), those described for the component (h-1) in the instant disclosure of the Inventor's discovery may be mentioned.

When the olefin-based copolymer composition containing the components (a) and (h) is required to have excellent melt-bonding properties, and exhibits high adhesion strength against both olefin-based vulcanized rubber and olefin-based nonvulcanized rubber to be adhered thereto, it is preferably that an olefin-based copolymer composition comprises about 1 to 80% by weight of the component (a), about 5 to 89% by weight of the above-described component (f-1), about 5 to 89% by weight of the component (b) and/or the above-described component (h-1), and about 1 to 50% by weight of the following component (o), the component (a) has an intrinsic viscosity [η] measured by using a tetralin solvent at a temperature of 135° C. of about 0.5 to 10, and the ethylene content of the component (f-1) is less than about 90 mol %, wherein the total amount of the components (a), (f-1), (b) and/or (h-1) and (o) is 100% by weight.

(o): an α-olefin-based amorphous polymer having an intrinsic viscosity [η] measured by using a tetralin solvent at a temperature of 135° C. of less than about 0.5

The component (f-1) in the olefin-based copolymer composition having excellent melt-bonding properties, and exhibiting high adhesion strength against both olefin-based vulcanized rubber and olefin-based nonvulcanized rubber to be adhered thereto is an ethylene-propylene (-nonconjugated diene) random copolymer rubber of which the ethylene content is less than about 90 mol %.

As the specific examples of component (f-1) in the olefin-based copolymer composition, the component (f-1) as previously stated can be mentioned.

The component (o) is an α-olefin-based amorphous polymer having an intrinsic viscosity [η] measured by using a tetralin solvent at a temperature of 135° C. of less than about 0.5.

The α-olefin-based amorphous polymer (o) is a polymer which comprises an amorphous homopolymer of an α-olefin having 3 or more carbon atoms or an amorphous copolymer containing the α-olefin as a main component, and has a crystallinity measured by X-ray diffraction of less than about 50%.

The intrinsic viscosity [η] measured by using a tetralin solvent at a temperature of 135° C. of the component (o) is less than about 0.5, preferably from about 0.01 to 0.45, particularly preferably from about 0.02 to 0.4. When the intrinsic viscosity is too low, a molded article obtained by using the resulting olefin-based copolymer composition may be poor in mechanical strength. On the other hand, when the intrinsic viscosity is too high, the adhesion strength between the resulting olefin-based copolymer composition and a material to be adhered thereto may become lower.

The crystallinity of the component (o) is preferably about 30% or less, particularly preferably about 20% or less. When the crystallinity is too high, the adhesion strength between the resulting olefin-based copolymer composition and a material to be adhered thereto may become lower.

The number average molecular weight of the component (o) is usually from about 1,000 to 20,000, preferably from about 1,500 to 15,000. When the number average molecular weight is too low, the resulting olefin-based copolymer composition may be poor in mechanical strength, similarly, when the number average molecular weight is too high, the adhesion strength between the resulting olefin-based copolymer composition and a material to be adhered thereto may become lower. The melt viscosity at 190° C. of the component (o) is usually about 50,000 cps or less, preferably from about 100 to 30,000 cps, particularly preferably from about 200 to 20,000 cps. When the melt viscosity is too low, the resulting olefin-based copolymer composition may be poor in mechanical strength, on the other hand, when the melt viscosity is too high, the adhesion strength between the resulting olefin-based copolymer composition and a material to be adhered may become lower.

As specific examples of the α-olefin in the component (o), there are mentioned propylene, 1-butene, 1-pentene, 3-metyl-1-butene, 1-hexene, 3-methyl-1-pentene, 4-methyl-1-pentene, 3-ethyl-1-pentene, 1-octene, 1-decene, 1-undecene and the like. As specific examples of the component (o), there are listed amorphous homopolymers such as an atactic polypropylene, atactic poly-1-butene and the like; amorphous copolymers with other olefin (for example, ethylene, 1-butene, 1-pentene, 1-hexene, 4-methyl-1-pentene, 1-octene, 1-decene and the like) containing propylene as a main component, amorphous copolymers with other olefin (for example, ethylene, propylene, 1-pentene, 1-hexene, 4-methyl-1-pentene, 1-octene, 1-decene and the like) containing 1-butene as a main component. Among these olefin-based amorphous polymers, an atactic polypropylene, propylene/ethylene amorphous copolymer, propylene/1-butene amorphous copolymer are preferable. As the above-described olefin-based amorphous copolymer, random type copolymers, or block type copolymers obtained by multi-stage polymerization are mentioned. In the case of the block type copolymer, it is necessary that the bonding structure of an α-olefin unit such as propylene, 1-butene and the like, which becomes the main component is an atactic structure. When the amorphous copolymer is a copolymer of an α-olefin having 3 or more carbon atoms with ethylene, the content of the α-olefin is preferably about 50 mol % or more, and particularly preferably about 60 mol % or more. The polymer and copolymer can be produced by a gas phase polymerization method, bulk polymerization method and solvent polymerization method, or by a multistage polymerization method obtained by any combination thereof. The atactic polypropylene can be obtained as a by-product in the process for producing a polypropylene as the olefin-based crystalline polymer.

Further, the composition comprises preferably about 5 to 70% by weight of the component (a), about 15 to 80% by weight of the component (f-1), about 8 to 70% by weight of the component (b) and/or the component (h-1) and about 3 to 40% by weight of the component (o).

When the amount of the component (a) is too low, the resulting olefin-based copolymer composition may be poor in flexibility, similarly, when the amount of the component (a) is too high, the resulting olefin-based copolymer composition may be poor in mechanical strength. When the amount of the component (f-1) is too low, the resulting olefin-based copolymer composition may be poor in flexibility, likewise, when the amount of the component (f-1) is too high, the resulting olefin-based copolymer composition may be poor in mechanical strength and flowability. When the amounts of the components (b) and (h-1) are too low, the resulting olefin-based copolymer composition may be poor in mechanical strength and heat resistance, moreover, when the amounts of the components (b) and (h-1) are too high, the resulting olefin-based copolymer composition may be poor in flexibility. When the amount of the component (o) is too low, the melt-bonding property between the resulting olefin-based copolymer composition and a material to be adhered thereto may be poor, on the other hand, when the amount of the component (o) is too high, the resulting olefin-based copolymer composition may be poor in mechanical strength.

The olefin-based copolymer composition may be an olefin-based copolymer composition comprising about 1 to 200 parts by weight of the above-described component (n) per 100 parts by weight of the total amount of the components (a), (f-1), (b) and (h-1).

As the component (n) in the olefin-based copolymer composition, the component (n) as previously stated in the instant disclosure oh the Inventor's discovery can be used.

By using the component (n) in an amount within the above-described range, an effect can be obtained such that processability, flowability and flexibility are further improved. When the amount of the component (n) is too high, reduction in mechanical strength, bleeding of a softener, dispersion failure in kneading of the components (o), (f-1), (b) and/or (h-1) may be likely to occur.

To the olefin-based copolymer composition, additives such as an antioxidant, antistatic agent, anti-weathering agent, ultraviolet absorber, slipping agent, coloring agent, dispersing agent and the like; coloring agents such as carbon black; fillers such as glass fiber, carbon fiber, metal fiber, aramide fiber, glass beads, asbestos, mica, calcium carbonate, potassium titanate whiskers, talc, barium sulfate, glass flakes, and the like; and other rubber-like polymers or thermoplastic resins and the like can be appropriately added as additional components in addition to the above-described components.

For obtaining the olefin-based copolymer composition, the essential components (a), (f-1), (b) and/or (h-1), and the component (n) which is used when necessary, and the additional components appropriately used may advantageously be kneaded using a usual kneading apparatus, for example, a rubber mill, Brabender mixer, Banbury mixer, kneader, twin screw extruder, and the like. As the kneading apparatus, any of closed type and open type apparatuses may be adopted, and a closed type apparatus which can be utilized in combination with an inert gas is preferable. The kneading temperature is a temperature at which all of mixed constituent components are melted, and is usually from about 160 to 250° C., preferably from about 180 to 240° C. The kneading time can not be generally determined since it depends on the kind and amount of mixed constituent components and the kind of kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of constituent components is kneaded, the remaining constituent components are added to this and kneading of the constituent components is continued.

The olefin-based copolymer composition which has excellent melt-bonding property and exhibits high adhesion strength against both olefin-based vulcanized rubber and olefin-based nonvulcanized rubber according to the present invention can be used for automobile interior and exterior equipment, parts such as a packing, housing and the like of weak electric parts, industrial parts, waterproof parts and the like in which conventional soft vinyl chloride-based resins have been used.

The invention also relates to an olefin-based copolymer composition comprising (a) an olefin-based copolymer obtained by copolymerizing two or more olefins, wherein the olefins are selected from the group consisting of ethylene, propylene and α-olefins having 4 to 20 carbon atoms, and the total number of carbon atoms of the selected olefins is 6 or more, and the component (i) comprising the component (b) and (f-2) an inorganic filler.

The component (a) is an olefin-based copolymer obtained by copolymerizing two or more olefins, wherein the olefins are selected from the group consisting of ethylene, propylene and α-olefins having 4 to 20 carbon atoms and the total number of carbon atoms of the selected olefins is 6 or more.

It is necessary that the total number of carbon atoms of the selected olefins is 6 or more. When olefins are selected so that the total number of carbon atoms is less than 6, a molded article obtained by using the resulting olefin-based copolymer composition is poor in impact resistance.

The α-olefins having 4 to 20 carbon atoms and combinations thereof include those described for component (a).

The component (a) is preferably an olefin-based copolymer obtained by copolymerizing a cyclic olefin and two or more olefins, wherein the olefins are selected from the group consisting of ethylene, propylene and α-olefins having 4 to 20 carbon atoms and the total number of carbon atoms of the selected olefins is 6 or more; and wherein, the above-described "two or more olefins" and "cyclic olefin" are distinct moieties from each other.

The preferable cyclic olefins include those described for component (a).

The content of a cyclic olefin in the component (a) is preferably from about 0.01 to 20 mol %, more preferably from about 0.05 to 15 mol %, even more preferably from about 0.1 to 10 mol %, particularly preferably from about 0.15 to 5 mol %. When the content of a cyclic olefin is too low, a molded article obtained by using the resulting olefin-based copolymer composition may be poor in appearance, similarly, when the content of a cyclic olefin is too high, a molded article obtained by using the resulting olefin-based copolymer composition may be poor in impact resistance.

As the olefin in the component (a), propylene, or ethylene and propylene can be contained therein.

The content of ethylene as the olefin in the component (a) is preferably about 90 mol % or less, more preferably about 80 mol % or less, even more preferably about 70 mol % or less, particularly preferably about 60 mol % or less, and most preferably about 50 mol % or less, in view of producing the effect of improving impact resistance and lower temperature resistance of the olefin-based copolymer composition. When the content is not within the above-described range, the olefin-based copolymer may contain a crystal derived from methylene chain and a molded article obtained by using the resulting olefin-based copolymer composition may be poor in its balance between impact resistance and rigidity, and in particular, in impact resistance at lower temperatures.

On the other hand, when lower temperature resistance is particularly required, the content of propylene in the component (a) is preferably about 90 mol % or less, more preferably about 80 mol % or less, even more preferably about 70 mol % or less, particularly preferably about 60 mol % or less, and most preferably about 50 mol % or less. When the content is not within the above-described range, a molded article obtained by using the resulting olefin-based copolymer composition may be poor in impact resistance at lower temperature.

It is preferable that the component (a) satisfies the following formula:

$$0.10 \leq [y/(x+y)] \leq 0.90,$$

more preferably the formula:

$$0.15 \leq [y/(x+y)] \leq 0.80,$$

even more preferably the formula:

$$0.20 \leq [y/(x+y)] \leq 0.70,$$

and
particularly preferably the formula:

$$0.25 \leq [y/(x+y)] \leq 0.60$$

(wherein, x represents the content (mol %) of ethylene in the component (a), and y represents the content (mol %) of α-olefins having 4 to 20 carbon atoms in the component (a)).

When the above-described formula is not satisfied, a molded article obtained by using the resulting olefin-based copolymer composition may be poor in its balance between impact resistance and rigidity.

The component (a) has an intrinsic viscosity [η] measured by using a tetralin solvent at a temperature of 135° C. preferably of about 0.3 to 10, more preferably of about 0.5 to 7, even more preferably of about 0.7 to 5. When the intrinsic viscosity is too low, a molded article obtained by using the resulting olefin-based copolymer composition may be poor in impact resistance. Similarly, when the intrinsic viscosity is too high, a molded article obtained by using the resulting olefin-based copolymer composition may be poor in appearance. The method for measuring the intrinsic viscosity [η] is the same as that described for component (a).

The component (a) preferably has a molecular weight distribution (Mw/Mn) measured by gel permeation chromatography (GPC) of about 3 or less. When the molecular weight distribution is too wide, if the copolymer is used as a modifier, the resulting olefin-based copolymer composition may be poor in impact resistance. The method for measuring the molecular weight distribution is the same as that described for component (a).

It is preferable that the component (a) has neither a peak of 1 J/g or more based on melting of a crystal nor a peak of 1 J/g or more based on crystallization when measured by differential scanning calorimetry (DSC). When such a peak exists, a molded article obtained by using the resulting olefin-based copolymer composition may be poor in rigidity. The measuring method by differential scanning calorimetry is the same as that described for component (a)

The component (a) can be produced by using a known Ziegler-Natta type catalyst or metallocene-based catalyst. A metallocene-based catalyst is preferably used since a copolymer having high molecular weight, narrow molecular weight distribution and narrow composition distribution is obtained. As the metallocene-based catalyst, there may be mentioned complexes of a transition metal of group IVA to group VIA in the periodic table of elements, containing at least one cyclopentadienyl skeleton. As a specific example of the metallocene-based catalyst, there may be, for example, listed metallocene-based catalysts described in JP-A Nos. 9-12635 and 9-151205 which are incorporated herein by reference in their entirety.

Particularly, in the component (a), it is preferable that the configuration of propylene and/or the α-olefin side chain having 4 to 20 carbon atoms is an atactic structure. When it is not an atactic structure, if the copolymer is used as a modifier, the resulting olefin-based copolymer composition may be poor in its balance between impact resistance and rigidity. For providing atactic stereoregularity in the copolymer, two or more olefins, wherein the olefins are selected from the group consisting of ethylene, propylene and α-olefins having 4 to 20 carbon atoms and the total number of carbon atoms of the selected olefins is 6 or more, and a cyclic olefin, can be copolymerized in the presence of a complex of a transition metal of group IVA to group VIA in the periodic table of elements, containing at least one cyclopentadienyl skeleton and having a non-stereospecific structure, for producing the copolymer. The complex of a transition metal having a non-stereospecific structure means a complex comprising no Cs antipode and Cn antipode (n represents an integer of 1 or more).

Further, the component (a) can be optimally produced by copolymerizing two or more olefins, wherein the olefins are selected from the group consisting of ethylene, propylene and α-olefins having 4 to 20 carbon atoms and the total number of carbon atoms of the selected olefins is 6 or more, and a cyclic olefin, in the presence of a catalyst for olefin polymerization comprising the component (A), (B) and/or (C) described for component (a).

Specific examples, amounts used and methods of using the components (A), (B) and (C) include those described for component (a).

As the specific example of the component (b), the component (b) as previously stated in the instant disclosure of the Inventor's discovery may be mentioned.

As the specific example of the component (f-2), the component (f-2) as previously stated in the instant disclosure of the Inventor's discovery may be mentioned.

When the olefin-based copolymer composition containing the components (a) and (i) is required to give an excellent appearance of a molded article, and to have excellent impact resistance at room temperature and at lower temperature, and high rigidity, it is preferably an olefin-based copolymer composition comprises about 3 to 50% by weight of the component (a), about 30 to 92% by weight of the component (b) and about 5 to 50% by weight of the component (f-2). Further, the composition preferably comprises about 4 to 40% by weight of the component (a), about 50 to 90% by weight of the component (b) and about 6 to 40% by weight of the component (f-2).

When the amount of the component (a) is too low or too high, a molded article obtained by using the resulting olefin-based copolymer composition may be poor in appearance. When the amount of the component (b) is too low, a molded article obtained by using the resulting olefin-based copolymer composition maybe poor in rigidity, similarly, when the amount of the component (b) is too high, a molded article obtained by using the resulting olefin-based copolymer composition may be poor in impact resistance. When the amount of the component (f-2) is too low, a molded article obtained by using the resulting olefin-based copolymer composition may be poor in rigidity, likewise, when the amount of the component (f-2) is too high, a molded article obtained by using the resulting olefin-based copolymer composition may be poor in appearance.

Use of talc, calcium carbonate, glass fiber is particularly preferable in view of its balance between the impact resistance and rigidity of a molded article obtained by using the resulting olefin-based copolymer composition.

To the olefin-based copolymer composition, additives such as an antioxidant, antistatic agent, anti-weathering agent, ultraviolet absorber, slipping agent, coloring agent, dispersing agent and the like; coloring agents such as carbon black; thermoplastic resins and ethylene-propylene copolymer rubber; ethylene-α-olefin copolymer rubber composed of combination of ethylene-1-butene, ethylene-1-hexene, ethylene-1-octene and the like not belonging to the category of the component (a); ethylene-propylene-non-conjugated diene copolymer rubber, polybutadiene, styrene-butadiene block copolymer rubber, styrene-butadiene-styrene block copolymer rubber, styrene-butadiene random copolymer rubber, partially hydrogenated styrene-butadiene-styrene block copolymer rubber, partially hydrogenated styrene-butadiene random copolymer rubber, styrene-isoprene block copolymer rubber, partially hydrogenated styrene-isoprene block copolymer rubber, acrylonitrile-butadiene copolymer rubber, partially hydrogenated acrylonitrile-butadiene copolymer rubber, butylene rubber, chloroprene rubber, fluorine rubber, chlorosulfonated polyethylene, silicon rubber, urethane rubber and the like, can be appropriately added as additional components.

The olefin-based copolymer composition can also be subjected, if necessary, to vulcanization such as sulfur vulcanization, peroxide vulcanization, metal ion vulcanization, silane vulcanization, resin vulcanization and the like by a conventionally known method.

For obtaining the olefin-based copolymer composition, the above-described components may advantageously be kneaded using a usual kneading apparatus, for example, a rubber mill, Brabender mixer, Banbury mixer, kneader, twin screw extruder, and the like. As the kneading apparatus, any of closed type and open type apparatus may be adopted, and a closed type apparatus which can be utilized in combination with an inert gas is preferable. The kneading temperature is a temperature at which all of mixed constituent components are melted, and usually from about 160 to 250° C., preferably from about 180 to 240° C. The kneading time can not be generally determined since it depends on the kind and amount of mixed constituent components and the kind of a kneading apparatus. When a kneading apparatus such as a kneader, Banbury mixer and the like is used, the kneading time is from about 3 to 10 minutes. In the kneading process, constituent components may be kneaded at one time, or there can be adopted a multi-divided kneading method in which after a part of constituent components is kneaded, the remaining constituent components are added to this and kneading of the constituent components is continued.

The olefin-based copolymer composition which gives excellent appearance of a molded article, and has excellent impact resistance at room temperature and at lower temperature, and high rigidity according to the present invention can be subjected to various molding methods such as an injection molding method, sheet extrusion molding method, vacuum molding method, hollow molding method, press molding method, extrusion molding method, form molding method and the like, to obtain various molded articles.

The following examples are provided as an aid to those desiring to practice the present inventive discovery. These examples, as well as the instant disclosure are not, however, intended or otherwise intended to limit the scope of the present invention being Claimed. This is because those of ordinary skill in the art will readily realize that various changes can be made in the materials and processes set forth herein, without departing from either the spirit or scope of the instant discovery. Accordingly, the present invention is only limited by the scope of the claims appended hereto including the range of equivalents encompassed thereby.

Further, it is useful that each of the patent documents, literature references and test procedures referenced herein, are incorporated herein by reference in their entirety.

EXAMPLE

The following examples illustrate the present invention.
[I] Measuring Method
Measurement was conducted as follows.
(1) Intrinsic Viscosity [η]
Measurement of the intrinsic viscosity [η] was conducted in tetralin at 135° C. using a Ubbelohde viscometer. 300 mg of the sample was dissolved in 100 ml of tetralin to prepare a solution having a concentration of 3 mg/ml. This solution was further diluted to ½, ⅓ and ⅕, and the resulting diluted solutions were subjected to measurement in a thermostatic oil bath at 135° C. (±0.1° C.). The measurement was repeated 3 times at respective concentrations, and the average of the resulting values was taken for use.
(2) Measurement by Differential Scanning Calorimetry (DSC)
A differential scanning calorimeter (DSC220C, manufactured by Seiko Instruments Inc.) was used and the measurement was conducted at a speed of 10° C./min in both the temperature raising process and temperature lowering process.
(3) Measurement of Each Monomer Unit Content in Copolymer
  (a) Preparation of calibration curve
Mixtures of a propylene homopolymer and an ethylene-1-butene copolymer, prepared at various mixing ratios, were thermally pressed to form films having a thickness of 0.05 mm. Absorbancies at a peak derived from propylene (wave number 1150 cm$^{-1}$) and a peak derived from 1-butene (wave number 770 cm$^{-1}$) were measured by using an infrared spectrometer. The contents of propylene and 1-butene units in the mixtures were plotted against these absorbancies. From these plots, regression lines were drawn as calibration curves. In this procedure, the propylene homopolymer and the ethylene-1-butene copolymer were dissolved in toluene, then, methanol was added to this, and the resulting precipitate was dried for use as the mixture.

(b) Measurement of propylene/1-butene content
An olefin copolymer was thermally pressed to form a film having a thickness of 0.05 mm. Then, absorbancies at a peak derived from propylene and a peak derived from 1-butene were measured by using an infrared spectrometer, and the content of the propylene and 1-butene units in the olefin copolymer are calculated by using the calibration curves as made above.

(c) Measurement of dicyclopentadiene (DCPD)
An olefin copolymer was thermally pressed to form a film having a thickness of 0.5 mm. Then, permeability at a peak derived from dicyclopentadiene (wave number 1611 cm$^{-1}$) was measured by using an infrared spectrometer, and the content of dicyclopentadiene in the olefin copolymer was calculated.

[III] Preparation of the Catalyst for Polymerization
(1) Synthesis of Transition Metal Complex (dimethylsilyl (tetramethylcyclopentadienyl)(3-tert-butyl-5-metyl-2-phenoxy)titanium dichloride)
  (a) Synthesis of 1-bromo-3-tert-butyl-5-methyl-2-phenol.
In a 500 ml four-necked flask equipped with a stirrer, 20.1 g (123 mmol) of 2-tert-butyl-4-methylphenol was dissolved in 150 ml of toluene under nitrogen atmosphere, then, to this was added 25.9 ml (18.0 g, 246 mmol) of tert-butylamine. This solution was cooled to −70° C., and 10.5 ml (32.6 g, 204 mmol) of bromine was added. This solution was kept at −70° C., and stirred for 2 hours. Then, the solution was warmed to room temperature, and washed three times with adding 100 ml of 10% diluted hydrochloric acid for each time. The organic layer obtained after the washing was dried over anhydrous sodium sulfate, the solvent was removed by using an evaporator, then, the product was purified using a silica column to obtain 18.4 g (75.7mmol) of 1-bromo-3-tert-butyl-5-methyl-2-phenol as a colorless oil. The yield was 62%.

(b) Synthesis of 1-bromo-3-tert-butyl-2-methoxy-5-methylbenzene.
In a 100 ml four-necked flask equipped with a stirrer, 13.9 g (57.2 mmol) of 1-bromo-3-tert-butyl-5-methyl-2-phenol synthesized in the above-described process (a) was dissolved in 40 ml of acetonitrile under nitrogen atmosphere, then, to this was added 3.8 g (67.9 mmol) of potassium hydroxide. Further, 17.8 ml (40.6 g, 286 mmol) of methyl iodide was added, and the mixture was stirred for 12 hours. Then, the solvent was removed by using an evaporator, and 40 ml of hexane was added to the residue and the hexane-soluble portion was extracted. The extraction was repeated three times. The solvent was removed from the extract, to obtain 13.8 g (53.7 mmol) of 1-bromo-3-tert-butyl-2-methoxy-5-methylbenzene as a pale yellow oil. The yield was 94%.

(c) Synthesis of (3-tert-butyl-2-methoxy-5-methylphenyl)chlorodimethylsilane
To a solution composed of tetrahydrofuran (31.5 ml), hexane (139 ml) and 1-bromo-3-tert-butyl-2-methoxy-5-methylbenzene (45 g) synthesized in the above-described process (b) was added a solution of n-butyllithium in hexane (115 ml) (1.6 mol/liter) at −40° C. over 20 minutes dropwise. The resulting mixture was kept at −40° C. for 1 hour, then, tetrahydrofuran (31.5 ml) was added dropwise.

To a solution composed of dichlorodimethylsilane (131 g) and hexane (306 ml) was added the mixture obtained above at −40° C. dropwise. The resulting mixture was warmed to room temperature over 2 hours, and stirred for 12 hours further at room temperature.

The solvent and excess dichlorodimethylsilane were distilled off from the reaction mixture under reduced pressure, and the hexane-soluble portion was extracted from the residue using hexane, and the solvent was distilled off from the resulting hexane solution, to obtain 41.9 g of (3-tert-butyl-2-methoxy-5-methylphenyl)chlorodimethylsilane as a pale yellow oil. The yield was 84%.

(d) Synthesis of (3-tert-butyl-2-methoxy-5-methylphenyl)dimethyl(tetramethylcyclopentadienyl)silane To a solution composed of (3-tert-butyl-2-methoxy-5-methylphenyl)chlorodimethylsilane (5.24 g) synthesized in the above-described process (c) and tetrahydrofuran (50 ml) was added tetramethylcyclopentadienyl lithium (2.73 g) at −35° C., the mixture was warmed to room temperature over 2 hours, and stirred for 10 hours further at room temperature.

The solvent was distilled off from the resulting reaction mixture under reduced pressure, the hexane-soluble portion was extracted using hexane, and the solvent was distilled off from the resulting hexane solution under reduced pressure, to obtain 6.69 g of (3-tert-butyl-2-methoxy-5-methylphenyl)dimethyl(tetramethylcyclopentadienyl)silane as a yellow oil. The yield was 97%.

(e) Synthesis of dimethylsilyl(tetramethylcyclopentadienyl)(3-tert-butyl-5-methyl-2-phenoxy)titanium dichloride To a solution composed of (3-tert-butyl-2-methoxy-5-methylphenyl)dimethyl(tetramethylcyclopentadienyl)silane (10.04 g) synthesized in the above-described process (d), toluene (100 ml) and triethylamine (6.30 g) was added a solution of n-butyllithium in hexane (19.0 ml)(1.63 mol/liter) dropwise, then, the mixture was warmed to room temperature over 2 hours, and stirred for 12 hours further at room temperature.

To a solution of titanium tetrachloride (4.82 g) in toluene (50 ml) was added the mixture obtained above at 0° C. under nitrogen atmosphere dropwise, then, the mixture was warmed to room temperature over 1 hour, and heated under reflux for 10 hours.

The reaction mixture was filtered, the solvent was distilled off from the filtrate, and the residue was re-crystallized from a toluene-hexane mixture solvent, to obtain 3.46 g of dimethylsilyl(tetramethylcyclopentadienyl)(3-tert-butyl-5-methyl-2-phenoxy)titanium dichloride as an orange columnar crystal. The yield was 27%.

Spectral data is as follows.

$^1$H-NMR (CDCl$_3$) δ 0.57 (s, 6H), 1.41 (s, 9H), 2.15 (s, 6H), 2.34 (s, 6H), 2.38 (s, 3H), 7.15 (s, 1H), 7.18 (s, 1H)

$^{13}$C-NMR (CDCl$_3$) δ 1.25, 14.48, 16.28, 22.47, 31.25, 36.29, 120.23, 130.62, 131.47, 133.86, 135.50, 137.37, 140.82, 142.28, 167.74

MS (CI, m/e) 458

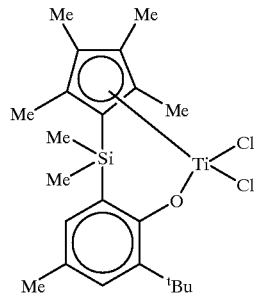

[III] Polymerization of Olefin-based Copolymer (a)

Example 1

Copolymerization of ethylene, propylene and 1-butene was continuously conducted using a 100 L polymerization vessel made of stainless steel equipped with a stirring blade. Namely, hexane was continuously supplied at a rate of 83 L/hr as a polymerization solvent through lower part of the polymerization vessel. On the other hand, the polymerization solution was continuously drawn out from upper part of the polymerization vessel so that the amount of the polymerization solution in the polymerization vessel was maintained at 100 L. Dimethylsilyl(tetramethylcyclopentadienyl)(3-tert-butyl-5-methyl-2-phenoxy)titanium dichloride, triphenylmethyltetrakis(pentafluorophenyl) borate, and triisobutylaluminum as catalysts were continuously supplied into the polymerization vessel though the lower part of the polymerization vessel at rates of 0.014 g/hr, 0.413 g/hr and 2.640 g/hr, respectively. The molecular weight thereof was controlled by hydrogen. The copolymerization reaction was conducted at 50° C. with circulating cooling water in a jacket installed on the outer part of the polymerization vessel. The polymerization reaction was terminated by adding a small amount of ethanol to the polymerization solution drawn out from the polymerization vessel, and the monomers were removed and the residue was washed with water, then, the solvent was removed by steam in a large amount of water to take out the copolymer that was dried over night and day at 80° C. under reduced pressure. By the above-described operation, an ethylene-propylene-1-butene copolymer was obtained at a rate of 2.63 kg/hr. The conditions and results are summarized in Table 1.

Example 2

Copolymerization of ethylene, propylene, 1-butene and dicyclopentadiene was continuously conducted using a 100 L polymerization vessel made of stainless steel equipped with a stirring blade. Namely, hexane was continuously supplied at a rate of 83 L/hr as a polymerization solvent through the lower part of the polymerization vessel. On the other hand, the polymerization solution was continuously drawn out from upper part of the polymerization vessel so that the amount of the polymerization solution in the polymerization vessel was maintained at 100 L.

Dimethylsilyl(tetramethylcyclopentadienyl)(3-tert-butyl-5-methyl-2-phenoxy)titanium dichloride, triphenylmethyl tetrakis(pentafluorophenyl) borate, and triisobutylaluminum as catalysts were continuously supplied into the polymerization vessel though the lower part of the polymerization vessel at rates of 0.068 g/hr, 0.964 g/hr and 2.376 g/hr, respectively. The molecular weight thereof was controlled by hydrogen. The copolymerization reaction was conducted at 50° C. with circulating cooling water in a jacket installed on the outer part of the polymerization vessel. The polymerization reaction was terminated by adding a small amount of ethanol to the polymerization solution drawn out from the polymerization vessel, and the monomers were removed and the residue was washed with water, then, the solvent was removed by steam in a large amount of water to take out the copolymer that was dried over night and day at 80° C. under reduced pressure. By the above-described operation, an ethylene-propylene-1-butene-dicyclopentadiene copolymer was obtained at a rate of 4.51 kg/hr. The conditions and results are summarized in Table 1.

TABLE 1

|  |  | Example 1 | Example 2 |
| --- | --- | --- | --- |
| Polymerization temperature | ° C. | 50 | 50 |
| Ethylene | Kg/h | 4.7 | 2 |
| Propylene | Kg/h | 0.9 | 8.3 |

TABLE 1-continued

|  | | Example 1 | Example 2 |
|---|---|---|---|
| 1-Butene | Kg/h | 1.8 | 12.7 |
| *1DCPD | Kg/h | 0 | 1.04 |
| *2 (a) | g/h | 2.640 | 2.376 |
| *3 (b) | g/h | 0.413 | 0.964 |
| *4 (c) | g/h | 0.014 | 0.068 |
| Ethylene content | mol % | 78 | 19 |
| Propylene content | mol % | 13 | 33 |
| 1-Butene content | mol % | 9 | 47 |
| DCPD content | mol % | 0 | 1 |
| Melting point of crystal | ° C. | None | None |
| Calorie for crystal melting | mj/mg | None | None |
| Crystallization temperature | ° C. | None | None |
| Crystallization calorie | mj/mg | None | None |
| Intrinsic viscosity [η] | dl/g | 0.94 | 0.86 |

*1 DCPD: dicyclopentadiene
*2 (a): triisobutylaluminum
*3 (b): triphenylmethyltetrakis (pentafluorophenyl) borate
*4 (c): dimethylsilyl (tetramethylcyclopentadienyl) (3-tert-butyl-5-methyl-2-phenoxy) titanium dichloride

[IV] Production of Olefin-based Copolymer Composition

A mixture having a formulation as shown in from Table 2 to 16, was kneaded at a screw rotation of 100 rpm for 5 minutes at 200° C. using a Plasti-Corder with a roller mixer (manufactured by Brabender OHG). The resulting composition was subjected to press molding at 200° C., and the following tests were carried out.

Tensile test: 100% modulus (M100), tensile strength at break (TB) and elongation at break (EB) were measured according to JIS K6251.

Harness: Hardness was measured by a JIS-A type hardness tester according to JIS K6253 or Shore-D type hardness tester according to ASTM 2240.

Anti-weathering property: Sunshine Weather Meter [manufactured by Suga Test Instruments Co., Ltd., black panel temperature 63° C., with rain] was used, and a specimen was left in the chamber for 120 hours. Then, tensile properties (M100, TB, EB) were measured. When the TB retention ratio value is higher, anti-weathering property is more excellent.

Flexural modulas: It was measured according to JIS K7203.

Impact resistance: Izod impact strength at 23° C. was measured according to JIS K7110.

Flowability: Melt flow rate at 230° C. was measured. (load 2.16 kg)

TABLE 2

|  | unit | Example 3 | Comparative Example 1 |
|---|---|---|---|
| a-2 | parts by weight | 9 | |
| hsbr | parts by weight | | 9 |
| b-1 | parts by weight | 91 | 91 |
| ao-1 | parts by weight | 0.1 | 0.1 |
| M100 | MPa | 17.7 | 17.6 |
| TB | MPa | 17.9 | 17.7 |
| EB | % | 140 | 160 |
| Hardness | Shore-D | 67 | 69 |
| Flexural modulas | MPa | 992 | 886 |
| MFR230° C. | g/10 min | 10.6 | 12.2 |
| Anti-weathering property (TB retention ratio) | % | 88 | 80 | a-2: A copolymer obtained in Example 2.
hsbr: Dynaron 1320P (Hydrogenated SBR [manufactured by JSR])
b-1: Polypropylene-base resin composition obtained by copolymerization of ethylene with propylene by a two stage process in which in the first stage, a homopolymer of propylene is obtained, in the second and later stages, an ethylene-propylene copolymer having an ethylene content of 40% by weight is obtained, and the ratio by weight of the polymer obtained in the first stage to the polymer obtained in the second and later stages is from 80/20. (melt flow rate at 230° C. of 30 g/10min (load 2.16 kg))
ao-1: Irganox 1010 (Antioxidant [manufactured by Ciba Specialty Chemicals K.K.])

TABLE 3

|  | unit | Example 4 | Comparative Example 2 |
|---|---|---|---|
| a-2 | parts by weight | 50 | |
| hsbr | parts by weight | | 50 |
| b-2 | parts by weight | 50 | 50 |
| ao-1 | parts by weight | 0.1 | 0.1 |
| g-2-1 | parts by weight | 0.3 | 0.3 |
| M100 | MPa | 7.9 | 8.2 |
| TB | MPa | 14.5 | 22.5 |
| EB | % | 1040 | 940 |
| Hardness | Shore-D | 47 | 48 |
| Flexural modulas | MPa | 96 | 94 |
| MFR230° C. | g/10 min | 27.4 | 10.6 |
| Anti-weathering property (TB retention ratio) | % | 100 | 66 | a-2: A copolymer obtained in Example 2.
hsbr: Dynaron 1320P (Hydrogenated SBR [manufactured by JSR])
b-2: Homopolypropylene having melt flow rate at 230° C. of 14 g/10 min (load 2.16 kg)
ao-1: Irganox 1010 (Antioxidant [manufactured by Ciba Specialty Chemicals K.K.])
g-2 : Chimassorb 944LD (Hindered amine light stabilizer having a molecular weight of 2500 or more [manufactured by Ciba Specialty Chemicals K.K.])

TABLE 4

|  | unit | Example 5 | Comparative Example 3 |
|---|---|---|---|
| a-2 | parts by weight | 50 | |
| hsbr | parts by weight | | 50 |
| b-2 | parts by weight | 50 | 50 |
| ao-1 | parts by weight | 0.1 | 0.1 |
| g-2-1 | parts by weight | 0.3 | 0.3 |
| M100 | MPa | 7.9 | 8.2 |
| TB | MPa | 14.5 | 22.5 |
| EB | % | 1040 | 940 |
| Hardness | Shore-D | 47 | 48 |
| Flexural modulas | MPa | 96 | 94 |
| MFR230° C. | g/10 min | 27.4 | 10.6 |
| Anti-weathering property (TB retention ratio) | % | 100 | 66 | a-2: A copolymer obtained in Example 2.
hsbr: Dynaron 1320P (Hydrogenated SBR [manufactured by JSR])
b-2:Homopolypropylene having melt flow rate at 230° C. of 14 g/10 min (load 2.16 kg)
ao-1: Irganox 1010 (Antioxidant [manufactured by Ciba Specialty Chemicals K.K.])
g-2-1: Chimassorb 944LD (Hindered amine light stabilizer [manufactured by Ciba Specialty Chemicals K.K.])

TABLE 5

| | unit | Example 6 | Comparative Example 4 |
|---|---|---|---|
| a-2 | parts by weight | 10 | |
| hsbr | parts by weight | | 10 |
| b-2 | parts by weight | 90 | 90 |
| ao-1 | parts by weight | 0.1 | 0.1 |
| M100 | MPa | | 18.5 |
| TB | MPa | 18.0 | 19.0 |
| EB | % | 60 | 220 |
| Hardness | Shore-D | 71 | 70 |
| Flexural modulas | MPa | 1090 | 1160 |
| MFR230° C. | g/10 min | 18.2 | 19.7 |
| Anti-weathering property (TB retention ratio) | % | 138 | very bad | a-2: A copolymer obtained in Example 2.
hsbr: Dynaron 1320P (Hydrogenated SBR [manufactured by JSR])
b-2: Isotactic polypropylene containing 100% by weight of propylene and having melt flow rate at 230° C. of 14 g/10 min (load 2.16 kg)
ao-1: Irganox 1010 (Antioxidant [manufactured by Ciba Specialty Chemicals K.K.])

TABLE 6

| | unit | Example 7 | Comparative Example 5 |
|---|---|---|---|
| a-2 | parts by weight | 20 | |
| hsbr | parts by weight | | 20 |
| b-3 | parts by weight | 60 | 60 |
| f-1-1 | parts by weight | 20 | 20 |
| f-2-1 | parts by weight | 20 | 20 |
| ao-1 | parts by weight | 0.1 | 0.1 |
| M100 | MPa | 9.8 | 9.8 |
| TB | MPa | 11.7 | 18.5 |
| EB | % | 500 | 740 |
| Hardness | JIS-A | 98 | 98 |
| MFR230° C | g/10 min | 11.3 | 7.5 |
| Anti-weathering property (TB retention ratio) | % | 86 | 50 | a-2: A copolymer obtained in Example 2.
hsbr: Dynaron 1320P (Hydrogenated SBR [manufactured by JSR ])
b-3: Random polypropylene having melt flow rate at 230° C. of 25 g/10 min (load 2.16 kg)
f-1-1: Esprene V0141(Ethylene-propylene copolymer [manufactured by Sumitomo chemical Co., Ltd.])
f-2-1:NS#200 (Calcium carbonate [manufactured by Nitto Funka Kogyo K.K.]
ao-1: Irganox 1010 (Antioxidant [manufactured by Ciba Specialty Chemicals K.K.])

TABLE 7

| | unit | Example 8 | Comparative Example 6 |
|---|---|---|---|
| a-2 | parts by weight | 30 | |
| hsbr | parts by weight | | 30 |
| b-2 | parts by weight | 10 | 10 |
| b-4 | parts by weight | 60 | 60 |
| ao-1 | parts by weight | 0.1 | 0.1 |
| M100 | MPa | 8.1 | 8.7 |
| TB | MPa | 16.8 | 26.2 |
| EB | % | 340 | 480 |
| Hardness | JIS-A | 92 | 92 |
| MFR230° C. | g/10 min | 7.7 | 6.5 |
| Anti-weathering property (TB retention ratio) | % | 98 | 30 | a-2: A copolymer obtained in Example 2.
hsbr: Dynaron 1320P (Hydrogenated SBR [manufactured by JSR])
b-2: Homopolypropylene having melt flow rate at 230° C. of 14 g/10 min (load 2.16 kg)
b-4: Beaulon M3110 (poly-1-butene having a melting point of 112° C. [manufactured by Mitsui chemicals Company])
ao-1: Irganox 1010 (Antioxidant [manufactured by Ciba Specialty Chemicals K.K.])

TABLE 8

| | unit | Example 9 | Comparative Example 7 |
|---|---|---|---|
| a-2 | parts by weight | 42 | |
| hsbr | parts by weight | | 42 |
| b-2 | parts by weight | 28 | 28 |
| e-1 | parts by weight | 30 | 30 |
| ao-1 | parts by weight | 0.1 | 0.1 |
| M100 | MPa | 3.8 | 3.6 |
| TB | MPa | 6.3 | 15.1 |
| EB | % | 1170 | 840 |
| Hardness | JIS-A | 84 | 86 |
| MFR230° C. | g/10 min | 75.2 | 33.9 |
| Anti-weathering property (TB retention ratio) | % | 73 | 41 | a-2: A copolymer obtained in Example 2.
hsbr: Dynaron 1320P (Hydrogenated SBR [manufactured by JSR])
b-2: Homopolypropylene having melt flow rate at 230° C. of 14 g/10 min (load 2.16 kg)
e-1: Arkon P-125 (Alicyclic hydrocarbon resin [manufactured by Arakawa Chemical Industries, LTD.])
ao-1: Irganox 1010 (Antioxidant [manufactured by Ciba Specialty Chemicals K.K.])

TABLE 9

| | unit | Example 10 | Comparative Example 8 |
|---|---|---|---|
| a-2 | parts by weight | 50 | |
| hsbr | parts by weight | | 50 |
| b-5 | parts by weight | 50 | 50 |
| ao-1 | parts by weight | 0.1 | 0.1 |
| M100 | MPa | 1.9 | 2.0 |
| TB | MPa | 6.5 | 10.0 |
| EB | % | 1160 | 890 |
| Hardness | JIS-A | 67 | 67 |
| MFR230° C. | g/10 min | 2.3 | 1.7 |
| Anti-weathering property (TB retention ratio) | % | 56 | 40 | a-2: A copolymer obtained in Example 2.
hsbr: Dynaron 1320P (Hydrogenated SBR [manufactured by JSR])
b-5: Catalloy KS-353P (Propylene based copolymer having a JIS A hardness measured according to JIS K6301 of 88 and a flexural modulus measured according to JIS K7203 of 112 MPa [manufactured by Montell Polyolefins Company])

ao-1: Irganox 1010 (Antioxidant [manufactured by Ciba Specialty Chemicals K.K.])

TABLE 10

|  | unit | Example 11 | Comparative Example 9 |
|---|---|---|---|
| a-2 | parts by weight | 60 |  |
| hsbr | parts by weight |  | 60 |
| b-2 | parts by weight | 30 | 30 |
| c-1 | parts by weight | 10 | 10 |
| ao-1 | parts by weight | 0.1 | 0.1 |
| M100 | MPa | 3.0 | 3.5 |
| TB | MPa | 5.5 | 11.8 |
| EB | % | 1140 | 990 |
| Hardness | JIS-A | 77 | 81 |
| MFR230° C. | g/10 min | 25.5 | 6.6 |
| Anti-weathering property (TB retention ratio) | % | 76 | 58 | a-2: A copolymer obtained in Example 2.
hsbr: Dynaron 1320P (Hydrogenated SBR [manufactured by JSR])
b-2: Homopolypropylene having melt flow rate at 230° C. of 14 g/10 min (load 2.16 kg)
c-1: Kraton D1111(SIS block copolymer [manufactured by Shell Oil Company])
ao-1: Irganox 1010 (Antioxidant [manufactured by Ciba Specialty Chemicals K.K.])

TABLE 11

|  | unit | Example 12 | Example 13 | Comparative Example 10 | Comparative Example 11 | Comparative Example 12 |
|---|---|---|---|---|---|---|
| b-6 | parts by weight | 65 | 65 | 65 | 65 | 80 |
| a-2 | parts by weight | 15 | 7.5 |  |  |  |
| f-2-2 | parts by weight | 20 | 20 | 20 | 20 | 20 |
| f-1-2 | parts by weight |  |  | 15 |  |  |
| sebs | parts by weight |  | 7.5 |  | 15 |  |
| ao-1 | parts by weight | 0.1 | 0.1 | 0.1 | 0.1 | 0.1 |
| Flexural modulas | kgf/cm² | 6490 | 4940 | 6200 | 4660 | 8660 |
| Impact resistance | kgf · cm/cm² | 8 | 11 | 7 | 11 | 4 | b-6: AZ564(Polypropylene [manufactured by Sumitomo chemical Co., Ltd.])
a-2: A copolymer obtained in Example 2.
f-2-2: Mistron Vapor (Talc [manufactured by Cyprus industrial Minerals Company])
f-1-2: Esprene V0115(Ethylene-propylene copolymer [manufactured by Sumitomo chemical Co., Ltd.])
sebs: Tuftec H1042 (SEBS block copolymer [manufactured by Asahi Chemical Industry Co., Ltd.)
ao-1: Irganox 1010 (Antioxidant [manufactured by Ciba Specialty Chemicals K.K.])

TABLE 12

|  | unit | Example 14 | Comparative Example 13 |
|---|---|---|---|
| a-2 | parts by weight | 60 |  |
| hsbr | parts by weight |  | 60 |
| b-2 | parts by weight | 20 | 20 |
| d-1 | parts by weight | 20 | 20 |
| ao-1 | parts by weight | 0.1 | 0.1 |
| M100 | MPa | 1.6 | 1.8 |
| TB | MPa | 2.3 | 10.1 |
| EB | % | 1000 | 1200 |
| Hardness | JIS-A | 58 | 65 |
| MFR 230° C. | g/10 min | 18.4 | 4.8 |
| Anti-weathering property(TB retention ratio) | % | 146 | 27 | a-2: A copolymer obtained in Example 2.
hsbr: Dynaron 1320P (Hydrogenated SBR [manufactured by JSR])
b-2: Homopolypropylene having melt flow rate at 230° C. of 14 g/10 min (load 2.16 kg)
d-l: JSR Butyl 268(isobutylene-isoprene copolymer rubber [manufactured by JSR])
ao-1: Irganox 1010 (Antioxidant [manufactured by Ciba Specialty Chemicals K.K.])

TABLE 13

|  | unit | Example 15 | Comparative Example 14 |
|---|---|---|---|
| a-2 | parts by weight | 40 |  |
| a-1 | parts by weight | 30 |  |
| hsbr | parts by weight |  | 40 |
| sebs | parts by weight |  | 30 |
| b-2 | parts by weight | 30 | 30 |
| ao-1 | parts by weight | 0.1 | 0.1 |
| M100 | MPa | 3.7 | 4.3 |
| TB | MPa | 5.4 | 14.6 |

TABLE 13-continued

| | unit | Example 15 | Comparative Example 14 |
|---|---|---|---|
| EB | % | 870 | 980 |
| Hardness | JIS-A | 83 | 84 |
| MFR 230° C. | g/10 min | 13.8 | 8.5 |
| Anti-weathering property(TB retention ratio) | % | 108 | 37 | a-1: A copolymer obtained in Example 1([y/(x+y)]=0.10) (wherein, x represents the content (mol %) of ethylene in the component (a-1), and y represents the content (mol %) of α-olefins having 4 to 20 carbon atoms in the component (a-1))

a-2: A copolymer obtained in Example 2([y/(x+y)]=0.71) (wherein, x represents the content (mol %) of ethylene in the component (a-2), and y represents the content (mol %) of α-olefins having 4 to 20 carbon atoms in the component (a-2))

hsbr: Dynaron 1320P (Hydrogenated SBR [manufactured by JSR])

sebs: Tuftec H1042 copolymer [manufactured by Asahi Chemical Industry Co., Ltd.)

b-2: Homopolypropylene having melt flow rate at 230° C. of 14 g/10 min (load 2.16 kg)

ao-1: Irganox 1010 (Antioxidant [manufactured by Ciba Specialty Chemicals K.K.])

TABLE 14

| | unit | Example 16 | Comparative Example 15 |
|---|---|---|---|
| a-2 | parts by weight | 30 | |
| hsbr | parts by weight | | 30 |
| b-2 | parts by weight | 30 | 30 |
| f-1-3 | parts by weight | 40 | 40 |
| ao-1 | parts by weight | 0.1 | 0.1 |
| po | parts by weight | 1.0 | 1.0 |
| bm | parts by weight | 1.0 | 1.0 |
| M100 | MPa | 5.1 | 4.1 |
| TB | MPa | 10.6 | 8.9 |
| EB | % | 380 | 360 |
| Hardness | JIS-A | 86 | 84 |
| MFR 230° C. | g/10 min | not available | 0.7 |
| Anti-weathering property(TB retention ratio) | % | 59 | 59 | a-2: A copolymer obtained in Example 2.

hsbr: Dynaron 1320P (Hydrogenated SBR (manufactured by JSR])

b-2: Homopolypropylene having melt flow rate at 230° C. of 14 g/10 min (load 2.16 kg)

f-1-3: Esprene 305 (Ethylene-propylene-non-conjugated diene random copolymer rubber [manufactured by Sumitomo chemical Co., Ltd.])

ao-1: Irganox 1010 (Antioxidant [manufactured by Ciba Specialty Chemicals K.K.])

po: Perhexyne 25B-40(Organic peroxide [manufactured by Nippon Oil & Fats Co., Ltd.])

bm: N,N'-m-phenylenebismaleimide

TABLE 15

| | unit | Example 17 | Comparative Example 16 |
|---|---|---|---|
| a-2 | parts by weight | 20 | |
| hsbr | parts by weight | | 20 |
| b-6 | parts by weight | 20 | 20 |
| f-1-4 | parts by weight | 50 | 50 |
| h-1 | parts by weight | 10 | 10 |
| ao-1 | parts by weight | 0.1 | 0.1 |
| M100 | MPa | 2.9 | 3.1 |
| TB | MPa | 5.8 | 8.1 |
| EB | % | 1000 | 1010 |
| Hardness | JIS-A | 78 | 79 |
| MFR 230° C. | g/10 min | 1.1 | 0.5 |
| Anti-weathering property(TB retention ratio) | % | 105 | 60 | a-2: A copolymer obtained in Example 2.

hsbr: Dynaron 1320P (Hydrogenated SBR [manufactured by JSR ])

b-6: AZ564(Polypropylene [manufactured by Sumitomo chemical Co., Ltd.])

f-1-4: Esprene 512F (Ethylene-propylene-non-conjugated diene random copolymer rubber [manufactured by Sumitomo chemical Co., Ltd.])

h-1: Linear low density polyethylene having an ethylene content of 97 mol % (melt flow rate at 190° C. of 2 g/10 min (load 2.16 kg), density of 0.919 g/ml)

ao-1: Irganox 1010 (Antioxidant [manufactured by Ciba Specialty Chemicals K.K.])

TABLE 16

| | unit | Example 18 | Comparative Example 17 |
|---|---|---|---|
| a-2 | parts by weight | 18 | |
| hsbr | parts by weight | | 18 |
| b-6 | parts by weight | 38 | 38 |
| f-1-4 | parts by weight | 38 | 38 |
| o-1 | parts by weight | 6 | 6 |
| ao-1 | parts by weight | 0.1 | 0.1 |
| M100 | MPa | 5.0 | 5.3 |
| TB | MPa | 4.9 | 6.9 |
| EB | % | 160 | 520 |
| Hardness | JIS-A | 91 | 90 |
| MFR 230° C. | g/10 min | 3.9 | 2.5 |
| Anti-weathering property(TB retention ratio) | % | 79 | 59 | a-2: A copolymer obtained in Example 2.

hsbr: Dynaron 1320P (Hydrogenated SBR [manufactured by JSR])

b-6: AZ564(Polypropylene [manufactured by Sumitomo chemical Co., Ltd.])

f-1-4: Esprene 512F (Ethylene-propylene-non-conjugated diene random copolymer rubber [manufactured by Sumitomo chemical Co., Ltd.])

o-1: Ubetac APAO UT2585(an α-olefin-based amorphous polymer having an intrinsic viscosity [η] measured by using a tetralin solvent at 135° C. of 0.4 [manufactured by Ube Rexene Company])

ao-1: Irganox 1010 (Antioxidant [manufactured by Ciba Specialty Chemicals K.K.])

What is claimed is:

1. An olefin-based copolymer composition comprising the following component (a) in combination with any one component selected from the following components (b) to (i):
- (a) an olefin-based copolymer obtained by copolymerizing two or more olefins, wherein the olefins are selected from the group consisting of ethylene, propylene and α-olefins having 4 to 20 carbon atoms, and the total number of carbon atoms of the two or more selected olefins is 6 or more, wherein (a) has an intrinsic viscosity [η] measured using a tetralin solvent at 135° C. of about 0.3 to about 10;
- (b) a crystalline α-olefin-based polymer comprising polymerized monomer units of an α-olefin having 3 or more carbon atoms;
- (c) about 5–10% by weight of component (c) based on the total weight of the components (a) to (i) wherein (c) represents the following component (c-1) and/or component (c-2),
- (c-1) a block copolymer comprising (cH) a polymer block containing polymerized units of a vinyl aromatic compound and (cS) a polymer block containing polymerized units of a conjugated diene compound,
- (c-2) a hydrogenated product of the block copolymer recited in (c-1);
- (d) the component (b) in combination with an isobutylene-isoprene copolymer rubber and/or halogenated isobutylene-isoprene copolymer rubber;
- (e) the component (b) in combination with a tackifier resin;
- (f) the component (b), a component (f-1) which is an ethylene-propylene (non-conjugated diene) random copolymer rubber, and a component (f-2) which is an inorganic filler;
- (g) a component (g-1) and/or (g-2),
- (g-1) a benzotriazole light stabilizer having a benzotnazole skeleton and having a molecular weight of 100 to 5,000,
- (g-2) a hindered amine light stabilizer having a piperidyl group in its molecular skeleton and having a molecular weight of about 200 or more;
- (h) the component (f-1) in combination with the component (b) and/or an ethylene-based polymer having an ethylene content of 90 mol % or more; and
- (i) the component (b) and the inorganic filler (f-2)
wherein component (a) has neither a peak of one J/g or more based on melting of a crystal nor a peak of one J/g or more based on crystallization, when measured by a differential scanning calorimetry (DSC) techniques, and said composition contains a component (c).

2. The composition according to claim 1, wherein the composition comprises about 1 to 30% by weight of the component (a) and about 70 to 99% by weight of the component (b), and the component (b) is a polypropylene-based resin composition obtained by copolymerizing ethylene with propylene in a two or more-stage process in which in the first stage, a homopolymer of propylene or an ethylene-propylene copolymer having an ethylene content of about 5.0% by weight or less is obtained, in the second and later stages, an ethylene-propylene copolymer having an ethylene content of about 40 to 85% by weight is obtained, and the ratio by weight of the polymer obtained in the first stage to the polymer obtained in the second and later stages is from about 50/50 to about 90/10.

3. An olefin-based copolymer composition comprising 100 parts by weight of the composition according to claim 2, and about 20 parts by weight or less of the following component (j):
- (j): a polyethylene having a density of about 0.940 g/cm$^3$ or more.

4. The composition according to claim 1, wherein the composition comprises about 1 to 30% by weight of the component (a) and about 70 to 99% by weight of the component (b), and the component (b) is an isotactic polypropylene containing about 98% by weight or more of propylene.

5. The composition according to claim 1, wherein the composition comprises about 1 to 99% by weight of the component (a) and about 1 to 99% by weight of the component (b), and the component (b) is a propylene-ethylene copolymer having a JIS A hardness measured according to JIS K6301 of about 70 to 97 and a flexural modulus measured according to JIS K7203 of about 50 to 500 MPa.

6. An olefin-based copolymer composition comprising the composition according to claim 5 and the following component (k), wherein the ratio by weight of (the olefin-based copolymer composition)/(the component (k)) is from about 50/50 to about 99/1:
- (k): a polyolefin-based resin having a flexural modulus measured according to JIS K7203 of about 550 to 1800 MPa.

7. The composition according to claim 1, wherein the composition comprises the components (a) and (b), and the component (b) comprises a component (b-1) and a component (b-2) as recited below, and wherein the composition comprises about 1 to 98% by weight of the component (a), about 1 to 98% by weight of the component (b-1) and about 1 to 98% by weight of the component (b-2):
- (b-1): a polypropylene, and
- (b-2): a poly-1-butene having a melting point as measured by differential scanning calorimetry (DSC) of about 30 to 130° C.

8. A laminate comprising a first layer containing a composition according to claim 1, which comprises about 40 to 90% by weight of the component (a) and about 10 to 60% by weight of the component (b), a second layer comprising the following component (l), and an adhesive layer between said first and second layers which comprises the following component (m):
- (l): a polyamide thermoplastic elastomer,
- (m): a functional group-containing polyolefin.

9. The composition according to claim 1, wherein the composition is obtained by a dynamic thermal treatment of a mixture comprising about 5 to 95% by weight of the component (a) and about 5 to 95% by weight of the component (b) in the presence of a crosslinking agent.

10. The composition according to claim 9, wherein the mixture recited therein additionally comprises about 10 to 900 parts by weight of an ethylene-propylene (non-conjugated diene) random copolymer rubber, based on 100 parts by weight of the composition, prior to adding ethylene-propylene (non-conjugated diene) random copolymer rubber thereto.

11. The composition according to claim 10, wherein the mixture recited therein additionally comprises about 1 to 200 parts by weight of a mineral oil softener, based on 100 parts by weight of the composition, prior to adding the mineral oil softener thereto.

12. The composition according to claim 1, wherein the component (h) comprises about 1 to 80% by weight of the component (a), about 5 to 84% by weight of the component (b), about 10 to 89% by weight of the ethylene-propylene (non-conjugated diene) random copolymer rubber (f-1) and about 5 to 84% by weight of the ethylene-based polymer having an ethylene content of about 90 mol % or more, wherein the component (a) is an olefin-based copolymer having an ethylene content of less than about 90 mol %, and the component (f-1) is an ethylene-propylene (non-conjugated diene) random copolymer rubber having an ethylene content of less than about 90 mol %.

13. The olefin-based copolymer composition of claim 1, wherein the composition comprises the components (a), (b) and (c), and wherein the composition comprises about 1 to 98% by weight of the component (a), about 1 to 98% by weight of the component (b) and the component (c).

14. The composition according to claim 1, wherein the component (c) is a block copolymer (c-1) or (c-2) having a content of a vinyl aromatic compound of from about 60 to 99% by weight.

15. The composition according to claim 1, wherein the component (c) is a block copolymer (c-1) or (c-2) having a content of a conjugated diene compound of from about 60 to 99% by weight.

16. An olefin-based copolymer composition comprising the components (a) and (d) according to claim 1, wherein the composition comprises about 1 to 80% by weight of the component (a), about 10 to 89% by weight of the component (b) and about 10 to 89% by weight of an isobutylene-isoprene copolymer rubber and/or a halogenated isobutylene-isoprene copolymer rubber.

17. The olefin-based copolymer composition according to claim 16, which is obtained by a process that comprises a dynamic vulcanization of the composition in the presence of a crosslinking agent.

18. The olefin-based copolymer composition according to claim 17, wherein the composition additionally comprises about 1 to 200 parts by weight of a mineral oil softener, based on 100 parts by weight of the composition, prior to adding the mineral oil softener thereto.

19. The composition according to claim 1, wherein the composition comprises the components (a) and (e), and the composition comprises about 1 to 98% by weight of the component (a), about 1 to 98% by weight of the component (b) and about 1 to 98% by weight of the tackifier resin.

20. The composition according to claim 1, wherein the composition comprises the components (a) and (f), and the content of the component (a) is from about5 to 90% by weight, the content of the component (b) is from about 5 to 90% by weight and the content of the component (f-1) is from about 5 to 90% by weight, with the total amount of the components (a), (b) and (f-1) being 100 parts by weight, the content of the component (f-2) is from about 1 to 500 parts by weight per 100 parts by weight of the total amount of the components (a), (b) and (f-1), and wherein the component (b) is a polypropylene.

21. The composition according to claim 1, wherein the composition comprises the components (a) and (g), and the content of the component (g-1) and/or the component (g-2) in the composition is from about 0.01 to 5 parts by weight per 100 parts by weight of the component (a).

22. An olefin-based copolymer composition comprising the components (a), (b) and (g) according to claim 1, wherein the composition comprises about 1 to 99% by weight of the component (a), about 1 to 99% by weight of the component (b), and about 0.01 to 5 parts by weight of the component (g-1) and/or the component (g-2) per 100 parts by weight of the total amount of the components (a) and (b).

23. An olefin-based copolymer composition comprising a component (o) as recited below, and the components (a) and (h) according to claim 1, wherein the composition comprises about 1 to 80% by weight of the component (a), about 5 to 84% by weight of the component (b) and/or the ethylene-based polymer having an ethylene content of about 90 mol % or more, about 5 to 89% by weight of the ethylene-propylene (non-conjugated diene) random copolymer rubber (f-1) and about 1 to 50% by weight of said component (o), wherein the component (a) is an olefin-based copolymer having an intrinsic viscosity [η] measured by using a tetralin solvent at 135° C. of about 0.5 to 10 and having an ethylene content of less than 90 mol %, and the component (f-1) is an ethylene-propylene (non-conjugated diene) random copolymer rubber having an ethylene content of less than 90 mol %; and (o) an α-olefin-based amorphous polymer having an intrinsic viscosity [η] measured by using a tetralin solvent at 135° C. of less than about 0.5.

24. The olefin-based copolymer composition according to claim 23, which comprises about 1 to 300 parts by weight of the mineral oil softener (n) per 100 parts by weight of the composition.

25. The composition according to claim 1, wherein the composition comprises the components (a) and (i), and the composition comprises about 3 to 50% by weight of the component (a), about 30 to 92% by weight of the component (b) and about 5 to 50% by weight of the component (f-2).

26. The composition according to claim 25, wherein the component (f-2) is at least one component selected from the group consisting of talc, calcium carbonate and glass fibers.

27. The composition according to claim 25, wherein the component (a) contains ethylene in an amount of about 90 mol % or less.

28. The composition according to claim 25, wherein component (a) satisfies the following formula:

$$[y/(x+y)] \leq 0.9$$

wherein, x represents the content (mol %) of ethylene in the component (a), and y represents the content (mol %) of α-olefins having 4 to 20 carbon atoms in the component (a).

29. The composition according to claim 25, wherein the component (a) is an olefin-based copolymer obtained by copolymerizing two or more olefins selected from the group consisting of ethylene, propylene and α-olefins having 4 to 20 carbon atoms, and the total number of carbon atoms of the selected olefins is 6 or more, in the presence of a complex of a transition metal of the IVA to VIA groups of the periodic table of elements, which has at least one cyclopentadienyl skeleton.

30. The composition according to claim 1, wherein the composition comprises about 40 to 90% by weight of the component (a) and about 10 to 60% by weight of the component (b), and the component (a) comprises about 1 to 99% by weight of the following component (a-1) and about 1 to 99% by weight of the following component (a-2);

(a-1): an olefin-based copolymer satisfying the following formula obtained by copolymerizing two or more olefins, wherein the olefins are selected from the group consisting of ethylene, propylene and α-olefins having 4 to 20 carbon atoms, and the total number of carbon atoms of the selected olefins is 6 or more:

$$[y/(x+y)] < 0.50$$

wherein, x represents the content (mol %) of ethylene in the component (a-1), and y represents the content (mol %) of α-olefins having 4 to 20 carbon atoms in the component (a-1), (a-2): an olefin-based copolymer satisfying the following formula obtained by copolymerizing two or more olefins, wherein the olefins are selected from the group consisting of ethylene, propylene and α-olefins having 4 to 20 carbon atoms, and the total number of carbon atoms in the selected olefins is 6 or more:

$$[y/(x+y)] \geq 0.50$$

wherein, x represents the content (mol %) of ethylene in the component (a-2), and y represents the content (mol %) of α-olefins having 4 to 20 carbon atoms in the component (a-2).

31. The composition according to claim 1, wherein the olefins in component (a) comprise propylene.

32. The composition according to claim 1, wherein the olefins in component (a) comprise ethylene and propylene.

33. The composition according to claim 1, wherein the olefins in the component (a) comprise two or more olefins selected from the group consisting of ethylene and α-olefins having 4 to 20 carbon atoms.

34. The composition according to claim 1, wherein ethylene is present in in the component (a) in an amount of about 80 mol % or less.

35. The composition according to claim 1, wherein the component (a) satisfies the following formula:

$$[y/(x+y)] \geq 0.2$$

wherein, x represents the content (mol %) of ethylene in the component (a), and y represents the content (mol %) of α-olefins having 4 to 20 carbon atoms in the component (a).

36. The composition according to claim 1, wherein the component (a) has a molecular weight distribution (Mw/Mn) measured by gel permeation chromatography (GPC) of about 3 or less.

37. The composition according to claim 25, wherein the component (a) is an olefin-based copolymer obtained by copolymerizing two or more olefins selected from the group consisting of ethylene, propylene and α-olefins having 4 to 20 carbon atoms, and the total number of carbon atoms of the selected olefins is 6 or more, in the presence of a complex of a transition metal in the IVA to VIA groups of the periodic table of elements, which as at least one cyclopentadienyl skeleton and which possesses a non-stereospecific structure.

38. The composition according to claim 1, wherein the component (a) is an olefin-based copolymer obtained by copolymerizing two or more olelins selected from the group consisting of ethylene, propylene and α-olefins having 4 to 20 carbon atoms and the total number of carbon atoms of the selected olefins is 6 or more, in the presence of a catalyst for olefin polymerization obtained by using the following component (A), component (B) and/or component (C):

(A) at least one transition metal complex represented by any of the following general formulae (I) to (III):

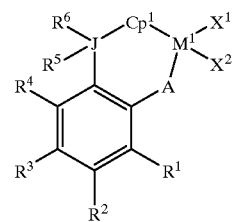

[I]

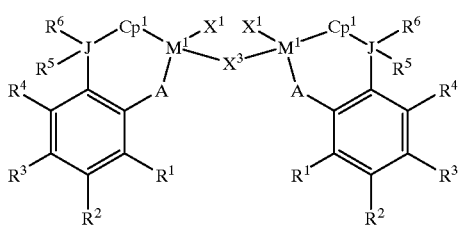

[II]

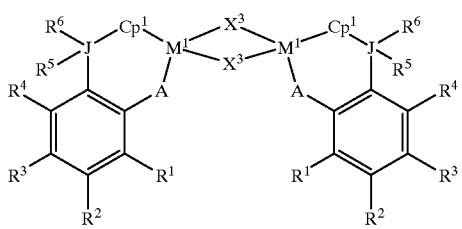

[III]

wherein in each of the above-described general formulae (I) to (III), $M^1$ represents a transition metal atom in group IV of the periodic table of elements, A represents an atom in group XVI of the periodic table of elements, and J represents an atom in group XIV of the periodic table of elements, $Cp^1$ represents a group having a cyclopentadiene anion skeleton, $X^1$, $X^2$, $R^1$, $R^2$, $R^3$, $R^4$, $R^5$ and $R^6$ each independently represents a hydrogen atom, a halogen atom, an alkyl group, an aralkyl group, an aryl group, a substituted silyl group, an alkoxy group, an aralkyloxy group, an aryloxy group or a di-substituted amino group, $X^3$ represents an atom in group XVI of the periodic table of elements, $R^1$, $R^2$, $R^3$, $R^4$, $R^5$ or $R^6$ in the formulae (I) to (III) may be the same or different;

(B) one or more aluminum compounds selected from the following compounds (B1) to (B3):

(B1) an organic aluminum compound represented by the general formula $E^1{}_a AlZ_{3-a}$, (B2) a cyclic aluminoxane having a structure represented by the general formula $\{-Al(E^2)-O-\}_b$, (B3) a linear aluminoxane having a structure represented by the general formula $E^3\{-Al(E^3)-O-\}_c AlE^3{}_2$, wherein each of $E^1$, $E^2$ and $E^3$ represents a hydrocarbon group, and all groups represented by $E^1$, $E^2$ and $E^3$ may be the same or different, respectively, Z represents a hydrogen atom or a halogen atom, and all groups represented by Z may be the same or different, "a" represents a number satisfying $0 < a \leq 3$, "b" represents an integer of 2 or more, and "c" represents an integer of 1 or more; and (C) a boron compound selected from any of the following compounds (C1) to (C3):

(C1) a boron compound represented by the general formula $BQ^1Q^2Q^3$, (C2) a boron compound represented by the general formula $G^+(BQ^1Q^2Q^3Q^4)^-$, (C3) a boron compound represented by the general formula $(L-H)^+(BQ^1Q^2Q^3Q^4)$ wherein B represents a boron atom in a valence condition of 3, $Q^1$ to $Q^4$ represent a halogen atom, a hydrocarbon group, a halogenated hydrocarbon group, a substituted silyl group, an alkoxy group or a di-substituted amino group, and they may be the same or different, $G^+$ represents an inorganic or organic cation, L represents a neutral Lewis base, and $(L-H)^+$ represents a Bronstead acid.

39. The composition according to claim 38, wherein $X^3$ in the general formulae (II) or (III) represents an oxygen atom.

40. The composition according to claim 38, wherein $R^1$ in the general formulae (I), (II) or (III) represents an alkyl group, aralkyl group, aryl group or substituted silyl group.

41. The composition according to claim 38, wherein $X^1$ and $X^2$ in the general formulae (I), (II) or (III) each independently represents a halogen atom, alkyl group, aralkyl group, alkoxy group, aryloxy group or a di-substituted amino group.

42. The composition according to claim 38, wherein the compound (B) is triethylaluminum, triisobutylaluminum or methylaluminoxane.

43. The composition according to claim 38, wherein the compound (C) is dimethylaniliniumtetrakis(pentafluorophenyl)borate or triphenylmethyltetrakis(pentafluorophenyl)borate.

44. The composition according to claim 38, wherein A in the general formulae (I), (II) or (III) represents an oxygen atom.

45. An olefin-based copolymer composition comprising an olefin-based copolymer (a') obtained by copolymerizing a cyclic olefin and two or more olefins selected from the group consisting of ethylene, propylene and α-olefins having 4 to 20 carbon atoms and the total number of carbon atoms of the selected olefins is 6 or more, and one component selected from the following components (b) to (i):

(b): a crystalline α-olefin-based polymer comprising an α-olefin having 3 or more carbon atoms;

(c): the following component (c-1) and/or component (c-2), (c-1): a block copolymer comprising (cH) a polymer block containing a vinyl aromatic compound and (cS) a polymer block containing a conjugated diene compound, (c-2): a hydrogenated product of the block copolymer recited in (c-1);

(d): the component (b) in combination with an isobutylene-isoprene copolymer rubber and/or halogenated isobutylene-isoprene copolymer rubber;

(e): the component (b) in combination with a tackifier resin;

(f): the component (b), a component (f-1) which is an ethylene-propylene (non-conjugated diene) random copolymer rubber, and a component (f-2) which is an inorganic filler;

(g): a component (g-1) and/or (g-2), (g-1): a benzotriazole light stabilizer having a benzotriazole skeleton and having a molecular weight of 100 to 5,000, (g-2): a hindered amine light stabilizer having a piperidyl group in its molecular skeleton and having a molecular weight of about 200 or more;

(h): the component (f-1) in combination with the component (b) and/or an ethylene-based polymer having an ethylene content of 90 mol % or more; and (i): the component (b) and the inorganic filler (f-2), wherein the content of the cyclic olefin is from about 0.01 to 20 mol %, and wherein the olefin copolymer (a') has an intrinsic viscosity [η] of about 0.3 to 10 measured using a tetralin solvent at 135° C.

46. The composition according to claim 45, wherein the cyclic olefin is a cyclic monoolefin.

47. The composition according to claim 45, wherein the cyclic olefin is a cyclic polyene.

* * * * *